US010564712B2

(12) United States Patent
Ikeda et al.

(10) Patent No.: US 10,564,712 B2
(45) Date of Patent: Feb. 18, 2020

(54) INFORMATION PROCESSING DEVICE, INFORMATION PROCESSING METHOD, AND PROGRAM

(71) Applicant: SONY CORPORATION, Tokyo (JP)

(72) Inventors: Tetsuo Ikeda, Tokyo (JP); Yu Hayashi, Tokyo (JP); Maya Kamachi, Kanagawa (JP); Tomohiro Ishii, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/744,303

(22) PCT Filed: Jun. 16, 2016

(86) PCT No.: PCT/JP2016/067931
§ 371 (c)(1),
(2) Date: Jan. 12, 2018

(87) PCT Pub. No.: WO2017/047182
PCT Pub. Date: Mar. 23, 2017

(65) Prior Publication Data
US 2018/0196503 A1    Jul. 12, 2018

(30) Foreign Application Priority Data

Sep. 18, 2015  (JP) .................................. 2015-184913

(51) Int. Cl.
*G06F 3/01* (2006.01)
*G06F 3/041* (2006.01)
(Continued)

(52) U.S. Cl.
CPC .............. *G06F 3/011* (2013.01); *G06F 3/005* (2013.01); *G06F 3/041* (2013.01); *G06F 3/0484* (2013.01)

(58) Field of Classification Search
USPC ........................................................ 345/581
See application file for complete search history.

(56) References Cited

U.S. PATENT DOCUMENTS

2008/0010616 A1*  1/2008  Algreatly ............. G06F 3/0346
                                                            715/856
2009/0131151 A1   5/2009  Harris et al.
(Continued)

FOREIGN PATENT DOCUMENTS

JP    2011-054117 A    3/2011
JP    2012-503786 A    2/2012
(Continued)

OTHER PUBLICATIONS

Apr. 12, 2019, European Search Report issued for related EP Application No. 16846055.8.

*Primary Examiner* — Wesner Sajous
(74) *Attorney, Agent, or Firm* — Paratus Law Group, PLLC

(57) ABSTRACT

There is provided an information processing device to set a condition indicating a relation of a plurality of users and control an operation according to a manipulation performed by each user on the basis of the condition, the information processing device including: an acquiring unit configured to acquire a detection result of information related to a manipulator for each of a plurality of manipulators placed in a predetermined region; and a generating unit configured to generate attribute information for controlling an operation based on a manipulation performed by each of the plurality of manipulators on a basis of the detection result.

21 Claims, 58 Drawing Sheets

(51) Int. Cl.
　　*G06F 3/00*　　　(2006.01)
　　*G06F 3/048*　　(2013.01)
　　*G07F 17/32*　　(2006.01)
　　*G06K 9/00*　　　(2006.01)
　　*A63F 9/18*　　　(2006.01)
　　*A63F 9/24*　　　(2006.01)
　　*A63F 9/26*　　　(2006.01)
　　*A63F 1/00*　　　(2006.01)
　　*G06F 3/0484*　　(2013.01)

(56) References Cited

U.S. PATENT DOCUMENTS

| | | | |
|---|---|---|---|
| 2011/0058711 A1* | 3/2011 | Noda | G06F 3/011 |
| | | | 382/116 |
| 2011/0187664 A1 | 8/2011 | Rinehart | |
| 2017/0038892 A1* | 2/2017 | Ikeda | G03B 17/54 |
| 2017/0039030 A1* | 2/2017 | Ikeda | G03B 17/54 |
| 2017/0041581 A1* | 2/2017 | Ikeda | G03B 17/54 |
| 2017/0205890 A1* | 7/2017 | Takimoto | G06F 3/017 |

FOREIGN PATENT DOCUMENTS

| | | |
|---|---|---|
| JP | 2013-145455 A | 7/2013 |
| JP | 2015-090524 A | 5/2015 |
| WO | WO 2015/098187 A1 | 7/2015 |

\* cited by examiner

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/067931 (filed on Jun. 16, 2016) under 35 U.S.C. § 371, which claims priority to Japanese Patent Application No. 2015-184913 (filed on Sep. 18, 2015), which are all hereby incorporated by reference in their entirety.

TECHNICAL FIELD

The present disclosure relates to an information processing device, an information processing method, and a program.

BACKGROUND ART

Devices capable of executing various kinds of functions (applications) and presenting various information in accordance with a manipulation on a touch panel such as smart phones or tablet terminals have become widespread. For tablet terminals, a screen size has become larger, and uses that enable a plurality of users to perform a manipulation at the same time have been taken into consideration as well. Further, there are cases in which a projector is used as a device for displaying information.

For example, an example of a technique of projecting a manipulation screen of a relatively large size onto a projection plane through a projector, detecting a touch manipulation performed by a user on the manipulation screen, and providing an environment in which a plurality of users are able to perform manipulations at the same time is disclosed in Patent Literature 1.

CITATION LIST

Patent Literature

Patent Literature 1: JP 2015-90524A

DISCLOSURE OF INVENTION

Technical Problem

On the other hand, under circumstances in which a plurality of users perform manipulations at the same time, for example, a situation in which a plurality of users are divided into groups and perform manipulations, a situation in which users perform manipulations in turn, or the like are assumed. In this case, for example, there are cases in which a mechanism of setting a condition indicating a relation of a plurality of users such as grouping, an order, or the like and controlling an operation based on a manipulation performed by each user in accordance with the condition is required.

In this regard, the present disclosure proposes an information processing device, an information processing method, and a program which are capable of setting a condition indicating a relation of a plurality of users and controlling an operation according to a manipulation performed by each user on the basis of the condition.

Solution to Problem

According to the present disclosure, there is provided an information processing device including: an acquiring unit configured to acquire a detection result of information related to a manipulator for each of a plurality of manipulators placed in a predetermined region; and a generating unit configured to generate attribute information for controlling an operation based on a manipulation performed by each of the plurality of manipulators on a basis of the detection result.

In addition, according to the present disclosure, there is provided an information processing method including: acquiring a detection result of information related to each of a plurality of manipulators placed in a predetermined region; and generating, by a processor, attribute information for controlling an operation based on a manipulation performed by each of the plurality of manipulators on a basis of the detection result.

In addition, according to the present disclosure, there is provided a program causing a computer to execute: acquiring a detection result of information associated with each of a plurality of manipulators placed in a predetermined region; and generating attribute information for controlling an operation based on a manipulation performed by each of the plurality of manipulators on a basis of the detection result.

Advantageous Effects of Invention

As described above, according to the present disclosure, it is possible to provide an information processing device, an information processing method, and a program which are capable of setting a condition indicating a relation of a plurality of users and controlling an operation according to a manipulation performed by each user on the basis of the condition.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
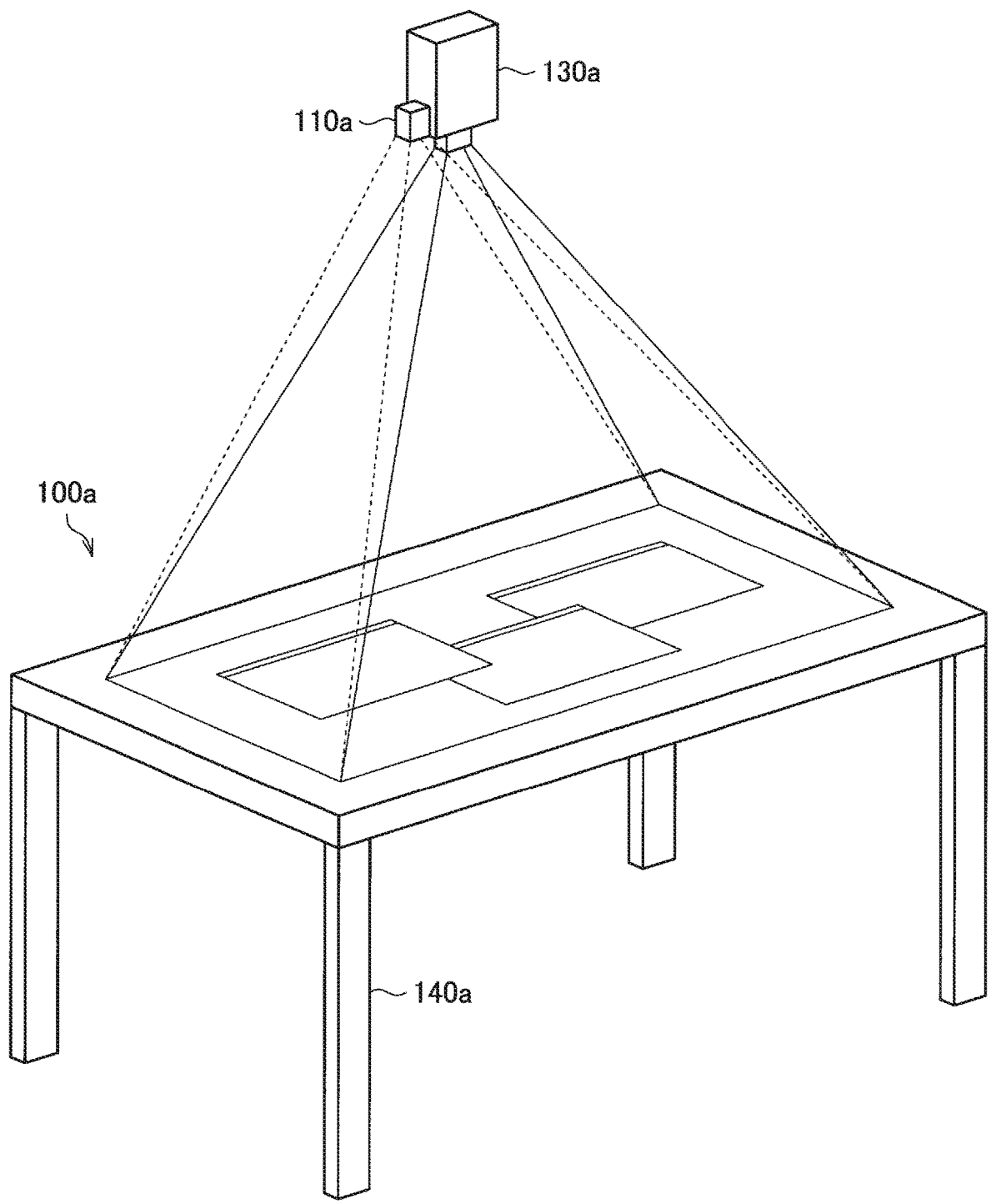
FIG. 1 is an explanatory diagram illustrating a configuration example of an information processing device according to one embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, the description will be given in the following order.
1. First Embodiment
1.1. Configuration example
1.2. Review of case in which manipulations performed by plurality of users
1.3. Functional configuration
1.4. Process
1.5. Examples
1.5.1. Example 1-1: example of control of classifying plurality of users into groups
1.5.2. Example 1-2: example of method of presenting associated group
1.5.3. Example 1-3: example of cooperation with external terminal
1.5.4. Example 1-4: example of control using previous attribute information
1.5.5. Example 1-5: example of control of combining identification results of users
1.5.6. Example 1-6: example of control of ordering users
1.5.7. Example 1-7: example of information presenting method according to ordering
1.6. Conclusion
2. Second Embodiment
2.1. Overview
2.2. Process
2.3. Examples
2.4. Conclusion
3. Hardware configuration example
4. Conclusion

1. First Embodiment

1.1. Configuration Example

First, a configuration example of an information processing device according to one embodiment of the present disclosure will be described with reference to the drawings. FIG. 1 is an explanatory diagram illustrating the configuration example of the information processing device according to one embodiment of the present disclosure. Hereinafter, the configuration example of the information processing device according to one embodiment of the present disclosure will be described with reference to FIG. 1.

As illustrated in FIG. 1, an information processing device 100a according to one embodiment of the present disclosure includes an input unit 110a and an output unit 130a. The information processing device 100a according to one embodiment of the present disclosure illustrated in FIG. 1 causes information to be displayed on a top surface of a table 140a and enables a user using the information processing device 100a to perform a manipulation on the information displayed on the table 140a. Note that, hereinafter, a scheme of displaying information on the top surface of the table 140a as illustrated in FIG. 1 is also referred to as a "projection type." Further, the information processing device 100a may be configured as an information processing system to which at least one of the input unit 110a and the output unit 130a is externally attached as an external device.

The input unit 110a is a device for inputting manipulation content of the user using the information processing device 100a, a shape or a pattern of an object placed on the table 140a, or the like. In the example illustrated in FIG. 1, the input unit 110a is provided above the table 140a, for example, such that the input unit 110a is hung from a ceiling. In other words, the input unit 110a is disposed separately from the table 140a serving as the target on which information is displayed. As the input unit 110a, for example, a camera for imaging the table 140a through one imaging optical system (for example, a series of lens groups), a stereo camera capable of imaging the table 140a through two imaging optical systems and recording information of a depth direction, or a sound collecting device (for example, a microphone or the like) for collecting acoustic information such as a voice spoken by the user using the information processing device 100a or an ambient sound of an environment in which the information processing device 100a is placed may be used.

In the case in which the camera for imaging the table 140a through one imaging optical system is used as the input unit 110a, for example, the information processing device 100a analyzes an image captured by the camera and detects an object placed on the table 140a. In a case in which the stereo camera is used as the input unit 10a, for example, a visible light camera, an infrared camera, or the like can be applied as the stereo camera. When the stereo camera is used as the input unit 110a, the input unit 110a can acquire depth information. When the depth information is acquired by the input unit 110a, for example, the information processing device 100a can detect a real object such as a hand or an object placed on the table 140a. Further, when the input unit 110a acquires the depth information, the information processing device 100a can detect a contact and an approach of a manipulator such as the hand of the user to the table 140a and separation of the manipulator from the table 140a. Note that, in the following description, bringing the manipulator such as the hand into contact with or causing it to approach an information display surface by the user is also collectively referred to as "contact", simply.

In addition, in a case in which a microphone is used as the input unit 110a, a microphone array for collecting acoustic information (for example, a sound) in a specific direction may be used as the microphone. In a case in which the microphone array is used as the input unit 110a, the information processing device 100a may adjust a sound collection direction of the microphone array to an arbitrary direction. Further, the information processing device 100a may estimate an arrival direction of the acoustic information in accordance with a sound collection result of the acoustic information acquired by each of microphones included in the microphone array. As a specific example, the information processing device 100a may estimate the arrival direction of the acoustic information in accordance with a ratio of a volume of each piece of acoustic information collected by each of the microphones included in the array microphone.

Additionally, hereinafter, a case in which a manipulation by the user with a manipulator such as a hand is detected from an image captured by the input unit 110a will be mainly described. However, the present disclosure is not limited to the related example. A manipulation by the user may be detected by a touch panel that detects touch of a finger of the user. In addition, examples of the user manipulation that can be acquired by the input unit 110a may include a stylus manipulation toward an information display surface, a gesture manipulation toward a camera, or the like.

The output unit 130a is a configuration for displaying information on the table 140a or outputting a sound in accordance with information regarding manipulation content input by the input unit 110a by the user using the information processing device 100a, content of information output by the output unit 130a, the shape or design of an object placed on the table 140a, or the like. For example, a projector, a speaker, or the like is used as the output unit 130a. In the example illustrated in FIG. 1, for example, the output unit 130a is provided above the table 140a to be suspended from the ceiling. In a case where the output unit 130a is configured as a projector, the output unit 130a projects information on the top surface of the table 140a In a case where the output unit 130a is configured as a speaker, the output unit 130a outputs a sound on the basis of a sound signal. In the case where the output unit 130a is configured as a speaker, the number of speakers may be one or plural. In a case where the output unit 130a is configured as a plurality of speakers, the information processing device 100a may limit the speakers outputting sounds or adjust a sound output direction.

In addition, in a case where the information processing device 100a is of a projection type, as illustrated in FIG. 1, the output unit 130a may include an illumination device. In a case where the output unit 130a includes an illumination device, the information processing device 100a may control an on or off state or the like of the illumination device on the basis of the content of information input by the input unit 110a.

The user using the information processing device 100a can place his or her finger or the like on the table 140a to manipulate information displayed on the table 140a by the output unit 130a. In addition, the user using the information processing device 100a can place an object on the table 140a, cause the input unit 110a to recognize the object, and execute various manipulations on the recognized object (that is, a real object).

Although not illustrated in FIG. 1, another device may be connected to the information processing device 100a. For example, an illumination device for illuminating the table 140a may be connected to the information processing device 100a. When the illumination device for illuminating the table 140a is connected to the information processing device 100a, the information processing device 100a can control a lighting state of the illumination device in accordance with a state of an information display surface.

Figure 2:
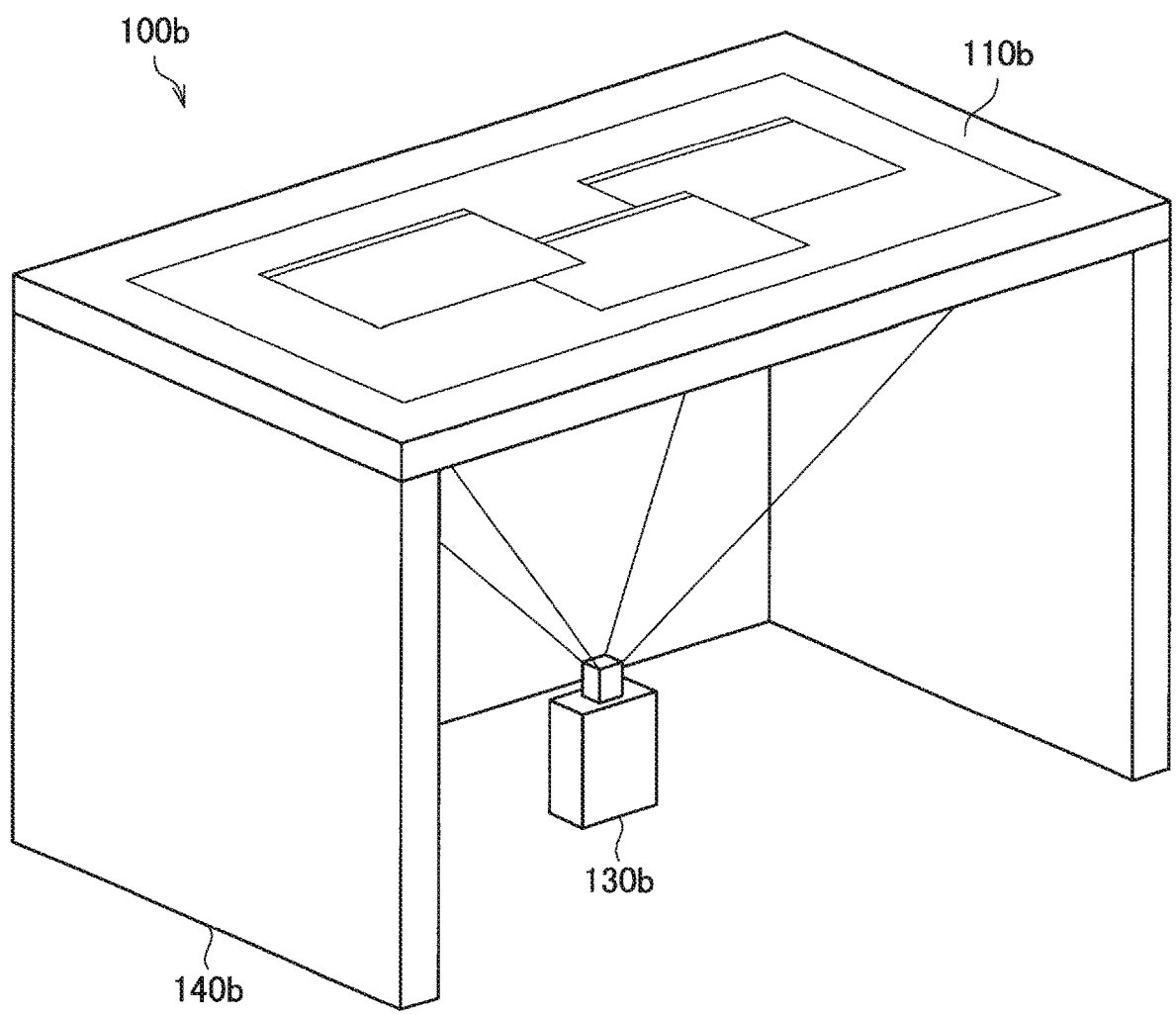
FIG. 2 is an explanatory diagram illustrating another form of an information processing device according to the embodiment.
Figure 3:
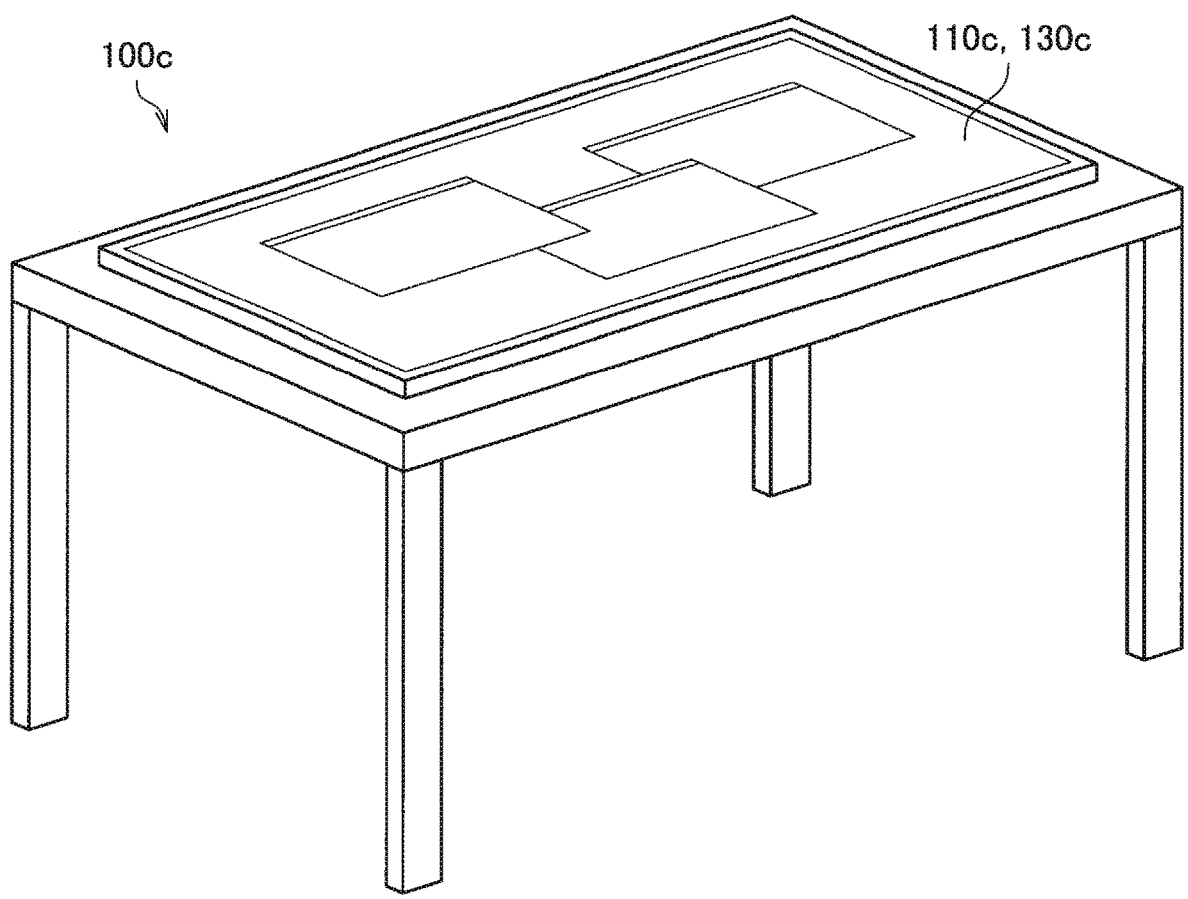
FIG. 3 is an explanatory diagram illustrating another form of an information processing device according to the embodiment.

In addition, in the present disclosure, the form of the information processing device is not limited to the form illustrated in FIG. 1. FIGS. 2 and 3 are explanatory diagrams illustrating examples of other new forms of an information processing device according to an embodiment of the present disclosure.

FIG. 2 is an explanatory diagram illustrating an example of the configuration of an information processing device 100b according to an embodiment of the present disclosure. The information processing device is configured to display the information on the front surface of a table 140b by causing the output unit 130a to radiate information from the lower side of the table 140b. That is, in the information processing device 100b illustrated in FIG. 2, the information display surface is the top surface of the table 140b. The surface of the table 140b is formed of a transparent material such as a glass plate or a transparent plastic plate. A scheme of causing the output unit 130a to radiate information from the lower side of the table 140b and displaying the information on the top surface of the table 140b as in FIG. 2 is also referred to as a "rear projection type." In the example illustrated in FIG. 2, a configuration in which an input unit 110b is provided on the front surface of the table 140b is illustrated. However, as with the information processing device 100a illustrated in FIG. 1, the input unit 110b may be provided below the table 140b to be separated from the table 140b. Further, in the information processing device 100b illustrated in FIG. 2, a camera that detects a position of the user may be installed above the top surface of the table 140b, similarly to the information processing device 100a illustrated in FIG. 1. Further, in this case, the information processing device 100b may be configured to be able to acquire depth information using a stereo camera as the camera installed above the top surface of the table 140b.

FIG. 3 is an explanatory diagram illustrating an example of the configuration of an information processing device 100c according to an embodiment of the present disclosure. FIG. 3 illustrates a state in which a touch panel type display is placed on a table. In this way, in the case of a touch panel type display, an input unit 110c and an output unit 130c can be configured as a touch panel type display. That is, in the information processing device 100c illustrated in FIG. 3, an information display surface is the touch panel type display. Further, in the information processing device 100c illustrated in FIG. 3, a camera for detecting the position of a user may be provided above the touch panel type display, as with the information processing device 100a illustrated in FIG. 1. Further, in this case, the information processing device 100c may be configured to be able to acquire depth information using a stereo camera as the camera installed above the touch panel type display.

Note that, in the following description, as illustrated in FIG. 1, a configuration of the information processing device 100a in which the input unit 110a and the output unit 130a are disposed above the table 140a, that is, the information processing device 100a in which the input unit 110a and the output unit 130a are disposed apart from the information display surface, will be described as an example. Further, in the following description, the information processing device 100a, the input unit 110a, and the output unit 130a are simply referred to as the information processing device 100, the input unit 110, and the output unit 130 as well.

1.2. Review of Case in which Manipulations Performed by Plurality of Users

Here, in order to facilitate understanding of features of the information processing device 100 according to one embodiment of the present disclosure, a case in which the information processing device 100 is manipulated by a plurality of users will be reviewed, and then a problem of the information processing device 100 according to the present embodiment will be described.

The information processing device 100 according to one embodiment of the present disclosure can present a manipulation screen of a relatively large size to the user, for example, by projecting a screen onto a projection plane (for example, the top face of the table) through the output unit 130 configured as a projector. Therefore, the information processing device 100 according to the embodiment is not limited to manipulation by a single user, but, for example, a situation in which a plurality of users perform manipulations at the same time is also assumed.

On the other hand, under circumstances in which a plurality of users perform manipulations at the same time, there are cases in which it is required to control (for example, restrict) various kinds of operations according to a manipulation performed by each user in accordance with a condition such as a case in which a plurality of users are divided into groups and perform manipulations or a case in which users perform manipulations in turn.

As a specific example, under circumstances in which a plurality of users are divided into groups and perform manipulations, there are cases in which a mechanism of classifying manipulators corresponding to the plurality of users into groups (that is, associating a plurality of manipulators), a mechanism of switching control in accordance with a group associated with a manipulated manipulator, or the like are necessary. Further, as another example, under circumstances in which a plurality of users perform manipulations in turn, there are cases in which a mechanism of setting a manipulation order in manipulators corresponding to the plurality of users (that is, ranking manipulators of the users), a mechanism of controlling an operation according to a manipulation from each manipulator in accordance with the set order (for example, restricting a manipulation performed by some manipulators in accordance with the order), or the like are necessary.

As a method of realizing the above examples, for example, there is a method of using a dedicated device as a manipulator for each user to perform a manipulation. In this case, for example, the information processing device 100 can identify each device manipulated by each user, identify each manipulation for each user, and perform various kinds of controls described above in accordance with an identification result. However, in this case, since it is premised that each user uses a dedicated device, it is difficult to apply it to, for example, a use scene in which a manipulation is performed using a hand, a finger, or the like as the manipulator.

In this regard, the present disclosure proposes a mechanism capable of setting a condition indicating a relation of a plurality of users such as grouping or an order and controlling various kinds of operations according to a manipulation performed by each user (for example, presentation of information, execution of an application or the like) in accordance with the condition on the basis of a more simplified configuration in which no dedicated device is necessary.

1.3. Functional Configuration

Figure 4:
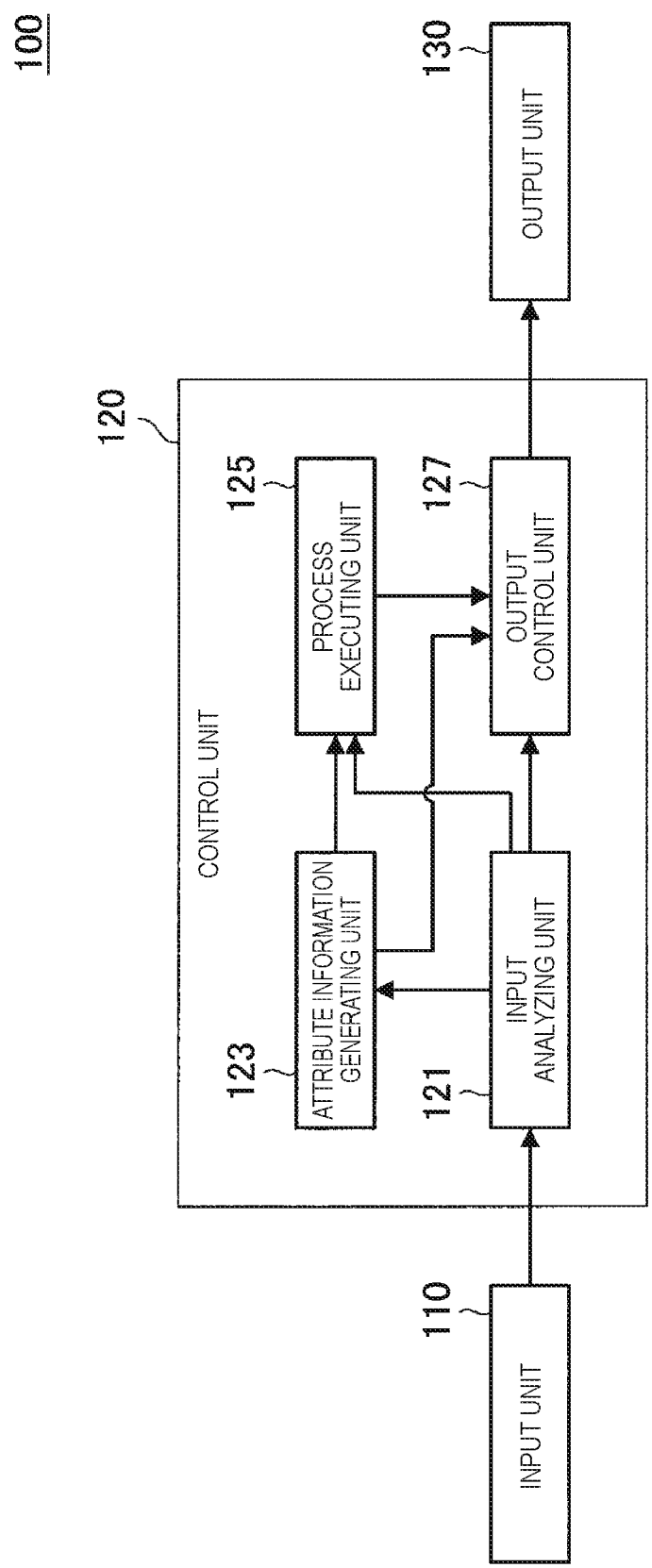
FIG. 4 is a block diagram illustrating an example of a functional configuration of the information processing device according to a first embodiment of the present disclosure.

Next, an example of a functional configuration of the information processing device 100 according to a first embodiment of the present disclosure will be described with reference to FIG. 4. FIG. 4 is a block diagram illustrating an example of a functional configuration of the information processing device 100 according to the present embodiment. Further, the present description will proceed with an example in which the information processing device 100 is configured as the projection type described above.

As illustrated in FIG. 4, the information processing device 100 according to the present embodiment includes an input unit 110, a control unit 120, and an output unit 130. The input unit 110 and the output unit 130 illustrated in FIG. 4 may correspond to, for example, the input unit 110a and the output unit 130a illustrated in FIG. 1.

The input unit 110 is a component for acquiring manipulation content performed on the information processing device 100 by the user using the information processing device 100 and information indicating a shape, a pattern, or the like of an object placed on a surface to which the output unit 130 outputs information (hereinafter also referred to as a "display surface R10" in some cases). Further, the display surface R10 may correspond to, for example, a projection plane such as the top surface of the table 140a illustrated in FIG. 1.

As a more specific example, the input unit 110 may include an imaging unit such as a camera. In this case, for example, the input unit 110 acquires information indicating a shape, a pattern, or the like of an object placed on the display surface R10 as image information captured by the imaging unit and outputs the acquired image information to the control unit 120 to be described later. Further, the imaging unit can include, for example, a camera including one imaging optical system, a stereo camera including two imaging optical systems, or the like.

The control unit 120 controls each unit of the information processing device 100. For example, the control unit 120 generates information to be output from the output unit 130 using information input through the input unit 110. As illustrated in FIG. 4, the control unit 120 includes an input analyzing unit 121, an attribute information generating unit 123, a process executing unit 125, and an output control unit 127.

The input analyzing unit 121 performs a process of detecting the manipulation content performed on the information processing device 100 by the user using the information processing device 100, content of information output by the output unit 130, or a shape, a pattern, or the like of an object placed on the display surface R10 (for example, the table 140a illustrated in FIG. 1) to which the output unit 130 outputs information.

For example, in a case in which the information processing device 100 is the projection type illustrated in FIG. 1, the input analyzing unit 121 acquires an image of the display surface R10 captured by the imaging unit, analyzes the image, and detects a manipulator such as the hand of the user, an object placed on the display surface R10, or the like. At this time, when coordinates of the display surface R10 for displaying information are calibrated to coincide with contact coordinates of the manipulator such as the hand of the user on the display surface R10 in advance, for example, the input analyzing unit 121 can detects a portion of the GUI touched by the manipulator.

Further, the input analyzing unit 121 may identify each manipulator placed on the display surface R10 and the user who manipulates the manipulator. For example, in a case in which the user inserts an arm into a region on the display surface R10 (that is, a region in which an input is detected by the input unit 110) to manipulate the information processing device 100, the input analyzing unit 121 may detect a hand (that is, a manipulator) corresponding to the arm on the basis of a position at which the arm is inserted into the region (that is, a position in which a root side of the arm is placed on an end portion of the display surface R10). Further, as another example, the input analyzing unit 121 may identify a manipulator corresponding to each user on the basis of a difference in a feature such as a shape, a pattern, or the like of the manipulator such as the hand. Further, at this time, the input analyzing unit 121 may identify each manipulator on the basis of a technique such as vein authentication, and in that case, a configuration for implementing an identification process (for example, an infrared camera or the like) may be provided in the input analyzing unit 121.

Then, the input analyzing unit 121 outputs various kinds of detected information such as each manipulator or each object placed on the display surface R10, manipulation content performed by each manipulator, an identification result of each manipulator, or the like to the attribute information generating unit 123, the process executing unit 125, and the output control unit 127 as input information.

The attribute information generating unit 123 acquires the input information such as a detection result of each manipulator or an object placed on the display surface R10, a detection result of the manipulation content performed by each manipulator, and an identification result of each manipulator from the input analyzing unit 121. Then, on the basis of the acquired input information, the attribute information generating unit 123 generates attribute information for controlling various kinds of operations based on the manipulation performed by each manipulator through the process executing unit 125 and the output control unit 127 to be described later.

More specifically, the attribute information generating unit 123 recognizes information indicating at least one of a position, a direction, a shape, a pattern, an operation, and the like of each manipulator (hereinafter also referred to as "manipulation information"). Then, the attribute information generating unit 123 generates attribute information on the basis of a recognition result of the manipulation information.

Further, the attribute information generating unit 123 may generate the attribute information on the basis of the recognition result of the manipulation information and the recognition result of each object placed on the display surface R10. As a more specific example, the attribute information generating unit 123 may generate the attribute information on the basis of a state of each manipulator and a state of an object held (for example, an object grasped) by the manipulator.

Further, the attribute information generating unit 123 may acquire information related to display information such as a position, a direction, or the like of various kinds of display information displayed on the display surface R10 from the output control unit 127. In this case, the attribute information generating unit 123 may generate the attribute information on the basis of the recognition result of the manipulation information and the information related to the acquired display information. As a more specific example, the attribute information generating unit 123 may recognize a manipulation performed on the display information by the manipulator on the basis of information indicating a position of each piece of display information and information indicating a position of each manipulator and generate the attribute information on the basis of the recognition result for the manipulation.

Further, the attribute information generating unit 123 may acquire information related to an application such as a state of an application being executed from the process executing unit 125 and an execution result of an application. In this case, the attribute information generating unit 123 may generate the attribute information on the basis of the recognition result of the manipulation information and the acquired information related to the application. As a more specific example, the attribute information generating unit 123 may control an operation related to the generation of the attribute information according to the recognition result of the manipulation information in accordance with various kinds of opportunities such as a start, execution, or an end of various kinds of processes executed as an application.

Further, an example of the attribute information generated by the attribute information generating unit 123 is information for associating at least two or more manipulators among a plurality of manipulators placed on the display surface R10 (that is, information for classifying the users corresponding to a plurality of manipulators into groups). Further, another example of the attribute information is information for weighting (for example, ranking) a plurality of manipulators placed on the display surface R10.

Of course, the above-described examples are merely examples, and content of the attribute information and a method of generating the attribute information are not particularly limited as long as the attribute information for controlling various kinds of operations based on a manipulation performed by each manipulator is generated on the basis of the acquired input information. Further, an operation related to the generation of the attribute information and an operation related to the control based on the attribute information will be described later in detail separately as an example.

As described above, the attribute information generating unit 123 generates the attribute information on the basis of the acquired input information, and outputs the generated attribute information to at least one of the process executing unit 125 and the output control unit 127. Further, the attribute information generating unit 123 may temporarily or permanently hold the attribute information by storing the generated attribute information in a predetermined storage region. Further, in this case, the attribute information generating unit 123 may output the generated attribute information to the process executing unit 125 and the output control unit 127 via the storage region.

The process executing unit 125 is a component for executing various kinds of processes such as applications. The process executing unit 125 extracts a corresponding application from a predetermined storage unit (not illustrated), for example, on the basis of an instruction given by the user via the input unit 110, and executes the extracted application. Further, at this time, the process executing unit 125 may acquire the attribute information from the attribute information generating unit 123 and control (for example, restrict) execution of various kinds of applications in accordance with content indicated in the acquired attribute information (for example, an association between manipulators or a weighting between manipulators). Further, the present operation will be described later in detail separately as an example. Further, the process executing unit 125 outputs execution results of the various kinds of executed applications to the output control unit 127.

The output control unit 127 generates output information to be output from the output unit 130 on the basis of a result of analyzing the input information through the input analyzing unit 121, and causes the output unit 130 to output the output information.

As a specific example, the output control unit 127 acquires the input information indicating the detected manipulation content of the user from the input analyzing unit 121. On the basis of the acquired input information, the output control unit 127 recognizes a manipulation target (for example, a display object) designated by a user input and processing content for the manipulation target. Then, the output control unit 127 specifies the display object serving as a display control target in accordance with the specified manipulation target and the processing content and controls whether or not the specified display object is displayed and a display position and direction, a display form (for example, a color or a size), and the like of the specified display object.

Further, the output control unit 127 may present various kinds of information corresponding to the detected manipulation content of the user to the user by causing various kinds of information corresponding to the detected manipulation content of the user to be displayed as the display information. As a specific example, the output control unit 127 may cause the display information in which the position on the display surface R10 designated by the user using the manipulator such as the hand is identifiably indicated to be displayed in accordance with the detected manipulation content of the user. Further, at this time, the output control unit 127 may control a position or a direction in which the display information is displayed in accordance with the position of the manipulator of each user. For example, the output control unit 127 may control the position or the direction on the display surface R10 in which the display information is displayed so that the display information presented to a predetermined user is superimposed on the manipulator corresponding to the user.

Further, the output control unit 127 may acquire the execution result of the application from the process executing unit 125 and perform control related to the generation of the output information or the output of the output information on the basis of the execution result. As a specific example, the output control unit 127 may acquire information output by the application from the process executing unit 125 (for example, notification information to be given to the user) and present the acquired information to the user as the display information. Further, at this time, the output control unit 127 may acquire control information related to the application executed from the process executing unit 125 and present information output by the application (for example, the execution result of the application) on a display object associated with the application on the basis of the acquired control information.

Further, the output control unit 127 may acquire the attribute information from the attribute information generating unit 123 and perform control such that corresponding display information is displayed in accordance with content indicated in the acquired attribute information (for example, an association between manipulators or a weighting between manipulators). As a specific example, the output control unit 127 may cause the output unit 130 to output display information indicating a relation between the manipulators associated with each other on the basis of the attribute information. Further, as another example, the output control unit 127 may cause the output unit 130 to output display information indicating a weight set between the manipulators on the basis of the attribute information.

Further, the output control unit 127 may cause the output unit 130 (for example, an acoustic device such as a speaker) to output, for example, acoustic information such as a sound, music, or a sound effect as the output information in addition to the display information. In this case, for example, the output control unit 127 may cause the output unit 130 to output the acoustic information according to the detected manipulation content of the user. Further, as another example, the output control unit 127 may cause the output unit 130 to output the acoustic information according to the execution result of the application. Further, the output control unit 127 may control the output of acoustic information in accordance with content indicated in the acquired attribute information.

The output unit 130 outputs various kinds of information in accordance with the manipulation content of the user using the information processing device 100 input by the input unit 110, content of information output by the output unit 130, or information such as a shape, a pattern, or the like of an object placed on the display surface R10 (for example, the table 140a illustrated in FIG. 1). The output unit 130 outputs various kinds of information on the basis of the information generated by the output control unit 127.

More specifically, the output unit 130 causes a screen (GUI) on which the display object is presented, the notification information to be presented to each user, and the like to be displayed as the display information. In a case in which the information processing device 100 is configured as the projection type, the output unit 130 may include, for example, a projector that projects the display information toward a desired projection plane (that is, the display surface R10).

Further, in addition to the display information, the output unit 130 may be configured to be capable of outputting, for example, the acoustic information such as a sound effect, music, or a sound as the output information. In this case, for example, the output unit 130 may include an acoustic device such as a speaker.

Further, the functional configuration described above is merely an example, and the present disclosure is not necessarily limited to the example illustrated in FIG. 4. As a specific example, any one of the input unit 110, the control unit 120, and the output unit 130 may be installed outside the information processing device 100. Further, as another example, at least some of various kinds of components of the control unit 120 may be installed in an external device different from the information processing device 100.

The example of the functional configuration of the information processing device 100 according to the first embodiment of the present disclosure has been described above with reference to FIG. 4.

1.4. Process

Figure 5:
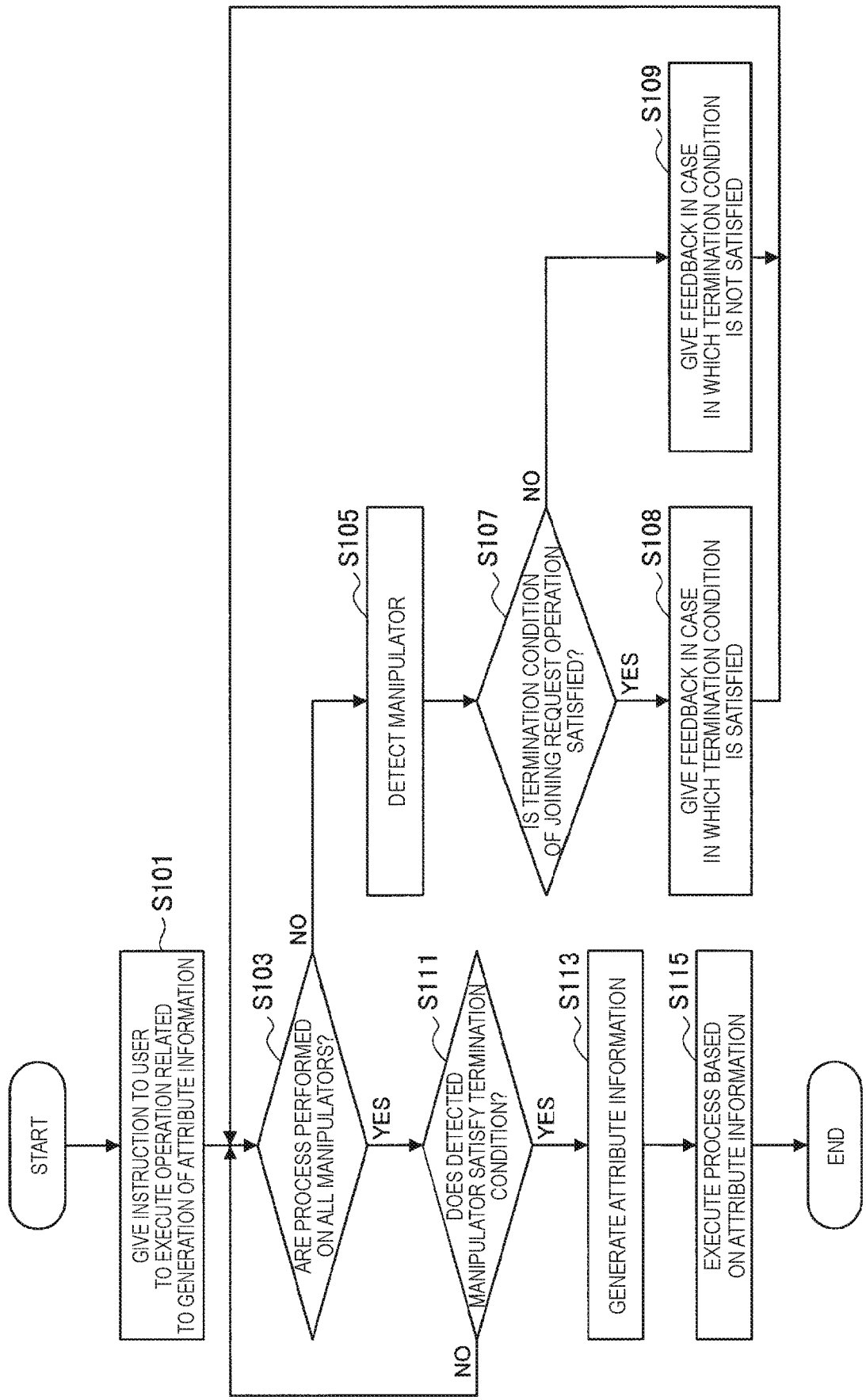
FIG. 5 is a flowchart illustrating an example of a flow of a series of processes of the information processing device according to the embodiment.

Next, an example of the flow of a series of processes of the information processing device 100 according to the first embodiment of the present disclosure will be described with reference to FIG. 5, focusing particularly on the process related to the generation of the attribute information by the information processing device 100. FIG. 5 is a flowchart illustrating an example of the flow of a series of processes of the information processing device 100 according to the present embodiment. Further, in the present description, in order to facilitate understanding of features of the information processing device 100 according to the present embodiment, an example in which each user performs various kinds of manipulations or various kinds of operations in a detection range of the manipulator detected by the information processing device 100 (that is, a region on the display surface R10) using the hand of the user as the manipulator will be described.

(Step S101)

First, the information processing device 100 gives a notification indicating information for giving an instruction to the user to execute various kinds of manipulations or various kinds of operations for generating the attribute operation. For example, the information processing device 100 may notify the user of instruction content to be given to the user by projecting the display information indicating the instruction content onto the display surface R10.

(Step S105)

Then, the information processing device 100 detects the hand of each user placed in a predetermined detection range (for example, on the display surface R10) as the manipulator. Further, on the basis of the detection result of the manipulator, the information processing device 100 acquires various kinds of information according to an attribute information generation condition (that is, the manipulation information). As a specific example, the information processing device 100 may analyze an image obtained by imaging the manipulator and acquire the manipulation information indicating a shape feature of the manipulator. Further, as another example, the information processing device 100 may analyze a moving image obtained by imaging the manipulator and acquire the manipulation information indicating an operation of the manipulator.

(Step S107)

Then, the information processing device 100 determines whether or not the manipulation information acquired on the basis of the detection result of the manipulator satisfies a termination condition for the operation related to the detection of the manipulator. Further, the termination condition corresponds to a condition indicating that the user executes various kinds of manipulations or various kinds of operations which the information processing device 100 instructs the user to execute.

As a more specific example, the information processing device 100 is assumed to give an instruction to each user to change the shape of the hand to one of a plurality of candidates. In this case, the information processing device 100 determines that the manipulator satisfies the termination condition in a case in which the detected shape of the manipulator (that is, the hand of the user) coincides with any one of the plurality of candidates.

Further, as another example, the information processing device 100 is assumed to give an instruction to each user to execute an operation of one of a plurality of candidates as an operation using the hand (for example, a gesture). In this case, the information processing device 100 determines that the manipulator satisfies the termination condition in a case in which the detected operation of the manipulator coincides with any one of the plurality of candidates.

(Steps S108 and S109)

Further, in a case in which the detected manipulator satisfies the termination condition (YES in S107), the information processing device 100 may give feedback indicating that the manipulator satisfies the termination condition to the user corresponding to the manipulator (S108). As a specific example, the information processing device 100 may project predetermined notification information to be superimposed on the manipulator placed on the display surface R10 and present the notification information to the user corresponding to the manipulator. Similarly, in a case in which the detected manipulator does not satisfy the termination condition (NO in S107), the information processing device 100 may give feedback indicating that the manipulator does not satisfy the termination condition to the user corresponding to the manipulator (S109).

(Step S103)

As described above, the information processing device 100 continues a series of processes indicated by steps S105 to S109 until the processes are performed on all the manipulators placed within a predetermined detection range (NO in S103).

(Step S111)

In a case in which a series of processes indicated by steps S105 to S109 are performed on all the manipulators (YES in S103), the information processing device 100 determines whether or not all the manipulators satisfy the termination condition. Further, at this time, the information processing device 100 may determine whether or not a constraint condition preset for a plurality of manipulators is satisfied in addition to the determination of whether or not all the manipulators individually satisfy the termination condition. As a more specific example, the information processing device 100 may determine that the termination condition is not satisfied in a case in which the number of manipulators of the same shape exceeds a threshold value. By setting such constraint, the information processing device 100 can restrict, for example, the number of manipulators associated with each other (that is, the number of users classified into the same group). Further, in a case in which at least one of the manipulators does not satisfy the termination condition (NO in S111), the information processing device 100 continues a series of processes indicated by steps S105 to S109 until all the manipulators satisfy the termination condition.

(Step S113)

In a case in which all the manipulators satisfy the termination condition (YES in S111), the information processing device 100 generates the attribute information on the basis of the manipulation information (for example, information indicating a shape or a motion of the manipulator or the like) acquired on the basis of the detection result of each manipulator. For example, the information processing device 100 may generate the attribute information for associating two or more manipulators on the basis of the manipulation information acquired for each manipulator. More specifically, the information processing device 100 may generate the attribute information for associating two or more manipulators indicating similar shapes on the basis of the shape feature of each manipulator indicated by the manipulation information. Further, as another example, the information processing device 100 may generate the attribute information for weighting (for example, ranking) a plurality of manipulators in accordance with an order in which a plurality of manipulators satisfy the termination condition.

(Step S115)

Then, the information processing device 100 executes various kinds of processes on the basis of the generated attribute information. For example, in a case in which the attribute information for associating two or more manipulators (that is, classifying a plurality of users into groups) is generated, the information processing device 100 may control (for example, restrict) the manipulation performed by each manipulator in accordance with a group associated with the user corresponding to the manipulator on the basis of the attribute information. Further, the information processing device 100 may associate information indicating the group associated with the user corresponding to the manipulator with each manipulator placed on the display surface R10 on the basis of the generated attribute information and present the information and each manipulator.

Further, in a case in which the attribute information for weighting (for example, ordering) a plurality of manipulators is generated, the information processing device 100 may associate information indicating the weight corresponding to the manipulator with each manipulator placed on the display surface R10 on the basis of the generated attribute information and present the information to each manipulator. Further, the information processing device 100 may control (for example, restrict) the manipulation performed by at least some of the manipulators in accordance with the weight corresponding to each manipulator on the basis of the generated attribute information.

The example of the flow of a series of processes of the information processing device 100 according to the first embodiment of the present disclosure has been described above with reference to FIG. 5, focusing particularly on the processing related to the generation of the attribute information by the information processing device 100.

1.5. Examples

Next, more specific application examples of the information processing device 100 will be described as examples of the information processing device 100 according to the first embodiment of the present disclosure.

1.5.1. Example 1-1: Example of Control of Classifying Plurality of Users into Groups First, as Example 1-1, an example of control of classifying a plurality of users into groups (that is, control of associating a plurality of manipulators) through the information processing device 100 will be described with a specific example. Further, in the present embodiment, unless otherwise specified, an example in which the information processing device 100 classifies the users (that is, six users) corresponding in number to hands u11 to u16 placed in a predetermined detection range (for example, on the display surface R10) into a plurality of groups will be described.
(Example of Classification into Groups According to Hand Shape)

Figure 6:
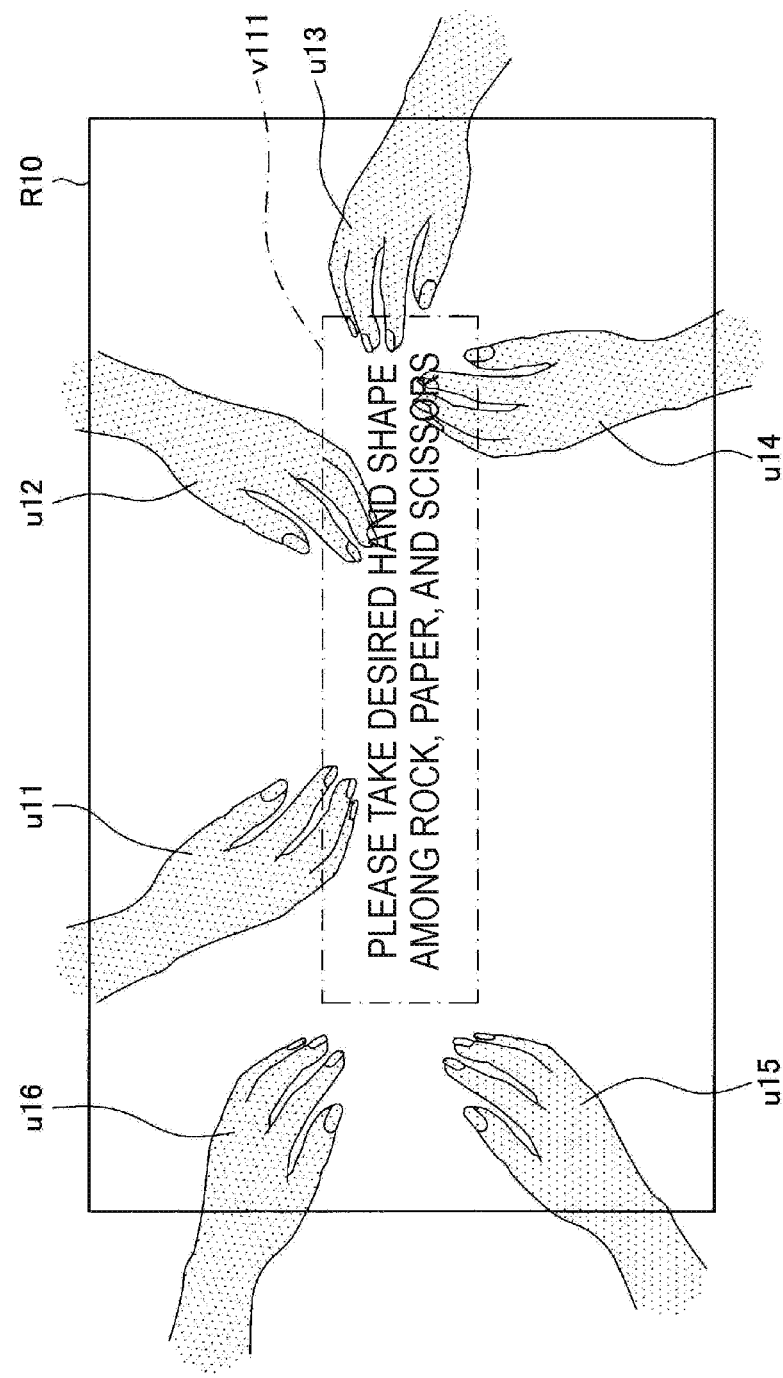
FIG. 6 is an explanatory diagram illustrating an example of operation of an information processing device according to Example 1-1.
Figure 7:
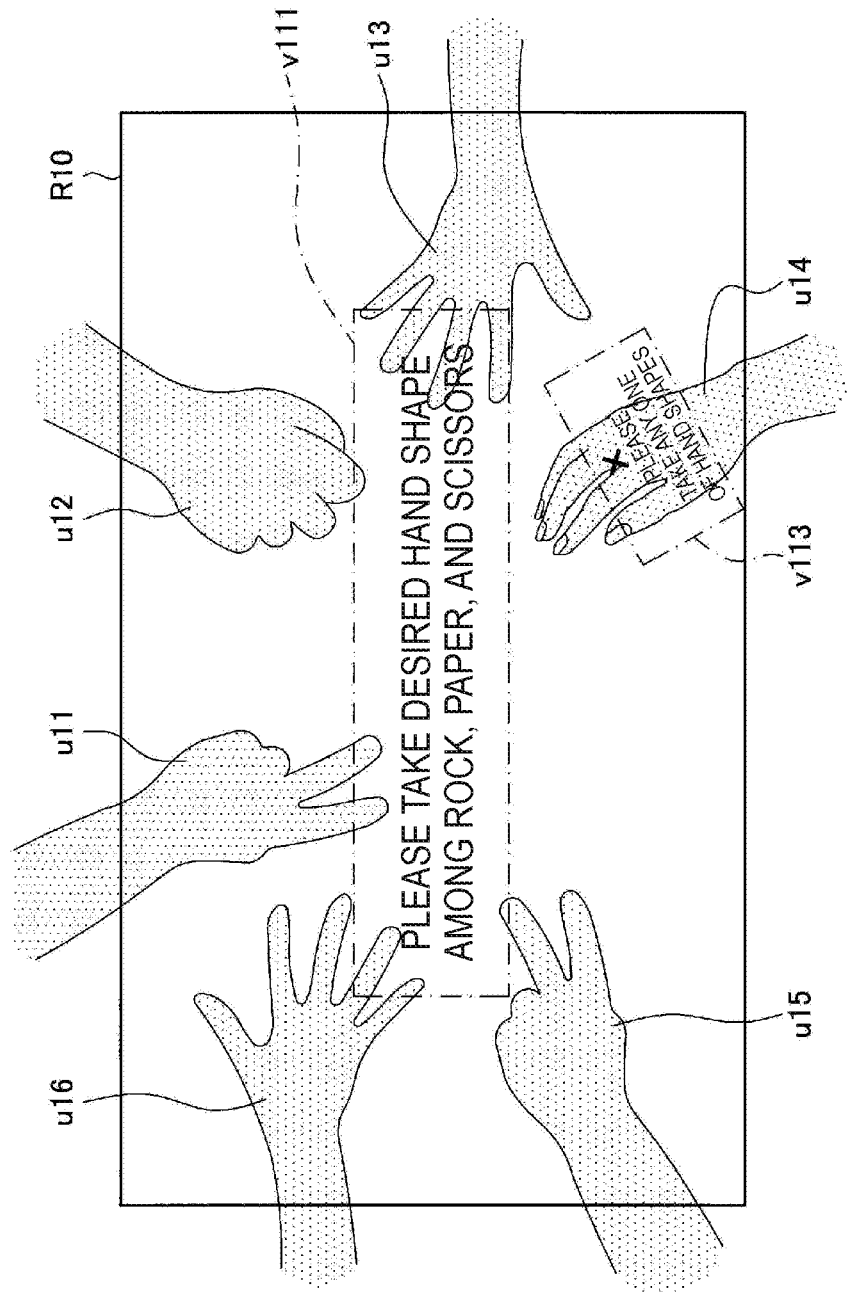
FIG. 7 is an explanatory diagram illustrating an example of operation of an information processing device according to Example 1-1.
Figure 8:
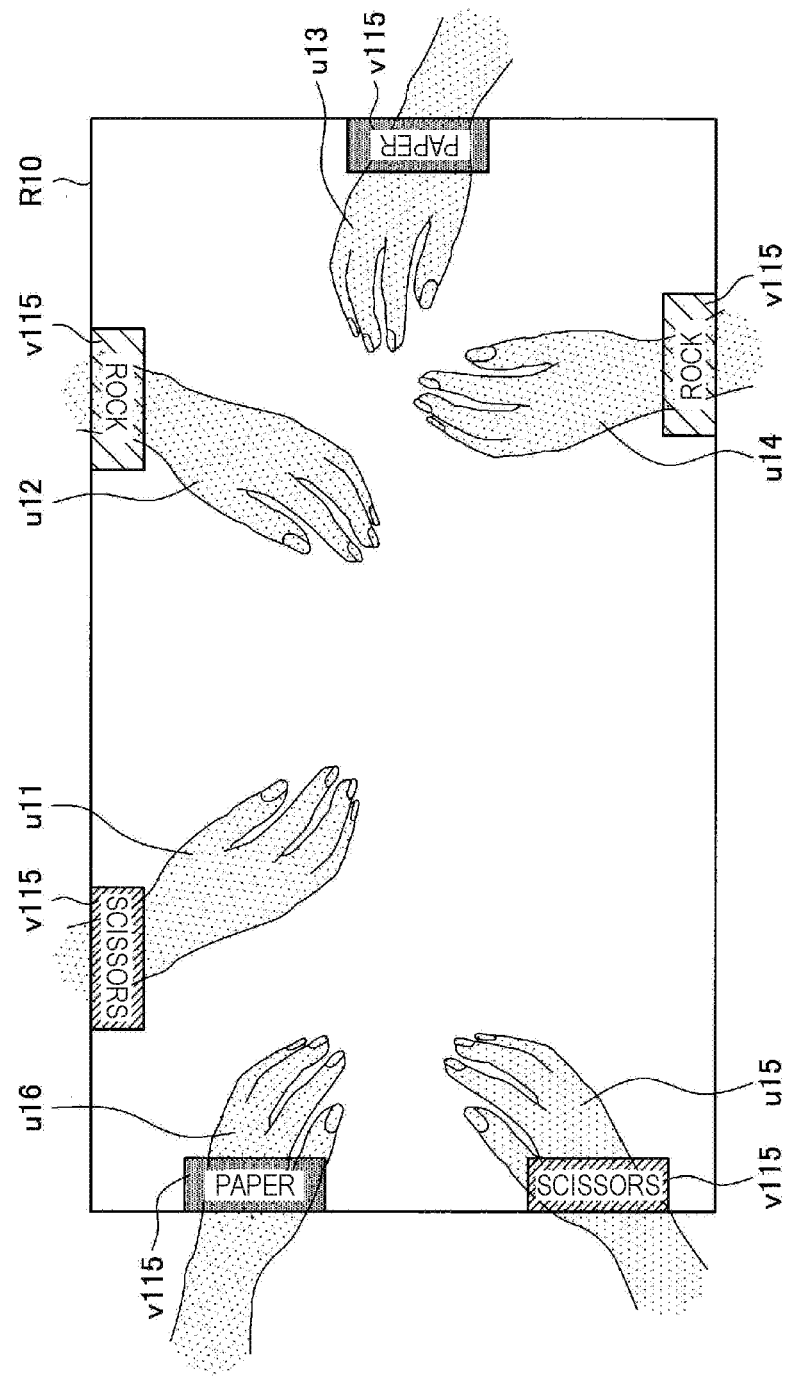
FIG. 8 is an explanatory diagram illustrating an example of operation of an information processing device according to Example 1-1.

First, an example of control in which the information processing device 100 recognizes the shape of the hand of each of a plurality of users and classifies a plurality of users into groups in accordance with a recognition result of the shape will be described with reference to FIGS. 6 to 8. FIGS. 6 to 8 are explanatory diagrams for describing an example of an operation of the information processing device 100 according to Example 1-1 and illustrate an example of control in which the information processing device 100 classifies a plurality of users into groups in accordance with a recognition result of a hand shape.

First, as illustrated in FIG. 6, the information processing device 100 gives an instruction to each user to take any one shape of a plurality of candidates as the shape of the hand. For example, in the example illustrated in FIG. 6, the information processing device 100 gives a notification indicating content of the instruction to each user by projecting display information viii for instructing the user to make his/her hand into any one shape of rock, paper, and scissors onto the display surface R10. Further, the information processing device 100 starts detection of the hand (that is, the manipulator) of each user placed in a predetermined detection range (for example, on the display surface R10).

Then, as illustrated in FIG. 7, each user is assumed to change his/her hand shape in accordance with the instruction content presented as the display information v111 by the information processing device 100. In the example illustrated in FIG. 7, the hand u12 indicates the shape of "rock." the hands u11 and u15 indicate the shape of "scissors," and the hands u13 and u16 indicate the shape of "paper." Further, the hand u14 indicates a shape for which it is difficult to determine whether it corresponds to any one of "rock," "scissors," or "paper." In other words, in the example illustrated in FIG. 7, the hands u11 to u13, u15, and u16 satisfy a condition indicated by the content instructed by the information processing device 100 (hereinafter also referred to as the "termination condition"), but the hand u14 does not satisfy the termination condition. In this case, for example, the information processing device 100 feeds information back to the user corresponding to the hand u14 not satisfying the termination condition to follow the instruction content indicated as the display information v111. Specifically, in the example illustrated in FIG. 7, the information processing device 100 projects notification information v113 indicating an instruction to cause the shape of the hand to be any shape out of the candidates indicated as the instruction content in association with the hand u14.

Further, in a case in which all target hands (that is, the hands u11 to u16) satisfy the termination condition, the information processing device 100 generates the attribute information for classifying the users corresponding to the hands into groups in accordance with the shapes of the target hands. For example, in the example illustrated in FIG. 7, the hands u11 and u15 indicate the shape of "scissors" (that is, the hands u11 and u15 indicate similar shapes). Therefore, the information processing device 100 classifies the users corresponding to the hands u11 and u15 into the same group. Similarly, in the example illustrated in FIG. 7, because the hands u13 and u16 indicate the shape of "paper," the information processing device 100 classifies the users corresponding to the hands u13 and u16 into the same group. Further, the hand u14 is assumed to indicate the shape of "rock." In this case, since the hands u12 and u14 indicate the shape of "rock," the information processing device 100 classifies the users corresponding to the hands u12 and u14 into the same group.

Then, the information processing device 100 executes various kinds of controls in accordance with the generated attribute information, that is, the attribute information for classifying a plurality of users into groups. For example, FIG. 8 illustrates an example in which the information processing device 100 presents display information v115 indicating the group to which each user belongs in association with the hand corresponding to the user on the basis of the generated attribute information. In the example illustrated in FIG. 8, the information processing device 100 specifies an approach position toward the region on the display surface R10 (that is, a position at which the arm of each user is inserted into the region) for the hand of each user and projects the display information v115 indicating the group to which the user belongs onto the position corresponding to the approach position. Further, a method of presenting information based on the attribute information illustrated in FIG. 8 is merely an example and is not necessarily limited to the example illustrated in FIG. 8. Further, other examples will be described later.

The example of control in which the information processing device 100 recognizes the shape of the hand of each of a plurality of users and classifies a plurality of users into groups in accordance with the recognition result of the shape has been described above with reference to FIGS. 6 to 8.
(Example of Classification into Groups According to Direction of Hand)

Figure 9:
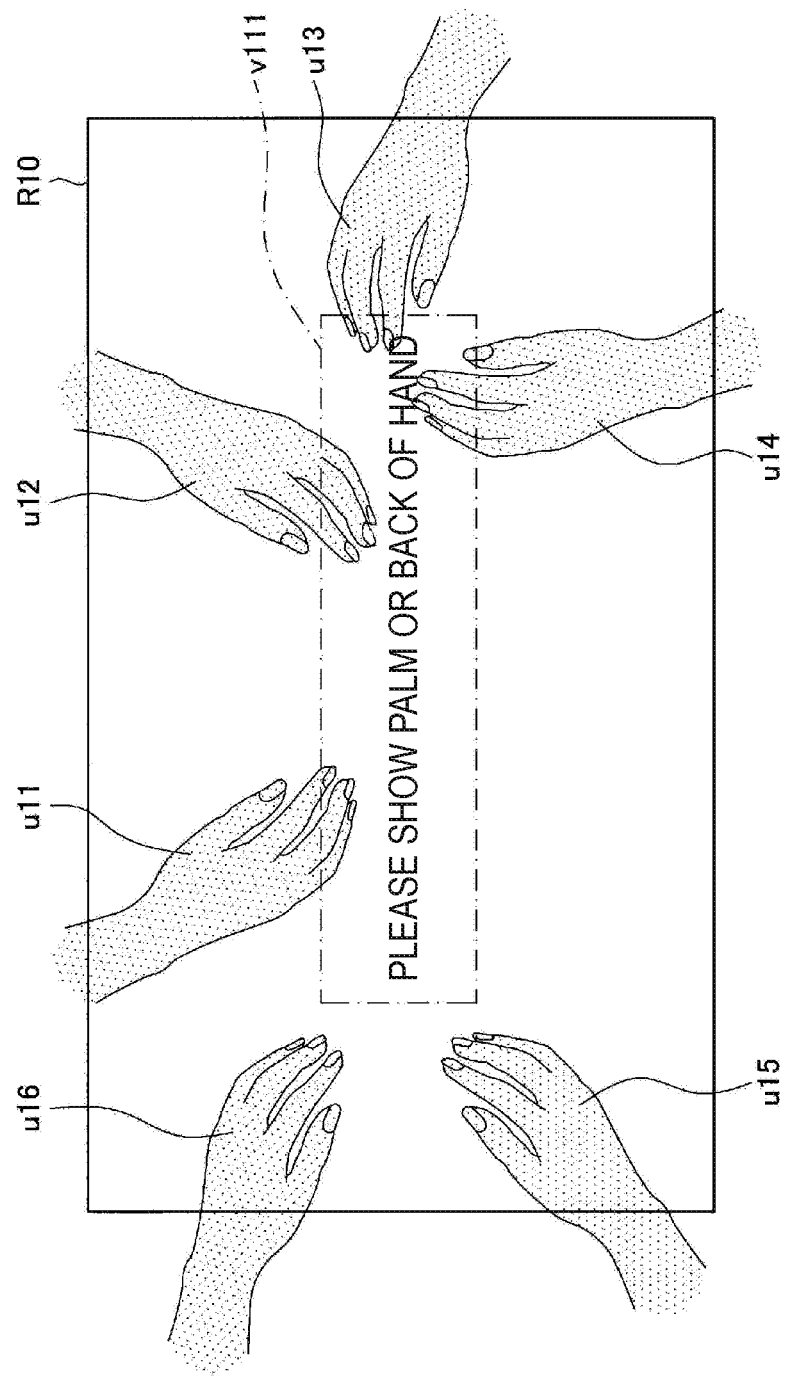
FIG. 9 is an explanatory diagram illustrating an example of operation of an information processing device according to Example 1-1.
Figure 10:
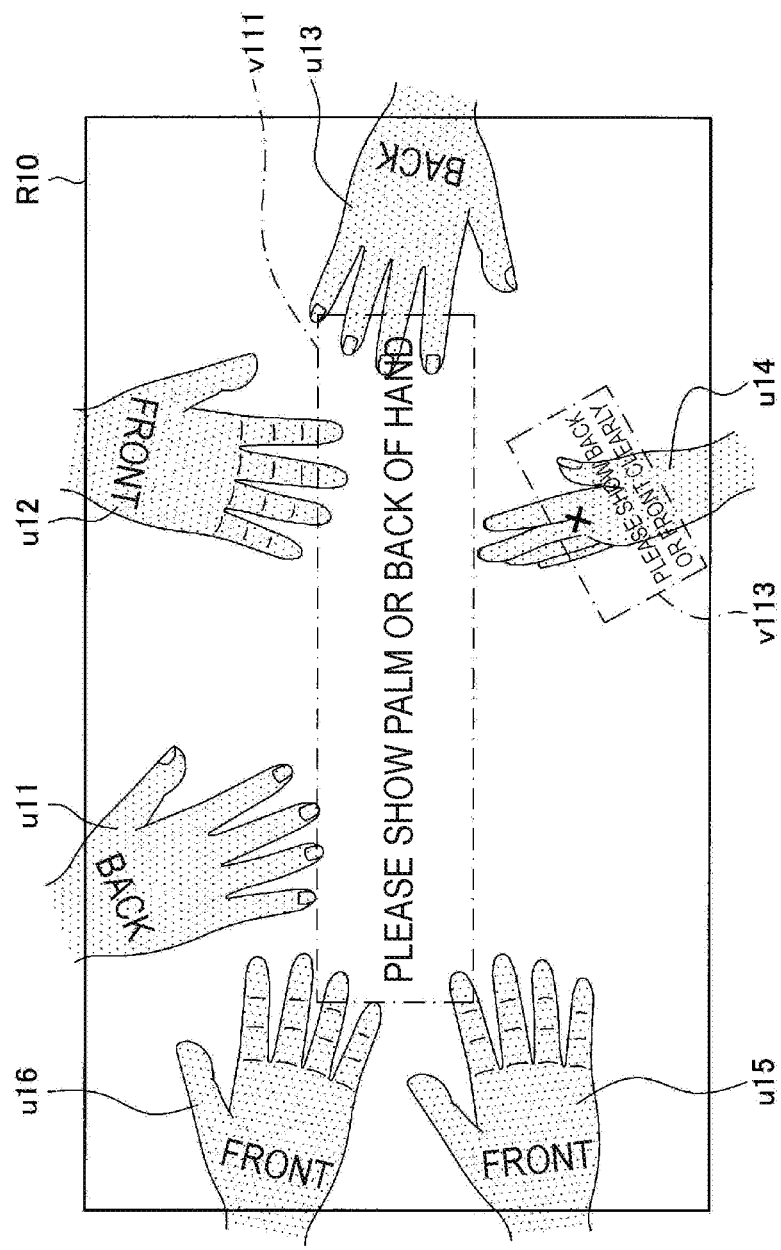
FIG. 10 is an explanatory diagram illustrating an example of operation of an information processing device according to Example 1-1.
Figure 11:
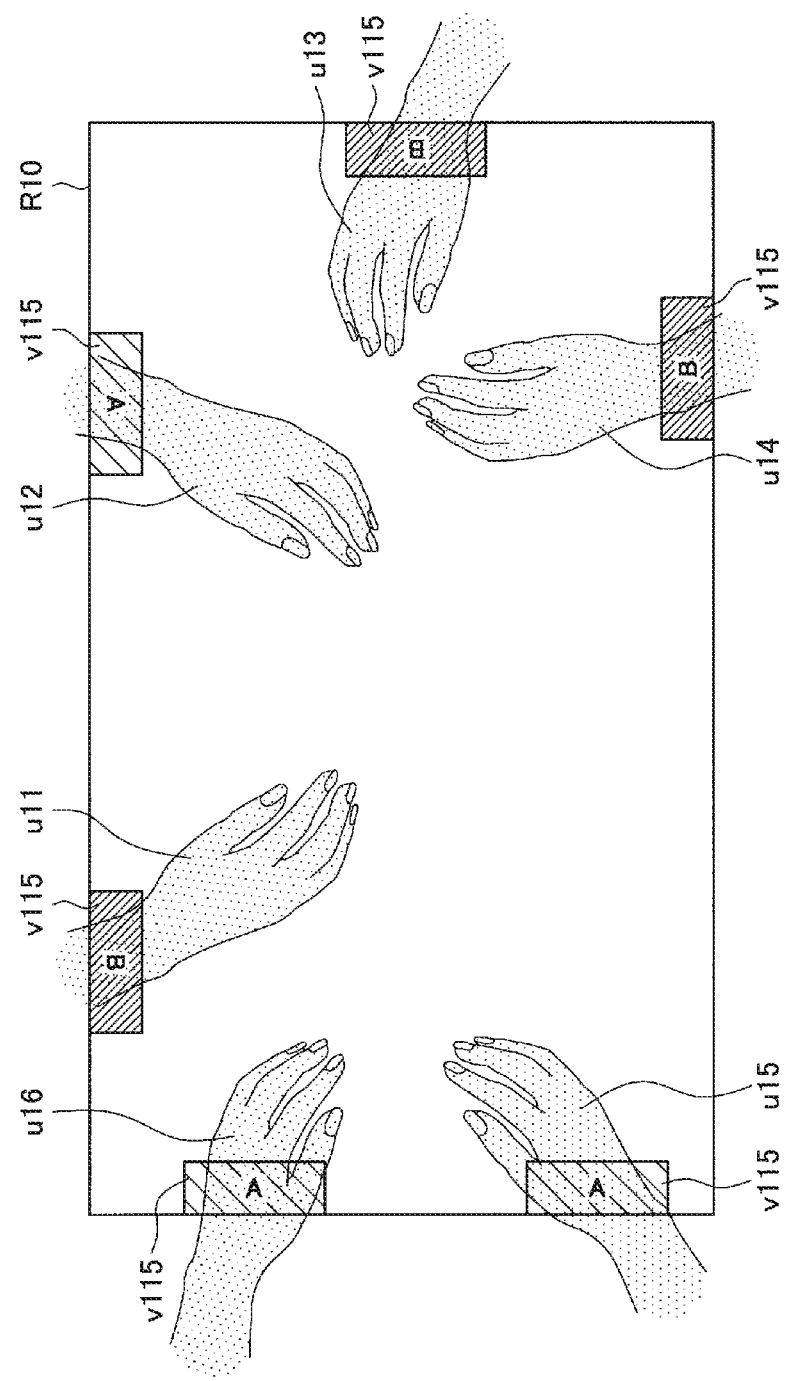
FIG. 11 is an explanatory diagram illustrating an example of operation of an information processing device according to Example 1-1.

Next, an example of control in which the information processing device 100 recognizes a direction of the hand of each of a plurality of users (that is, which of the palm of the hand and the back of the hand faces upward) and classifies a plurality of users into groups in accordance with a recognition result of the direction of the hand will be described with reference to FIGS. 9 to 11. FIGS. 9 to 11 are explanatory diagrams for describing an example of an operation of the information processing device 100 according to Example 1-1 and illustrate an example of control in which the information processing device 100 classifies a plurality of users into groups in accordance with a recognition result of a direction of a hand of a plurality of users.

First, as illustrated in FIG. 9, the information processing device 100 gives an instruction to each user to present one of the palm of the hand and the back of the hand. In the example illustrated in FIG. 9, the information processing device 100 gives a notification indicating content of the instruction to each user by projecting the display information v111 onto the display surface R10. Further, the information processing device 100 starts detection of the hand of each user (that is, the manipulator) placed in a predetermined detection range (for example, the region on the display surface R10).

Further, the method is not particularly limited as long as the information processing device 100 can recognize which of the "palm of the hand (front side)" and the "back of the hand (back side)" each user presents. For example, the information processing device 100 may analyze an image obtained by imaging the hand of each user and recognize which of the "palm of the hand (front side)" and the "back of the hand (back side)" each user presents in accordance with the feature of the shape of the hand or a feature of a pattern of the hand (for example, wrinkles on the palm of the hand). Of course, the above-described example is merely an example, and the present disclosure is not necessarily limited to the example described above.

Then, as illustrated in FIG. 10, each user is assumed to change his/her hand shape in accordance with the instruction content presented as the display information v111 by the information processing device 100. In the example illustrated in FIG. 10, the hands u12, u15, and u16 indicate the "palm of the hand (front side)," and the hands u11 and u13 indicate the "back of the hand (back side)." Further, the hand u14 indicates a direction in which it is ambiguous to determine one of the "palm of the hand (front side)" and the "back of the hand (back side)." In other words, in the example illustrated in FIG. 10, the hands u11 to u13, u15, and u16 satisfy the termination condition, and the hand u14 does not satisfy the termination condition. In this case, for example, the information processing device 100 projects the notification information v113 indicating an instruction to the user corresponding to the hand u14 not satisfying the termination condition to present any one of the palm of the hand and the back of the hand. Further, in the following description, the hand u14 will be described as indicating the "back of the hand (back side)" in response to the instruction.

Further, in a case in which all target hands (that is, the hands u11 to u16) satisfy the termination condition, the information processing device 100 generates the attribute information for classifying the users corresponding to the hands into groups in accordance with the shapes of the target hands. More specifically, the information processing device 100 classifies the users corresponding to the hands u12, u15, and u16 indicating the "palm of the hand (front side)" into the same group. Similarly, the information processing device 100 classifies the users corresponding to the hands u11, u13, and u14 indicating the "back of the hand (back side)" into the same group.

Then, the information processing device 100 executes various kinds of controls in accordance with the generated attribute information, that is, the attribute information for classifying a plurality of users into groups. For example, FIG. 11 illustrates an example in which the information processing device 100 presents display information v115 indicating the group to which each user belongs in association with the hand corresponding to the user on the basis of the generated attribute information. In the example illustrated in FIG. 11, the information processing device 100 classifies the users presenting the "palm of the hand (front side)" into a "group A," classifies the user presenting the "back of the hand (back side)" into a "group B," and presents the display information v115 indicating the group to which each user belongs. Further, since the method of presenting the display information v115 illustrated in FIG. 11 is similar to the example illustrated in FIG. 8, detailed description thereof is omitted.

The example of control in which the information processing device 100 recognizes the direction of the hand of each of a plurality of users and classifies a plurality of users into groups in accordance with the recognition result of the direction of the hand has been described above with reference to FIGS. 9 to 11.

(Example of Classification into Groups According to Manipulation on Display Information)

Figure 12:
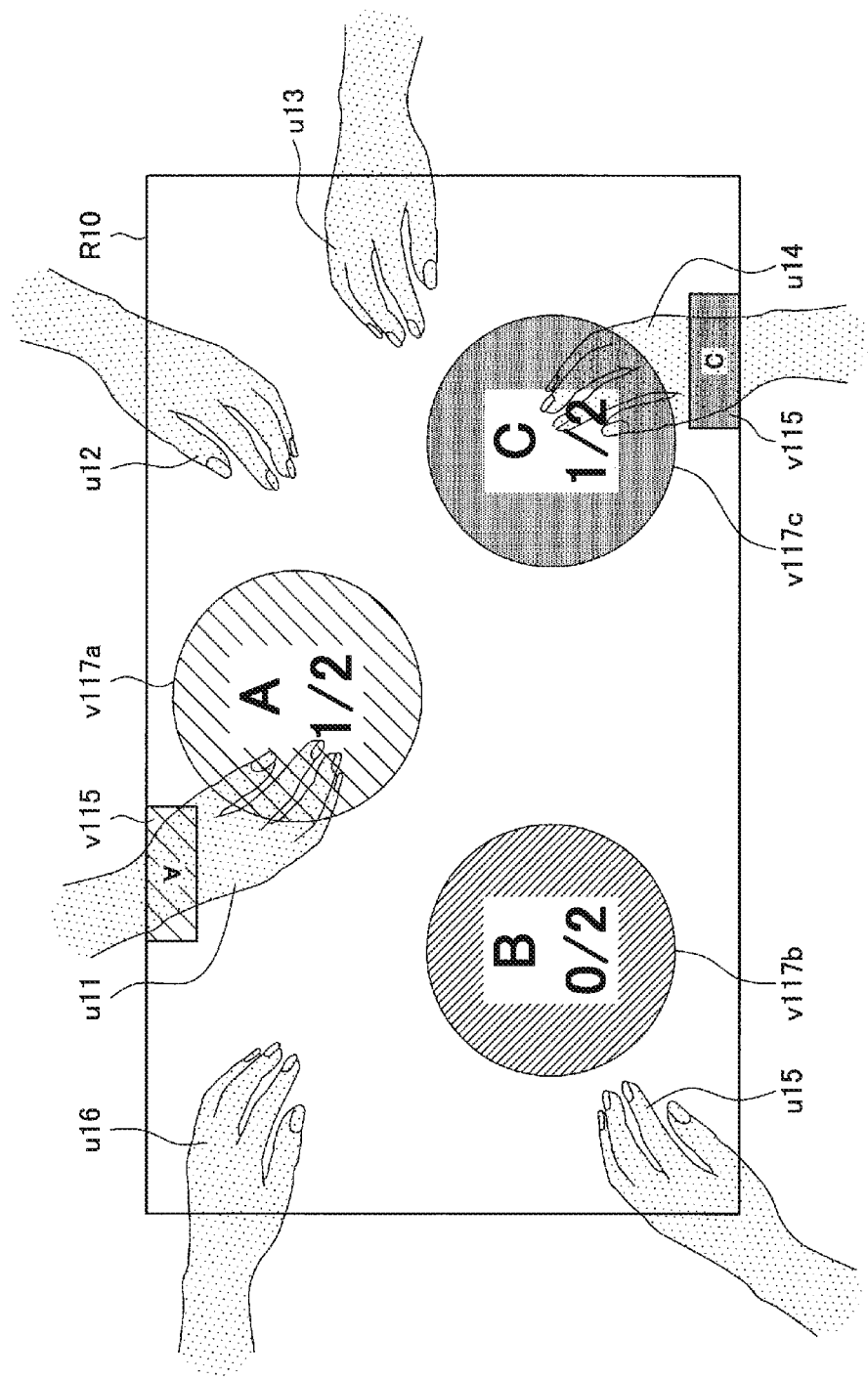
FIG. 12 is an explanatory diagram illustrating an example of operation of an information processing device according to Example 1-1.
Figure 13:
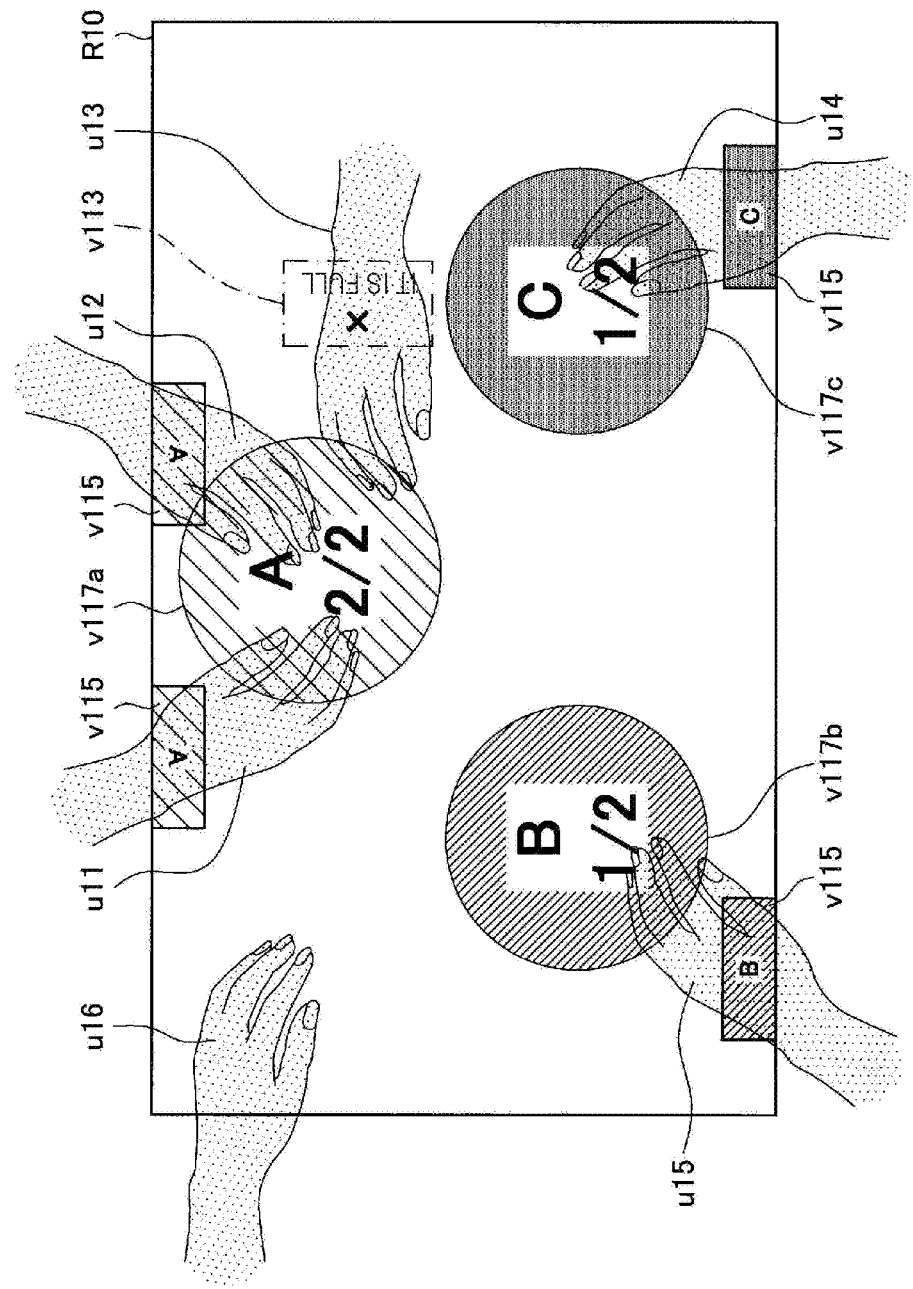
FIG. 13 is an explanatory diagram illustrating an example of operation of an information processing device according to Example 1-1.
Figure 14:
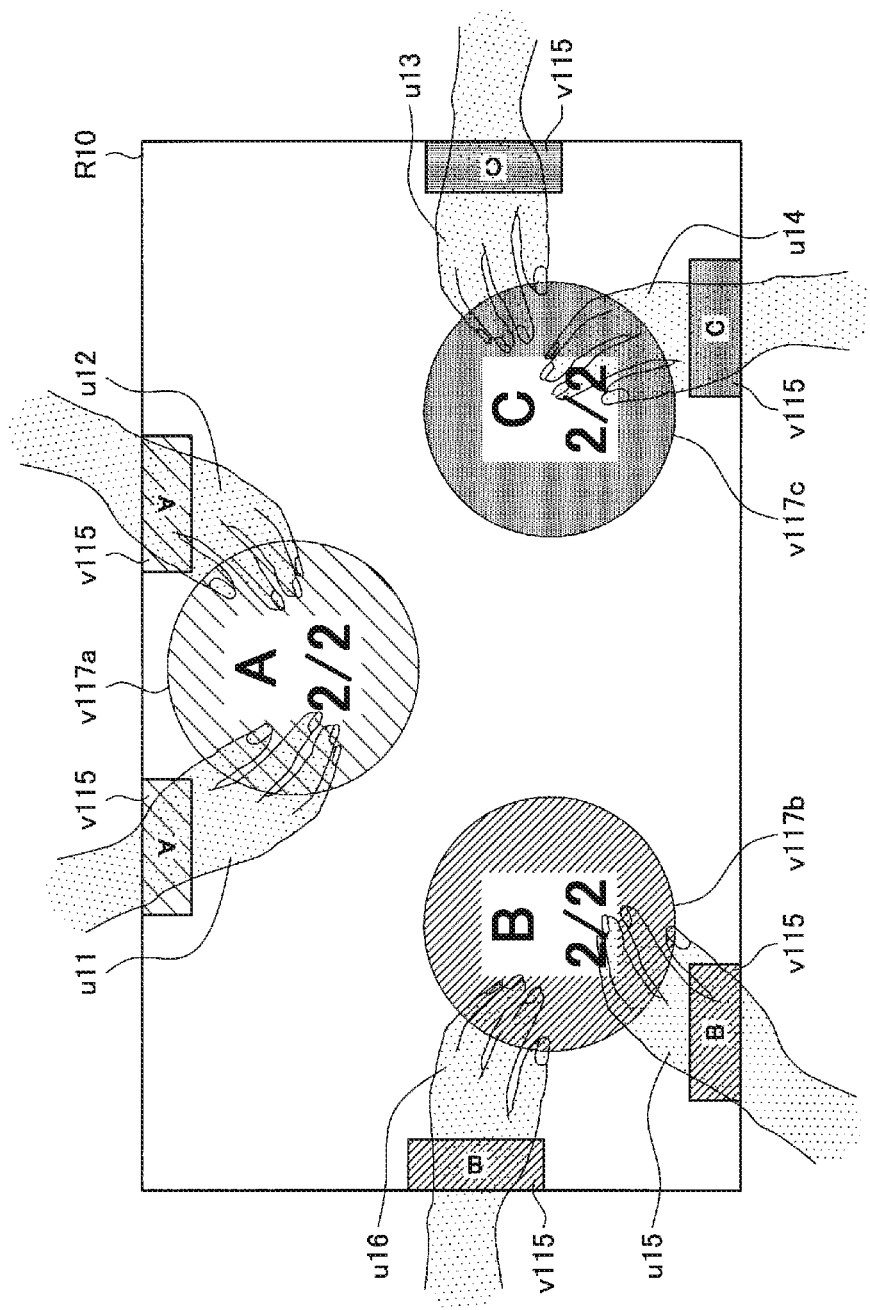
FIG. 14 is an explanatory diagram illustrating an example of operation of an information processing device according to Example 1-1.

Next, an example of control in which the information processing device 100 presents predetermined display information and classifies a plurality of users into groups in accordance with a manipulation performed on the display information by each of a plurality of users will be described with reference to FIGS. 12 to 14. FIGS. 12 to 14 are explanatory diagrams for describing an example of an operation of the information processing device 100 according to Example 1-1 and illustrate an example of control in which the information processing device 100 classifies a plurality of users into groups in accordance with a manipulation on a predetermined display information by a plurality of users.

Specifically, as illustrated in FIG. 12, the information processing device 100 projects display information v117 corresponding to each group onto the display surface R10. For example, in the example illustrated in FIG. 12, the information processing device 100 projects display information v117a to v117c corresponding to three groups "group A" to "group C" onto the display surface R10. In this case, the information processing device 100 classifies a plurality of users into three groups "group A" to "group C." Further, in the following description, in a case in which the display information v117a to v117c is not particularly distinguished, they are also referred to simply as "display information v117." Further, the information processing device 100 starts detection of the hand of each user placed in a predetermined detection range (for example, the region on the display surface R10).

In a case in which a manipulation (for example, a touch manipulation) performed on the display information v117a to v117c by the hand of each user is detected, the information processing device 100 classifies the user corresponding to the hand which is a subject of the manipulation into a group corresponding to display information v117 which is a manipulation target. For example, in the example illustrated in FIG. 9, the hand u11 touches the display information v117a. Therefore, the information processing device 100 classifies the user corresponding to the hand u11 into the "group A" corresponding to the display information v117a. Further, at this time, the information processing device 100 presents the display information v115 indicating that the hand u11 belongs to the "group A" in association with the hand u111. Similarly, in the example illustrated in FIG. 12, the hand u14 touches the display information v117c. Therefore, the information processing device 100 classifies the user corresponding to the hand u14 into the "group C" corresponding to the display information v117c.

Further, the information processing device 100 may set a predetermined constraint in a case in which a plurality of users are classified into groups. For example, FIG. 13 illustrates an example of control in a case in which a predetermined constraint is set to classification of a plurality of users into groups. For example, in the example illustrated in FIG. 13, the number of users who can belong to each of the "group A" to the "group C" is limited to two. In this case, the information processing device 100 may present information indicating the capacity of a corresponding group as the display information v117 or may present the number of users classified into a corresponding group in real time.

Further, in the example illustrated in FIG. 13, a situation in which the hand u13 further touches the display information v117a in a state in which the hands u11 and u12 are touching the display information v117a, and the number of users belonging to the "group A" already reaches the capacity. In this case, the information processing device 100 presents the notification information v113 indicating that the capacity of the "group A" is already reached in association with the hand u13.

Further, in a case in which all target hands (that is, the hands u11 to u16) satisfy the termination condition, the information processing device 100 generates the attribute information for classifying the users corresponding to the hands into groups in accordance with the shapes of the target hands. For example, FIG. 14 illustrates an example of a state in which all hands satisfy the termination condition. More specifically, the information processing device 100 classifies the users corresponding to the hands u11 and u12 touching the display information v117a into the "group A" corresponding to the display information v117a. Similarly, the information processing device 100 classifies the users corresponding to the hands u15 and u16 touching the display information v117b into the "group B" corresponding to the display information v117b. Further, the information processing device 100 classifies the users corresponding to the hands u13 and u14 touching the display information v117c into the "group C" corresponding to the display information v117c.

The example of control in which the information processing device 100 presents predetermined display information and classifies a plurality of users into groups in accordance with a manipulation performed on the display information by each of a plurality of users has been described above with reference to FIGS. 12 to 14.

(Example of Classification into Groups According to Position Relation of Plurality of Hands)

Figure 15:
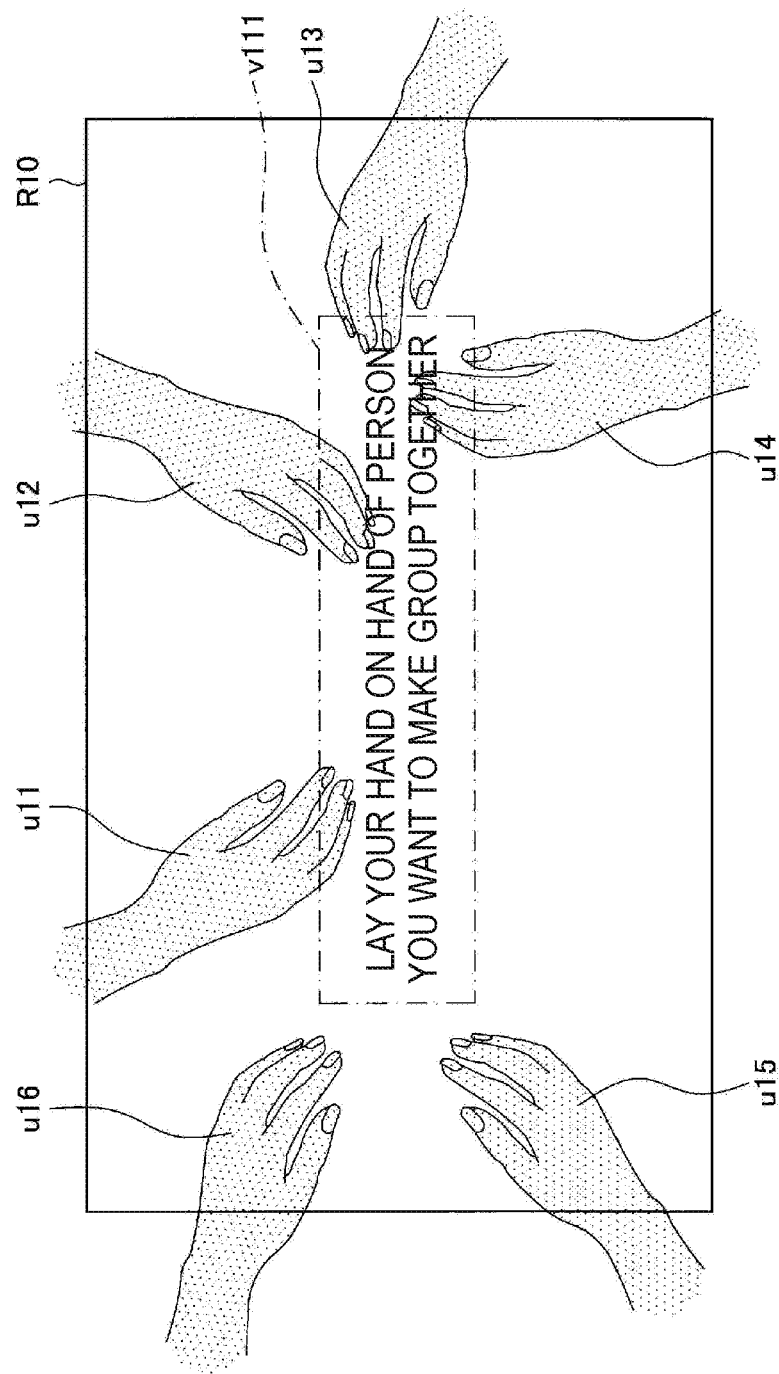
FIG. 15 is an explanatory diagram illustrating an example of operation of an information processing device according to Example 1-1.
Figure 16:
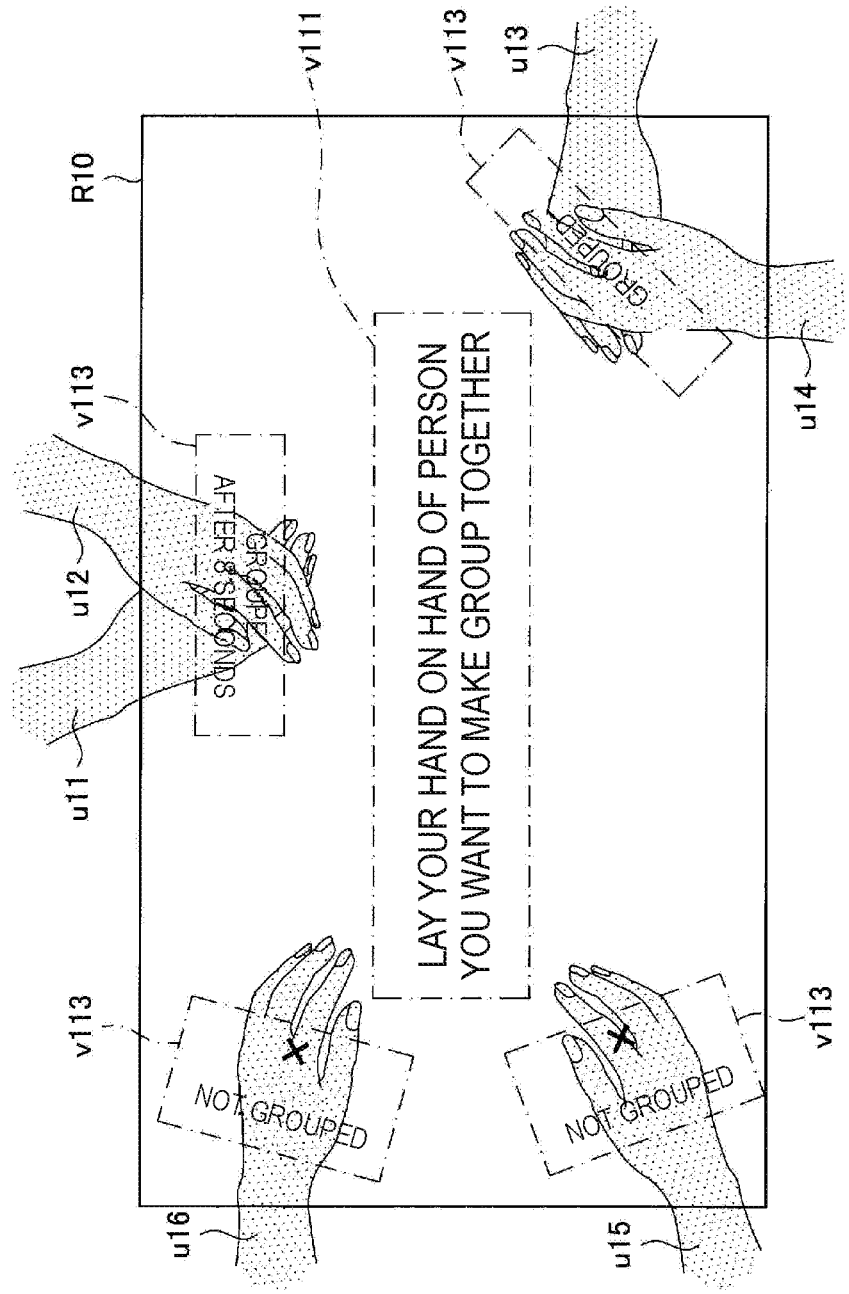
FIG. 16 is an explanatory diagram illustrating an example of operation of an information processing device according to Example 1-1.
Figure 17:
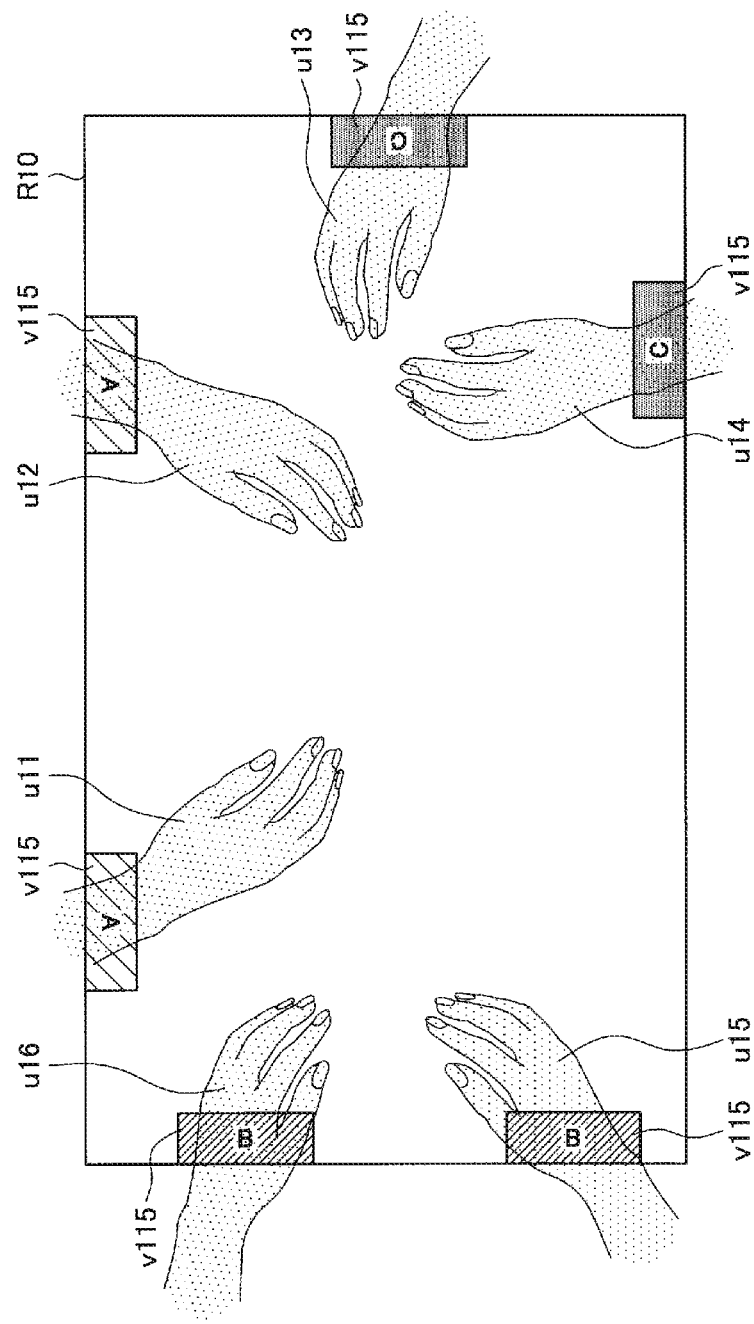
FIG. 17 is an explanatory diagram illustrating an example of operation of an information processing device according to Example 1-1.

Next, an example of control in which the information processing device 100 classifies a plurality of users into groups in accordance with a position relation of the hands of a plurality of users will be described with reference to FIGS. 15 to 17. FIGS. 15 to 17 are explanatory diagrams for describing an example of an operation of the information processing device 100 according to Example 1-1 and illustrate an example of control in which the information processing device 100 classifies a plurality of users into groups in accordance with the position relation of the hands of a plurality of users. Further, the present description will proceed with an example in which the information processing device 100 classifies the users corresponding to a plurality of hands overlapping each other (that is, a plurality of hands positioned close to each other) into the same group.

First, as illustrated in FIG. 15, the information processing device 100 gives an instruction to urge the users who desire to make a group together to overlap their hands. In the example illustrated in FIG. 15, the information processing device 100 gives a notification indicating content of the instruction to each user by projecting the display information v111 onto the display surface R10. Further, the information processing device 100 starts detection of the hand of each user (that is, the manipulator) placed in a predetermined detection range (for example, the region on the display surface R10).

Then, as illustrated in FIG. 16, each user is assumed to overlap the hand with the hand of a person who desires to make a group together in accordance with the instruction content presented as the display information v111 by the information processing device 100. More specifically, FIG. 16 illustrates a state in which the hand u11 and the hand u12 overlap, and the hand u13 and the hand u14 overlap. Further, in the example illustrated in FIG. 16, the hand u15 and the hand u16 do not overlap with any one hand.

At this time, the information processing device 100 may classify the users corresponding to a plurality of hands into the same group, for example, in a case in which a state in which a plurality of hands overlap continues for a predetermined period or more. For example, in the example illustrated in FIG. 16, the predetermined period is assumed not to elapse after the hand u11 and the hand u12 overlap. In this case, the information processing device 100 may present the notification information v113 presenting a remaining time until the predetermined period elapses in association with the hands u11 and u12 overlapping each other. Then, after the predetermined period elapses, the information processing device 100 classifies the users corresponding to the hands u11 and u12 overlapping each other into the same group.

Further, in the example illustrated in FIG. 16, the predetermined period is assumed to have already elapsed after the hand u13 and the hand u14 overlap with each other. In this case, the information processing device 100 classifies the users corresponding to the hands u13 and u14 overlapping each other into the same group. Further, at this time, the information processing device 100 may present the notification information v113 indicating a group associated with the users corresponding to the hands u13 and u14 in association with the hands u13 and u14.

Further, the information processing device 100 may present the notification information v113 indicating that the hands u15 and u16 not overlapping with any one hand are not classified into groups in association with the hands u15 and u16.

Then, in a case in which all the target hands (that is, the hands u11 to u16) satisfy the termination condition (that is, in a case in which all the hands overlap with any one hand), the information processing device 100 generates the attribute information for classifying the user corresponding to each of the hands overlapping each other into the same group. For example, FIG. 17 illustrates an example of a state in which all the hands satisfy the termination condition. In the example illustrated in FIG. 17, the users corresponding to the hand u11 and the hand u12 are classified into the same group (the group A). Similarly, the users corresponding to the hand u15 and the hand u16 are classified into the same group (the group B). Further, the users corresponding to the hand u13 and the hand u14 are classified into the same group (the group C). Further, similarly to the other examples described above, the information processing device 100 may present the display information v115 indicating the group to which each user belongs in association with the hand corresponding to the user on the basis of the generated attribute information.

The example of control in which the information processing device 100 classifies a plurality of users into groups in accordance with the position relation of a plurality of users has been described above with reference to FIGS. 15 to 17.

(Example of Classification into Groups According to Motion of Hand)

Figure 18:
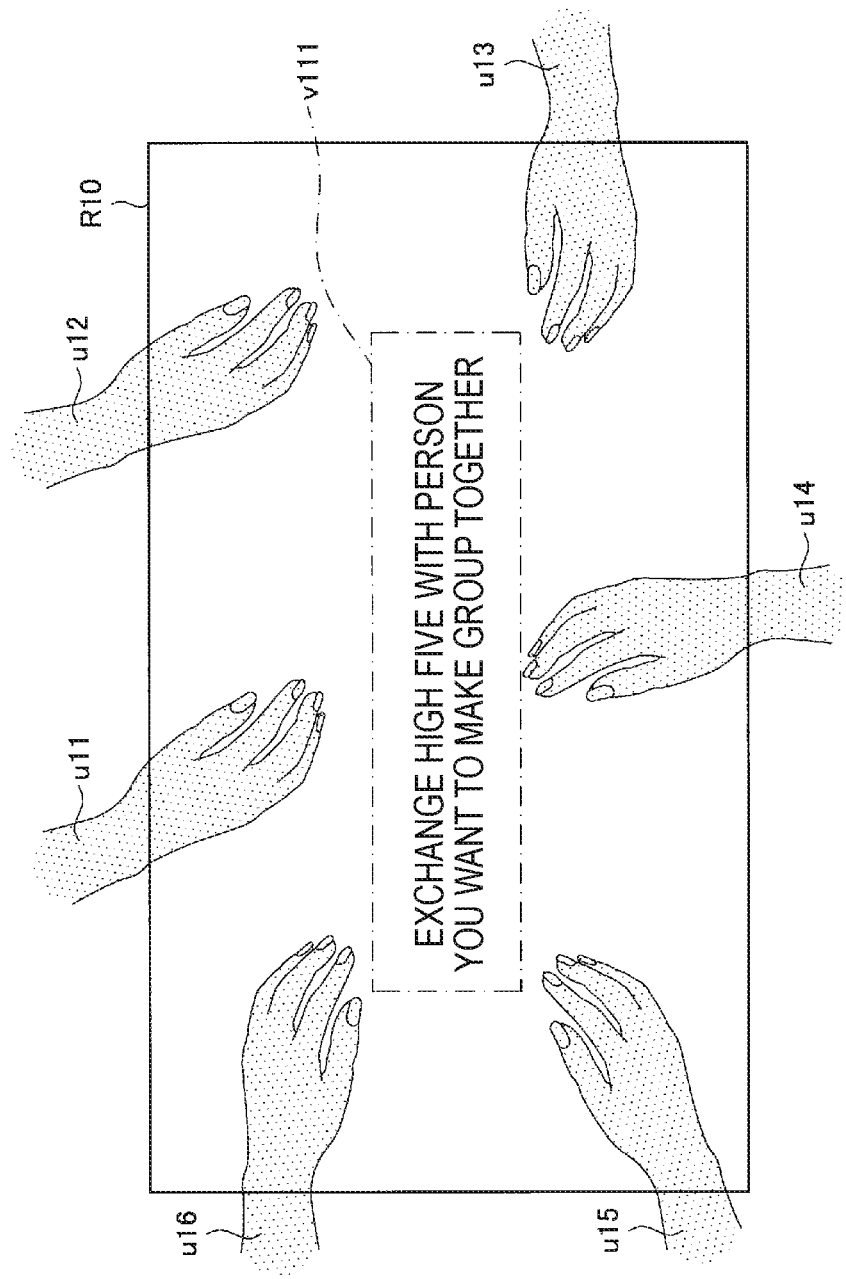
FIG. 18 is an explanatory diagram illustrating an example of operation of an information processing device according to Example 1-1.
Figure 19:
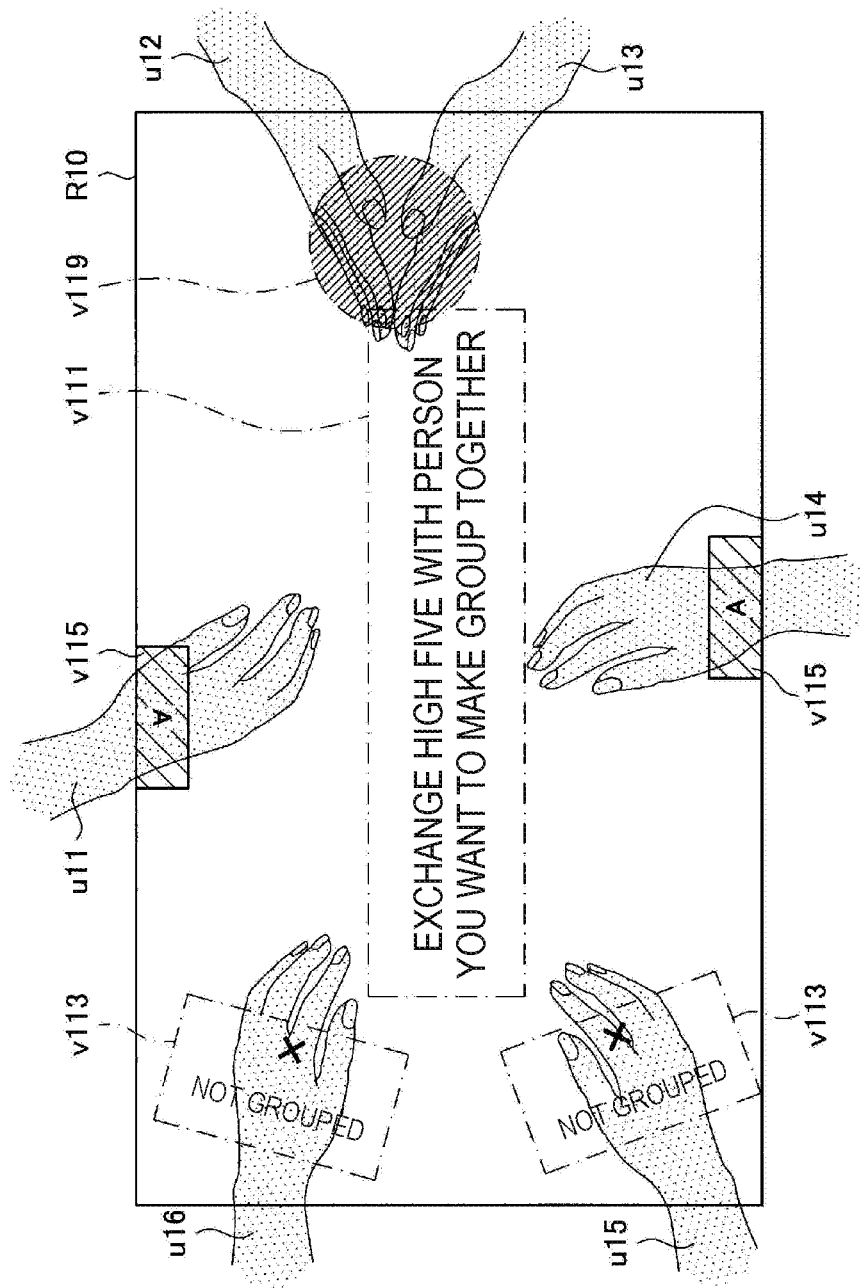
FIG. 19 is an explanatory diagram illustrating an example of operation of an information processing device according to Example 1-1.
Figure 20:
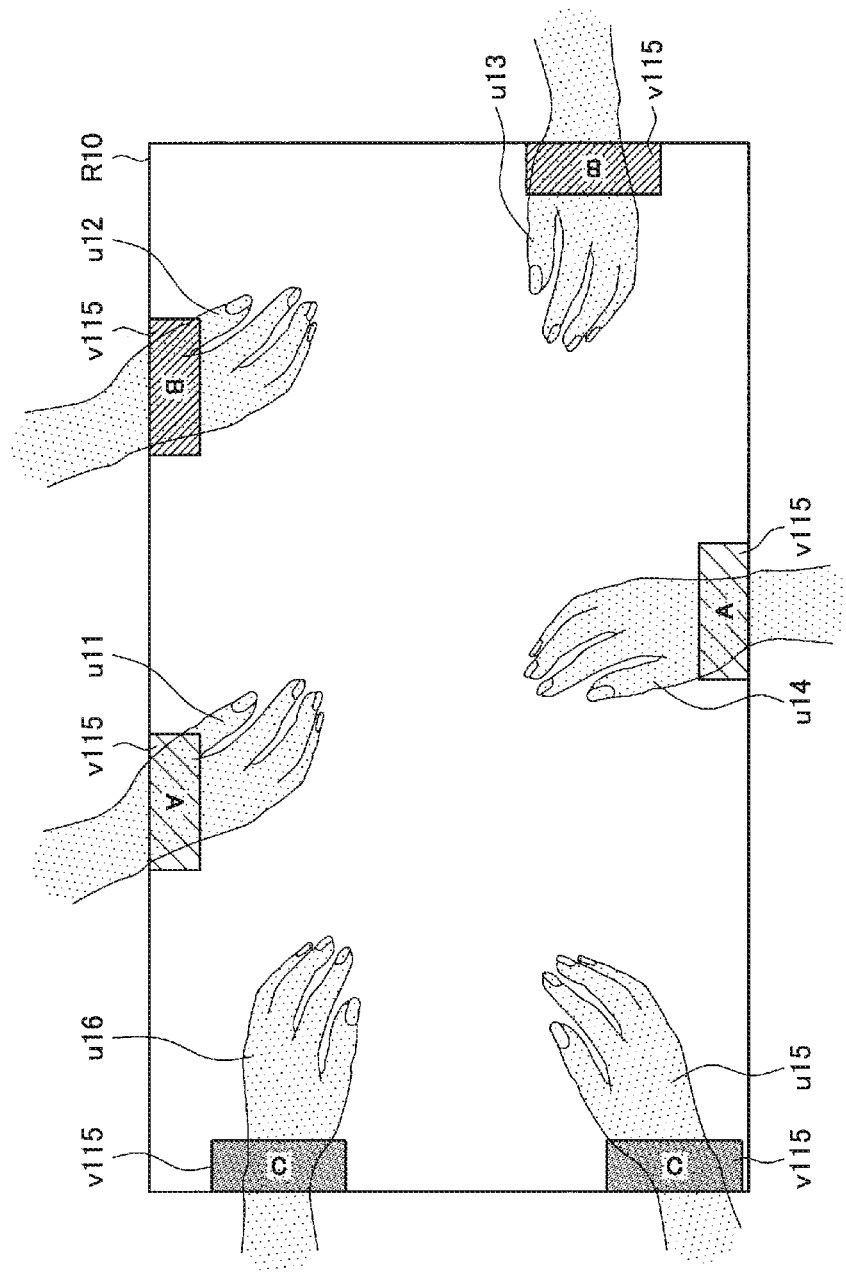
FIG. 20 is an explanatory diagram illustrating an example of operation of an information processing device according to Example 1-1.

Next, an example of control in which the information processing device 100 classifies a plurality of users into groups in accordance with a motion of the hand of each of a plurality of users will be described with reference to FIGS. 18 to 20. FIGS. 18 to 21 are explanatory diagrams for describing an example of an operation of the information processing device 100 according to Example 1-1 and illustrate an example of control in which the information processing device 100 classifies a plurality of users into groups in accordance with the motion of the hand of each of a plurality of users. Further, the present description will proceed with an example in which the information processing device 100 classifies the users corresponding to a plurality of hands into the same group in a case in which an operation in which a plurality of hands touch each other with the palm of the hand (for example, a high five operation) is detected.

First, as illustrated in FIG. 18, the information processing device 100 gives an instruction to exchange a high five with the user who desires to make a group together to each user. In the example illustrated in FIG. 18, the information processing device 100 gives a notification indicating content of the instruction to each user by projecting the display information v111 onto the display surface R10. Further, the information processing device 100 starts detection of the hand of each user (that is, the manipulator) placed in a predetermined detection range (for example, the region on the display surface R10).

Then, as illustrated in FIG. 19, at least some users are assumed to exchange a high five with the user who desires to make a group together in accordance with the instruction content presented as the display information v111 by the information processing device 100.

For example, in the example illustrated in FIG. 19, the hand u12 and the hand u13 exchange a high five. In this case, the information processing device 100 classifies the users corresponding to the hands u12 and u13 who exchange the high five into the same group. Further, in a case in which the high five of the hand u12 and the hand u13 is detected, the information processing device 100 may give a notification indicating that the high five is detected to the users of the hands u12 and u13. For example, in the example illustrated in FIG. 19, the information processing device 100 presents display information v119 (for example, a marker for highlighting or the like) indicating that the high five is detected in association with the hands u12 and u13.

Further, in the example illustrated in FIG. 19, the high five has already been completed by the hand u11 and the hand u14, and the users corresponding to the hands u11 and u14 are already classified into the same group. In this case, the information processing device 100 may present, for example, the display information v115 indicating that the users corresponding to the hands u11 and u14 are classified into the same group (for example, the group A) in association with the hands u11 and u14.

Further, the information processing device 100 may present the notification information v113 indicating that the hands u15 and u16 which do not exchange the high five with any one hand are not classified into a group in association with the hands u15 and u16.

Then, in a case in which all the target hands (that is, the hands u11 to u16) satisfy the termination condition (that is, in a case in which all the hands exchange the high five with any one hand), the information processing device 100 generates the attribute information for classifying the users corresponding to a plurality of hands exchanging the high five into the same group. For example, FIG. 20 illustrates an example of a state in which all the hands satisfy the termination condition. In the example illustrated in FIG. 20, the users corresponding to the hand u11 and the hand u14 are classified into the same group (the group A). Similarly, the users corresponding to the hand u12 and the hand u13 are classified into the same group (the group B). Further, the users corresponding to the hand u15 and the hand u16 are classified into the same group (the group C). Further, similarly to the other examples described above, the information processing device 100 may present the display information v115 indicating the group to which each user belongs in association with the hand corresponding to the user on the basis of the generated attribute information.

The example of control in which the information processing device 100 classifies a plurality of users into groups in accordance with the motion of the hand of each of a plurality of users has been described above with reference to FIGS. 18 to 20.

1.5.2. Example 1-2: One Example of Presenting Method of Associated Group

Then, an example of a method in which the information processing device 100 presents a group to which each user belongs on the basis of the attribute information for classifying a plurality of users into groups (that is, the attribute information for associating a plurality of manipulators) will be described as Example 1-2. Further, in the present embodiment, unless otherwise specified, an example in which the information processing device 100 classifies the users (that is, six users) corresponding in number to hands u11 to u16 placed in a predetermined detection range (for example, the region on the display surface R10) into a plurality of groups will be described.

Figure 21:
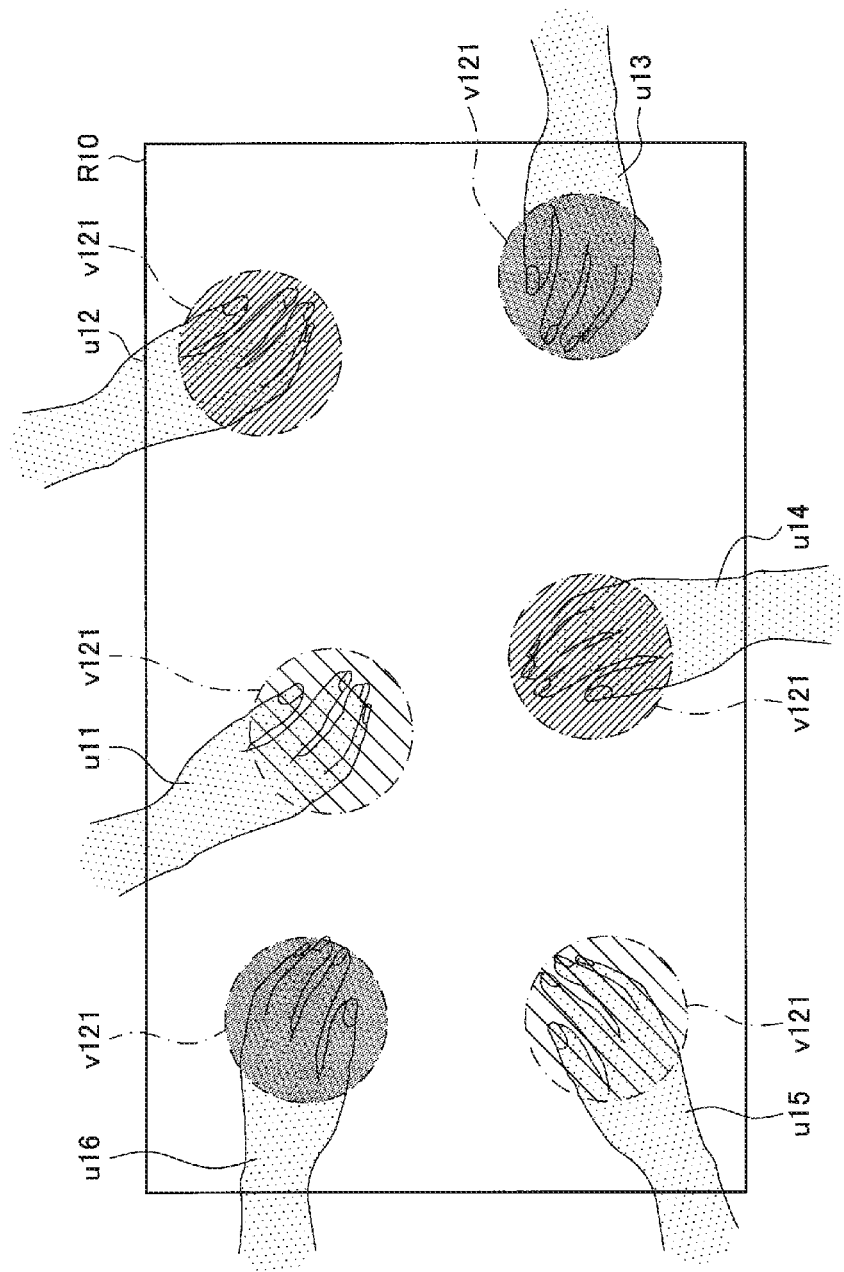
FIG. 21 is an explanatory diagram illustrating an example of operation of an information processing device according to Example 1-2.

For example, FIG. 21 is an explanatory diagram for describing an example of an operation of the information processing device 100 according to Example 1-2 and illustrate an example of a method of presenting the group to which each user belongs through the information processing device 100. In the example illustrated in FIG. 21, the information processing device 100 presents display information v121 indicated by a color corresponding to a groups to which the user belongs around the hand of each user (that is, the hands u11 to u16) on the basis of the generated attribute information.

Figure 22:
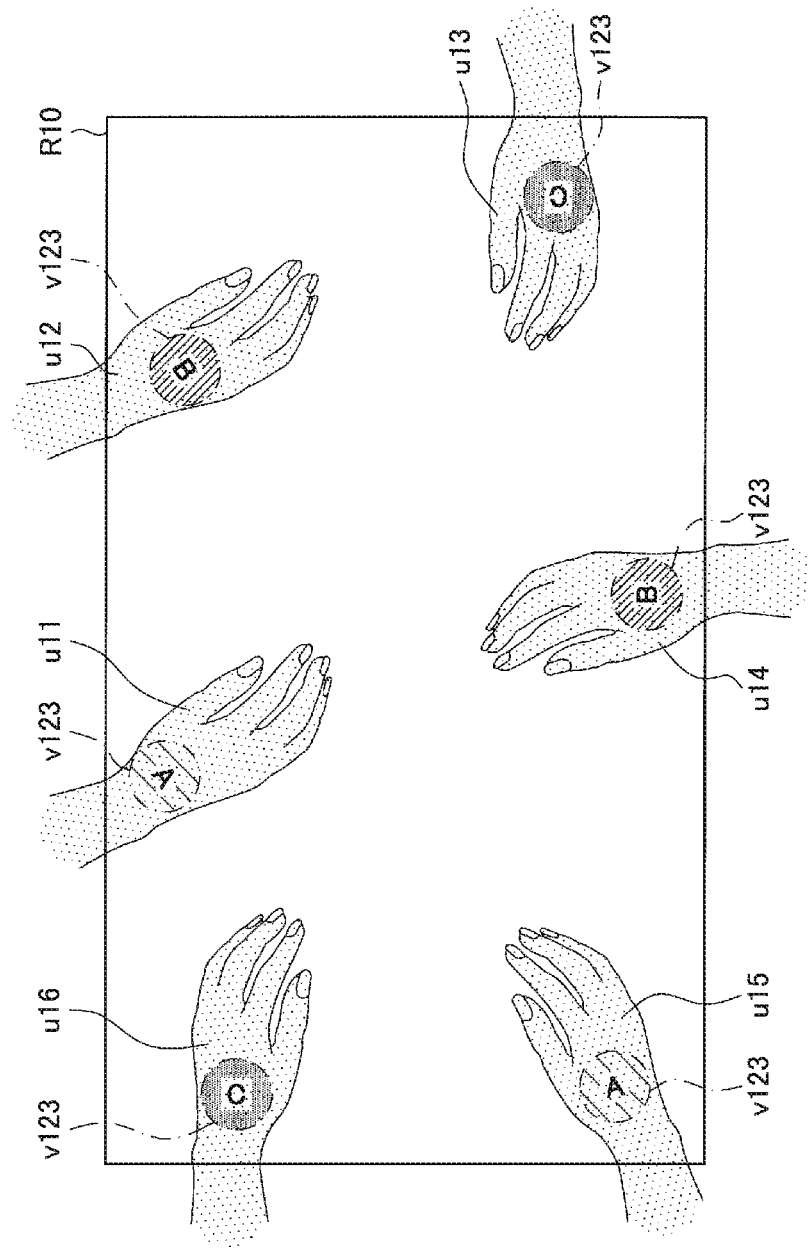
FIG. 22 is an explanatory diagram illustrating an example of operation of an information processing device according to Example 1-2.

Further. FIG. 22 is an explanatory diagram for describing an example of an operation of the information processing device 100 according to Example 1-2 and illustrates another example of a method of a presenting group to which each user belongs through the information processing device 100. In the example illustrated in FIG. 22, the information processing device 100 presents display information v123 indicated by information indicating the group to which the user belongs to overlap the hand of each user (that is, on the hands u11 to u16) (for example, on the back of the hand) on the basis of the generated attribute information.

Figure 23:
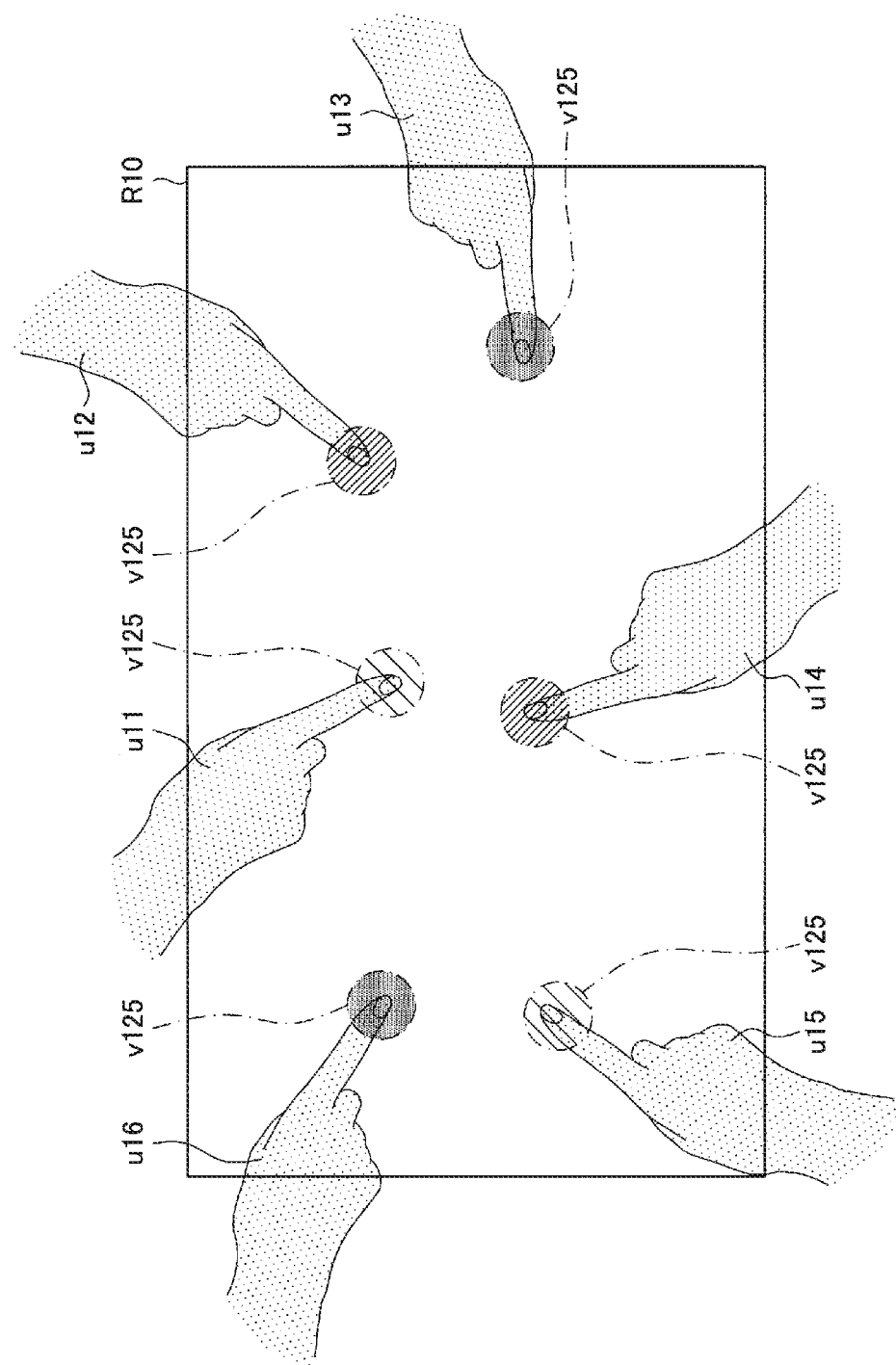
FIG. 23 is an explanatory diagram illustrating an example of operation of an information processing device according to Example 1-2.

Further, FIG. 23 is an explanatory diagram for describing an example of an operation of the information processing device 100 according to Example 1-2 and illustrates another example of a method of a presenting group to which each user belongs through the information processing device 100. In the example illustrated in FIG. 23, the information processing device 100 presents display information v125 indicated by a color corresponding to a groups to which the user belongs around a fingertip of the hand of each user (that is, the hands u11 to u16) on the basis of the generated attribute information.

Further, the above-described example is merely an example, and a type of information presented by the information processing device 100 in accordance with the attribute information or a display form of the information is not particularly limited as long as information that enables each user to identify the group to which each user belongs is presented.

The example of the method in which the information processing device 100) presents a group to which each user belongs on the basis of the attribute information for classifying a plurality of users into groups (that is, the attribute information for associating a plurality of manipulators) has been described as Example 1-2.

1.5.3. Example 1-3: One Example of Cooperation with External Terminal

Figure 24:
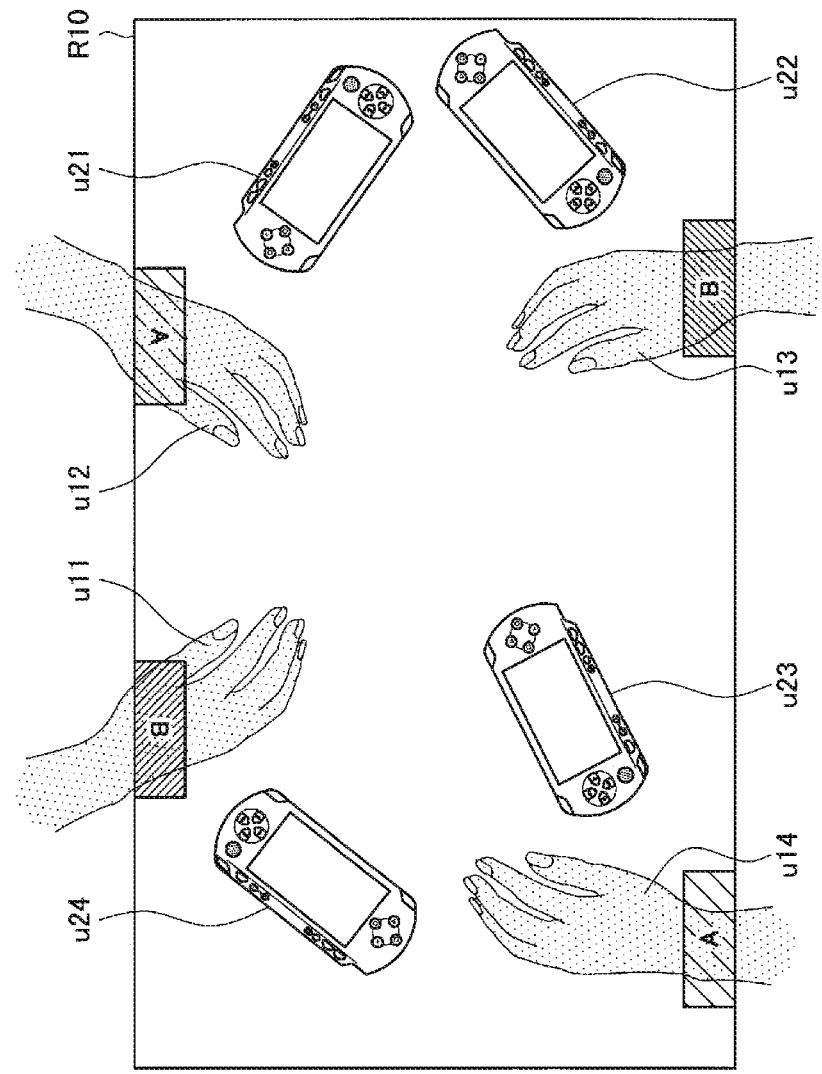
FIG. 24 is an explanatory diagram illustrating an example of operation of an information processing device according to Example 1-3.
Figure 25:
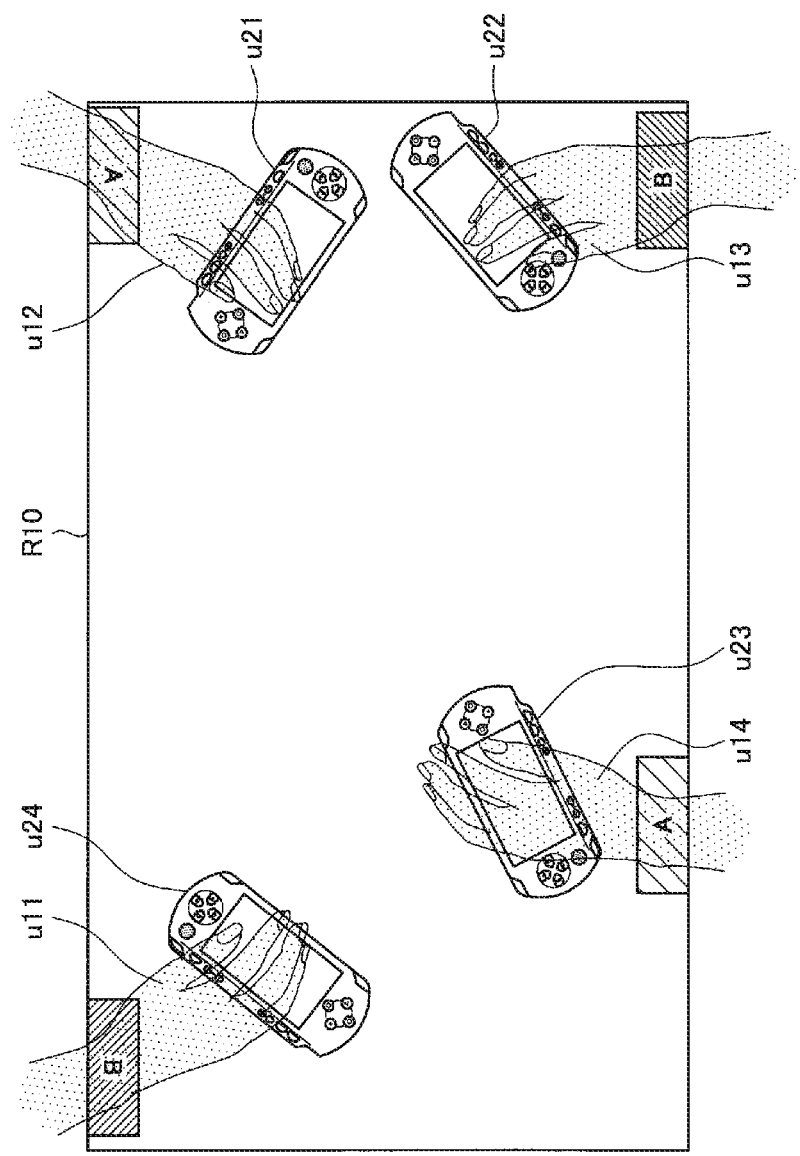
FIG. 25 is an explanatory diagram illustrating an example of operation of an information processing device according to Example 1-3.
Figure 26:
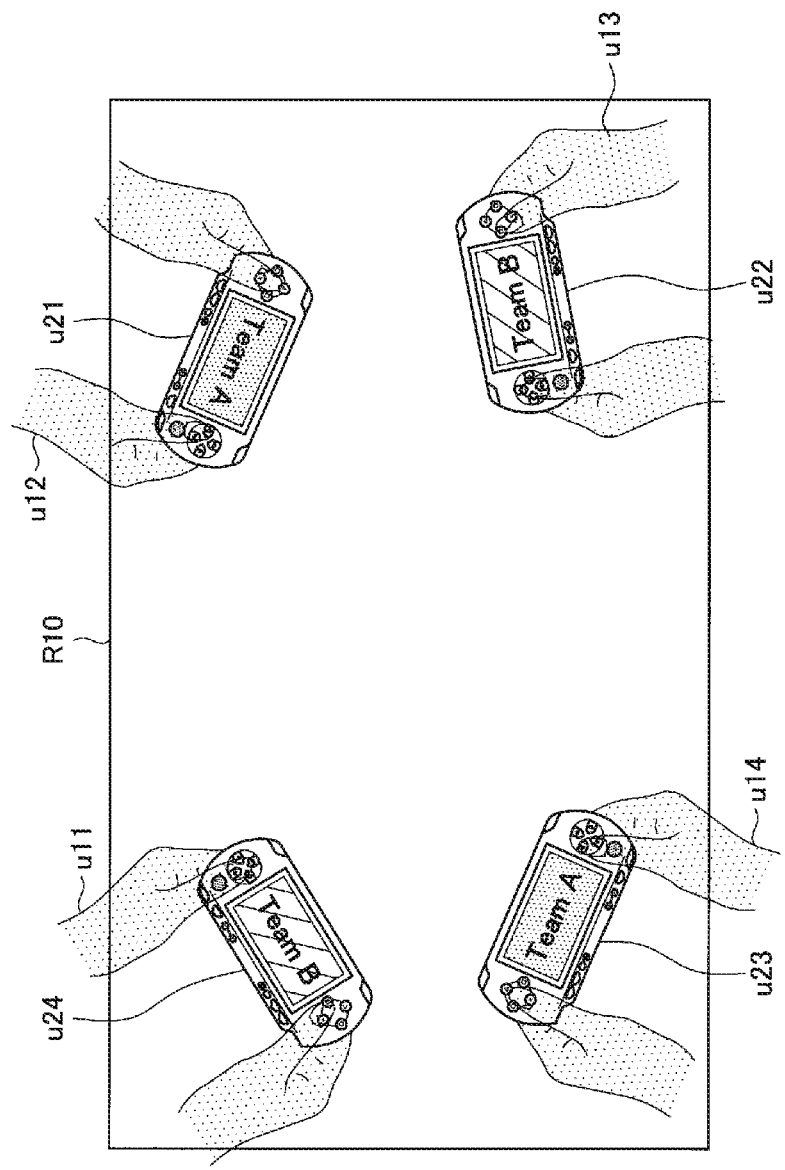
FIG. 26 is an explanatory diagram illustrating an example of operation of an information processing device according to Example 1-3.

Next, an example of control in which the information processing device 100 operates in cooperation with the external terminal using the attribute information for classifying a plurality of users into groups will be described with reference to FIGS. 24 to 26 as Example 1-3. FIGS. 24 to 26 are explanatory diagrams for describing an example of an operation of the information processing device 100 according to Example 1-3.

For example, in the example illustrated in FIG. 24, the users corresponding to the hands u11 to u14 are already classified into a plurality of groups by the information processing device 100. Specifically, the users corresponding to the hands u12 and u14 are classified as the group A, and the users corresponding to the hands u11 and u13 is classified as the group B. Further, external terminals u21 to u24 are placed in a predetermined detection range (for example, the region on the display surface R10), and the information processing device 100 individually identifies and detects each of the external terminals u21 to u24.

Further, a method thereof is not particularly limited as long as the information processing device 100 can identify each of the external terminals u21 to u24. For example, the information processing device 100 establishes communication (for example, wireless communication) with any one of the external terminals u21 to u24, causes the external terminal with which the communication is established to present predetermined display information, and specifies an external terminal that presents the display information from the captured image of the display surface R10. The information processing device 100 can sequentially execute the above-described operation on each of the external terminals u21 to u24 in a time division manner and identify each of the external terminals u21 to u24.

Then, as illustrated in FIG. 25, the information processing device 100 is assumed to detect that each user grasped one of the external terminals u21 to u24 with their hands individually. For example, in the example illustrated in FIG. 25, the hand u11 grasps the external terminal u24. In this case, the information processing device 100 recognizes that the external terminal u24 is a terminal manipulated by the user corresponding to the hand u11. Similarly, since the hand u12 grasps the external terminal u21, the information processing device 100 recognizes that the external terminal u21 is a terminal manipulated by the user corresponding to the hand u12. Further, since the hand u13 grasps the external terminal u22, the information processing device 100 recognizes that the external terminal u22 is a terminal manipulated by the user corresponding to the hand u13. Further, since the hand u14 grasps the external terminal u23, the information processing device 100 recognizes that the external terminal u23 is a terminal manipulated by the user corresponding to the hand u14.

Further, at this time, the information processing device 100 may classify each of the external terminal u21 to u24 into a group to which a corresponding user belongs on the basis of the attribute information generated in advance and a relation between the users and the external terminals u21 to u24. For example, FIG. 26 illustrates an example in which the information processing device 100 classifies each of the external terminals u21 to u24 into a group to which a corresponding user belongs on the basis of the attribute information. Specifically, as illustrated in FIG. 26, the information processing device 100 classifies the external terminal u21 grasped by the hand u12 and the external terminal u23 grasped by the hand u14 into the group A to which the users corresponding to the hands u12 and u14 belong. Similarly, the information processing device 100 classifies the external terminal u24 grasped by the hand u11 and the external terminal u22 grasped by the hand u13 into the group B to which the users corresponding to the hands u11 and u13 belong.

The example of the control in which the information processing device 100 operates in cooperation with the external terminal using the attribute information for classifying a plurality of users into groups has been described above with reference to FIGS. 24 to 26

1.5.4. Example 1-4: One Example of Control Using Previous Attribute Information Next, an example of control in which the information processing device 100 classifies a plurality of users into groups using the attribute information generated in the past will be described as Example 1-4.

Figure 27:
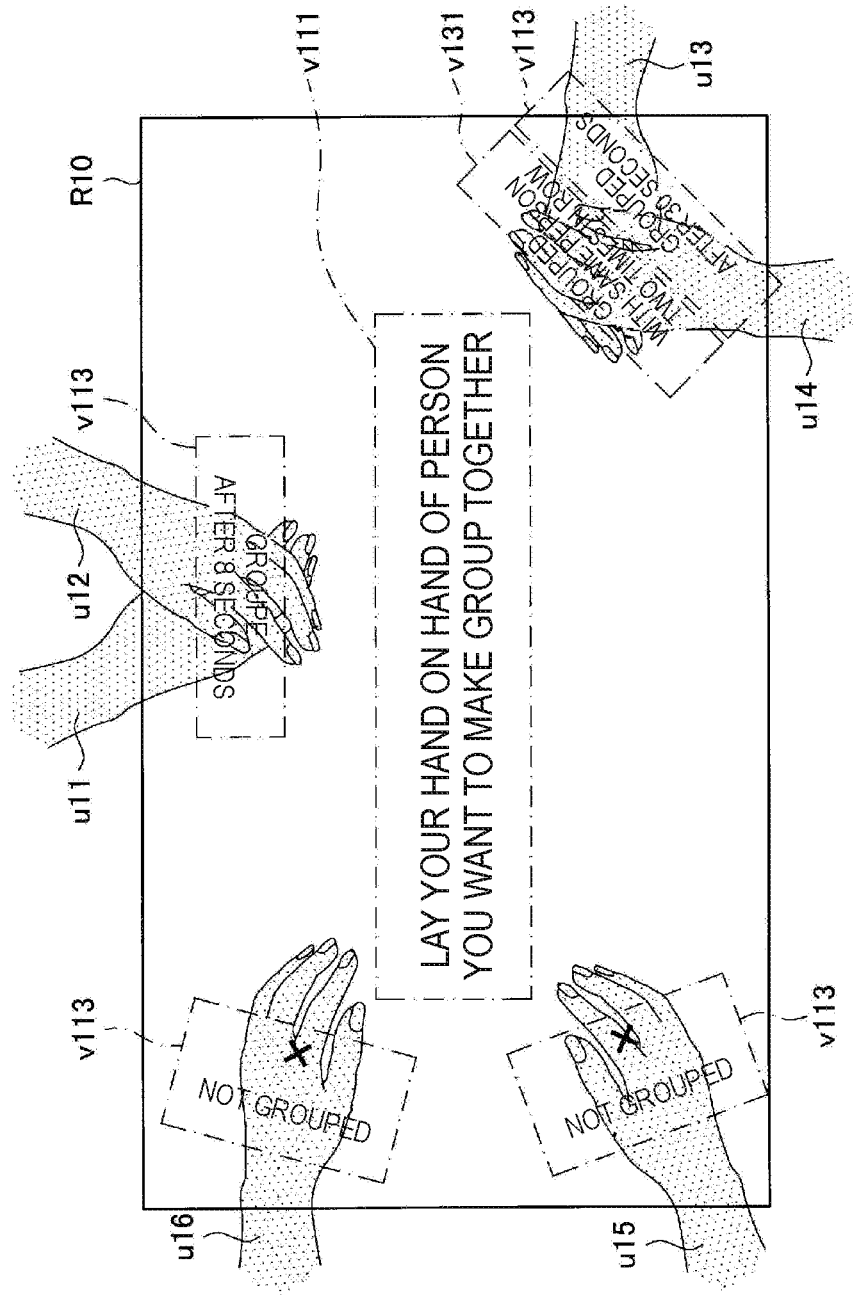
FIG. 27 is an explanatory diagram illustrating an example of operation of an information processing device according to Example 1-4.

For example, FIG. 27 is an explanatory diagram for describing an example of an operation of the information processing device 100 according to Example 1-4 and illustrate an example in which the information processing device 100 presents the notification information in accordance with the attribute information recorded in the past while newly classifying a plurality of users into groups. FIG. 27 illustrates an example in which the information processing device 100 classifies the users corresponding to a plurality of hands overlapping each other into the same group as described above with reference to FIGS. 15 to 17.

More specifically, the information processing device 100 records the generated attribute information and recognizes the users classified in the same group when a plurality of users are classified into groups last time with reference to the attribute information generated and recorded in the past. Then, the information processing device 100 may present predetermined notification information v131 to a corresponding user in a case in which a situation that the users classified into the same group last time are classified in the same group again is detected.

For example, in the example illustrated in FIG. 27, the users corresponding to the hand u13 and the hand u14 are assumed to be classified into the same group when the information processing device 100 classifies the users corresponding to the hands u11 to u16 into group last time. In this case, the information processing device 100 recognizes that the hands u13 and the u14 indicate an operation in which the hand u13 and the u14 are classified into the same group again on the basis of the previously generated attribute information. Then, the information processing device 100 presents the notification information v131 presenting that the hands u13 and u14 are classified into the same group consecutively twice in association with the hands u13 and u14. Further, at this time, the information processing device 100 may restrict a manipulation of causing the hands to belong into the same group again. For example, in the example illustrated in FIG. 27, the information processing device 100 may restrict a manipulation so that the users corresponding to the hand u13 and the hand u14 are unable to belong to the same group.

Figure 28:
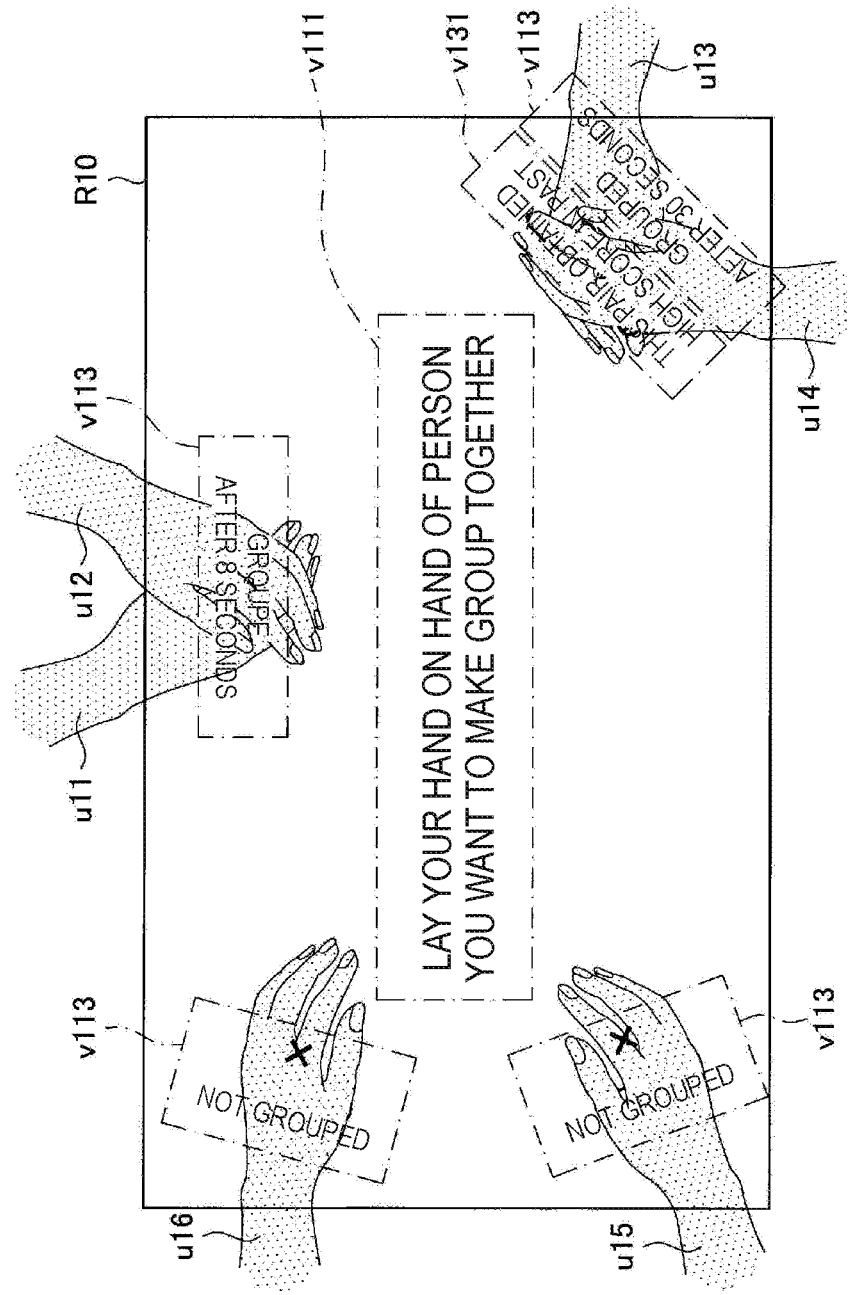
FIG. 28 is an explanatory diagram illustrating an example of operation of an information processing device according to Example 1-4.

Further, as another example, the information processing device 100 may record the attribute information in association with other data and present the notification information in accordance with the attribute information recorded in the past and data associated with the attribute information. For example, FIG. 28 is an explanatory diagram for describing an example of an operation of the information processing device 100 according to Example 1-4 and illustrate an example in which the information processing device 100 presents the notification information in accordance with the recorded the attribute information recorded in the past and the data associated with the attribute information when newly classifying a plurality of users into groups. FIG. 28 illustrates an example in which the information processing device 100 classifies the users corresponding to a plurality of hands overlapping each other into the same group as described above with reference to FIGS. 15 to 17.

More specifically, in the example illustrated in FIG. 28, the information processing device 100 records the generated attribute information in association with data indicating a result of each group (for example, a result of a game or the like) on the basis of the attribute information. Further, the information processing device 100 recognizes a group showing a good result in the past and a plurality of users classified into the group with reference to the attribute information generated and recorded in the past and data indicating the result of each group associated with the attribute information. Then, in a case in which a situation in which the users belonging to the group showing the good result in the past are classified into the same group again is detected, the information processing device 100 may present the predetermined notification information v131 to the corresponding users.

For example, in the example illustrated in FIG. 28, the users corresponding to the hands u13 and u14 are assumed to be classified into the same group in the past and record a good result at that time. In this case, the information processing device 100) recognizes that the hands u13 and the u14 indicate an operation in which the hands u13 and u14 corresponding to the users associated with the group recording the good result in the past are classified into the same group again on the basis of the attribute information generated in the past and the data associated with the attribute information (that is, the result data of each group). Then, the information processing device 100 presents the notification information v131 indicating that a combination of the users corresponding to the hands u13 and u14 is a combination corresponding to the group recording the good result in the past in association with the hands u13 and u14. Further, at this time, the information processing device 100 may restrict a manipulation of causing the hands to belong to the same group again. For example, in the example illustrated in FIG. 28, the information processing device 100 may restrict so that the users corresponding to the hands u13 and u14 recording the good result in the past are unable to belong to the same group.

The example of the control in which the information processing device 100 classifies a plurality of users into groups using the attribute information generated in the past has been described above as Example 1-4.

1.5.5. Example 1-5: One Example of Control of Combining Identification Results of Users Next, an example of control in which the information processing device 100 combines an identification result of the user corresponding to each of the hands placed in a predetermined detection range (for example, the region on the display surface R10) and the attribute information for classifying a plurality of users into groups will be described as Example 1-5.

First, an example of a process for individually identifying one or more hands placed in a predetermined detection range by the information processing device 100 will be described. For example, the information processing device 100 analyzes a result of imaging each of one or more hands placed in the detection range, extracts the shape feature of each of the hands, and identifies each of one or more hands placed in the detection range. Further, as another example, the information processing device 100 senses an inside of a predetermined detection range using infrared rays or the like, extracts information of a vein pattern corresponding to each of the hands placed in the detection range, and identifies each of one or more hands placed in the detection range. Further, the above-described example is merely an example, and the method is not particularly limited as long as the information processing device 100 can identify one or more hands placed in a predetermined detection range individually. Further, it will be appreciated that the information processing device 100 may separately include a configuration required for the identifying in accordance with a method of identifying one or more hands placed in a predetermined detection range individually.

Further, the information processing device 100 associates information indicating the extracted shape feature of the hand with information of the user corresponding to the hand in advance so that, in a case in which a hand is detected, it is possible to specify the user corresponding to the hand.

Next, an example of control in which the information processing device 100 combines the identification result of the user corresponding to each of the hands placed in a predetermined detection range and the attribute information for classifying a plurality of users into groups will be described.

(Example of Optimizing Language of Information to be Presented)

Figure 29:
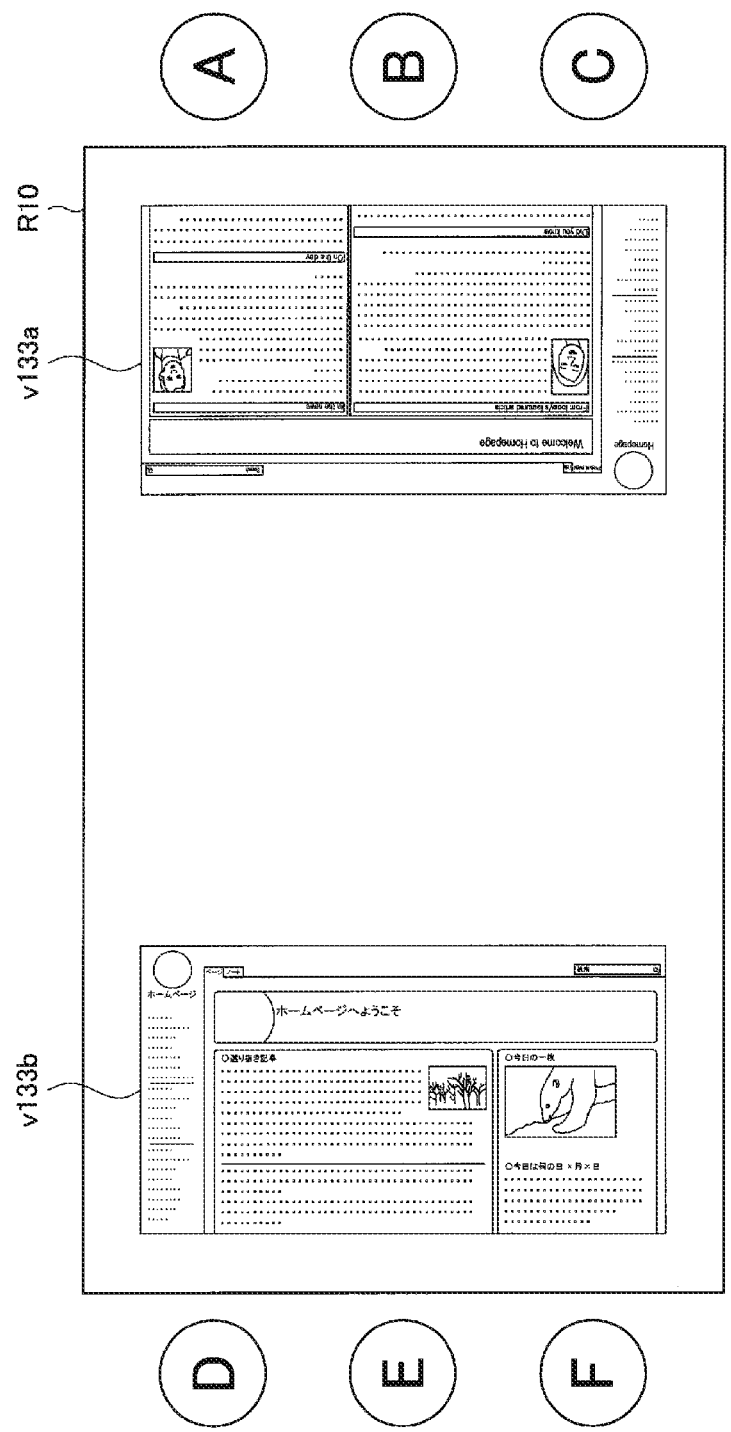
FIG. 29 is an explanatory diagram illustrating an example of operation of an information processing device according to Example 1-5.

First, an example in which the information processing device 100 optimizes a language of information to be presented to a group in accordance with a use language of the users belonging to each group will be described with reference to FIG. 29. FIG. 29 is an explanatory diagram for describing an example of an operation of the information processing device 100 according to Example 1-5. In the example illustrated in FIG. 29, the information processing device 100 identifies users A to F individually. Further, the information processing device 100 classifies the users A to C into the same group and classifies the users D to F into the same group. Further, the group to which the users A to C belongs and the group to which the users D to F belong are assumed to be different.

For example, FIG. 29 illustrates a situation in which the users A to C and the users D to F are browsing a website using a browser or the like. In FIG. 29, reference numeral v133*a* indicates display information such as a screen or the like of the browser presented near the users A to C. In other words, the display information v133*a* corresponds to the information presented to the group to which the users A to C belong. Further, reference numeral v133*b* indicates display information such as a screen or the like of the browser presented near the users D to F. In other words, the display information v133*b* corresponds to information presented to the group to which the users D to F belong.

In the example illustrated in FIG. 29, the information processing device 100 recognizes the use language of the user on the basis of information of each user belonging to each group and presents the display information to be presented to each group using a common language of the users belonging to the group. As a more specific example, in the example illustrated in FIG. 29, the users A, D. E, and F are assumed to be Japanese, the user B is assumed to be American, and the user C is assumed to be German. In this case, the information processing device 100 may present the display information v133*a* to be presented to the group to which the users A to C belongs, for example, in English which is a common language of the users A to C. Similarly, the information processing device 100 may present the display information v133*b* to be presented to the group to which the users D to F belongs in Japanese which is a common language of the users D to F.

The example in which the information processing device 100 optimizes the language of the information to be presented to the group in accordance with the use language of the users belonging to each group has been described above with reference to FIG. 29.

(Example of Optimizing Display Size of Information to be Presented)

Figure 30:
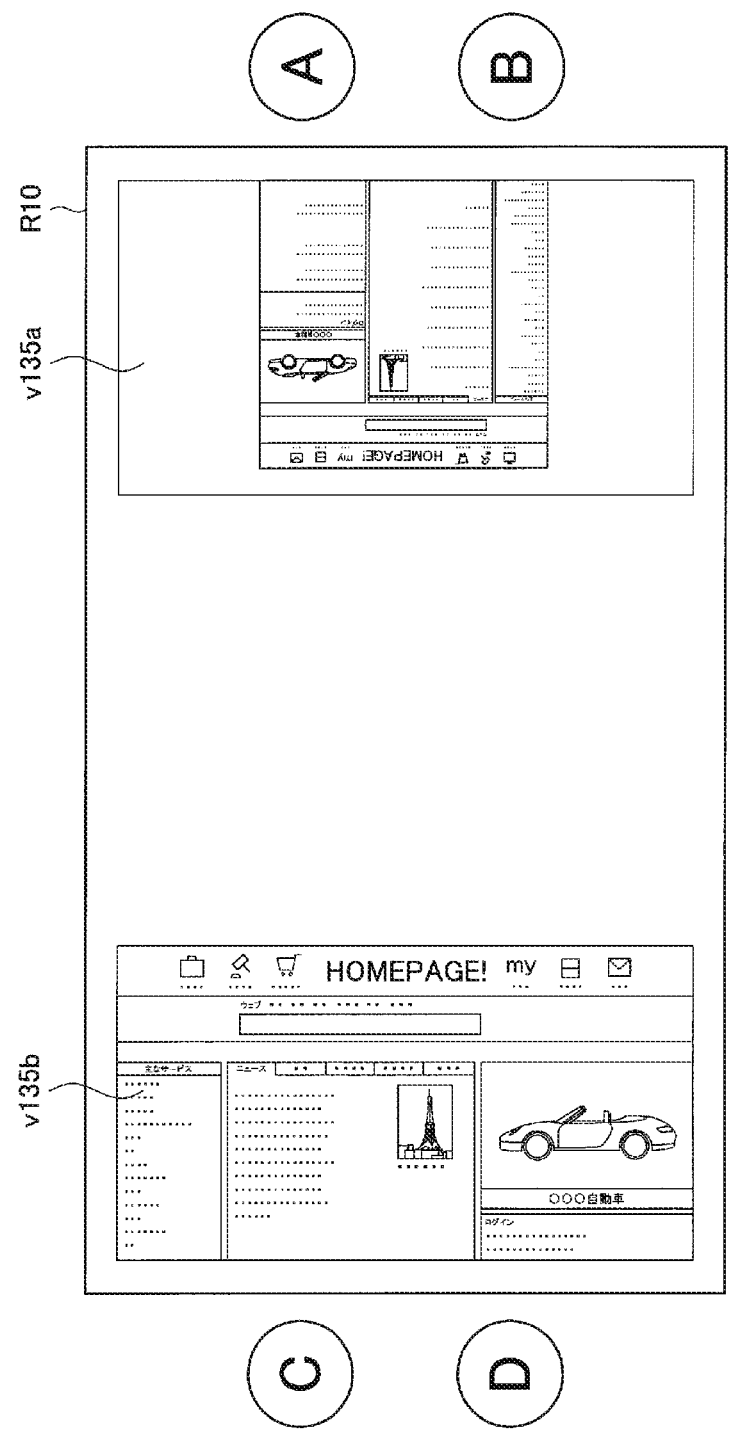
FIG. 30 is an explanatory diagram illustrating an example of operation of an information processing device according to Example 1-5.

Next, an example in which the information processing device 100 optimizes a display size of information to be presented to a group in accordance with an age of the user belonging to each group will be described with reference to FIG. 30. FIG. 30 is an explanatory diagram for describing another example of an operation of the information processing device 100 according to Example 1-5. In the example illustrated in FIG. 30, the information processing device 100 identifies the users A to D individually. Further, the information processing device 100 classifies the users A and B into the same group and classifies the users C and F into the same group. Further, the group to which the users A and B belong and the group to which the users C and B belong are assumed to be different.

For example, FIG. 30 illustrates a situation in which the users A and B and the users C and F are browsing a website using a browser or the like. In FIG. 30, reference numeral v135*a* indicates display information such as a screen or the like of the browser presented near the users A and B. In other words, the display information v135*a* corresponds to information presented to the group to which the users A and B belong. Further, reference numeral v135*b* indicates display information such as a screen of the browser presented near the users C and D. In other words, the display information v135*b* corresponds to information presented to the group to which the users C and D belong.

In the example illustrated in FIG. 30, the information processing device 100 recognizes the age of the user on the basis of information of each user belonging to each group and controls a display size (for example, a character size) to be presented to each group in accordance with the age of the user belonging to the group. As a more specific example, in the example illustrated in FIG. 30, the user A is assumed to be a kid, the users B and C are assumed to be adults, and the user D is assumed to be an elderly person. In this case, the information processing device 100 may perform control, for example, such that a character size in the display information v135*b* to be presented to the group to which the users C and D (that is, an adult and an elderly person) belong is larger than a character size in display information v135*a* to be presented to the group to which the users A and B (that is, a kid and an adult).

Further, at this time, the information processing device 100 may give a phonetic representation to a display of Chinese characters or English for the display information v135*a* to be presented to the group to which the kid (the user A) belongs.

The example of in which the information processing device 100 optimizes the display size of the information to be presented to the group in accordance with the age of the user belonging to each group has been described above with reference to FIG. 30.

(Example of Control According to Attribute of User)

An example of control in which the information processing device 100 switches various kinds of processes in accordance with an attribute of the user belonging to each group will be described.

Figure 31:
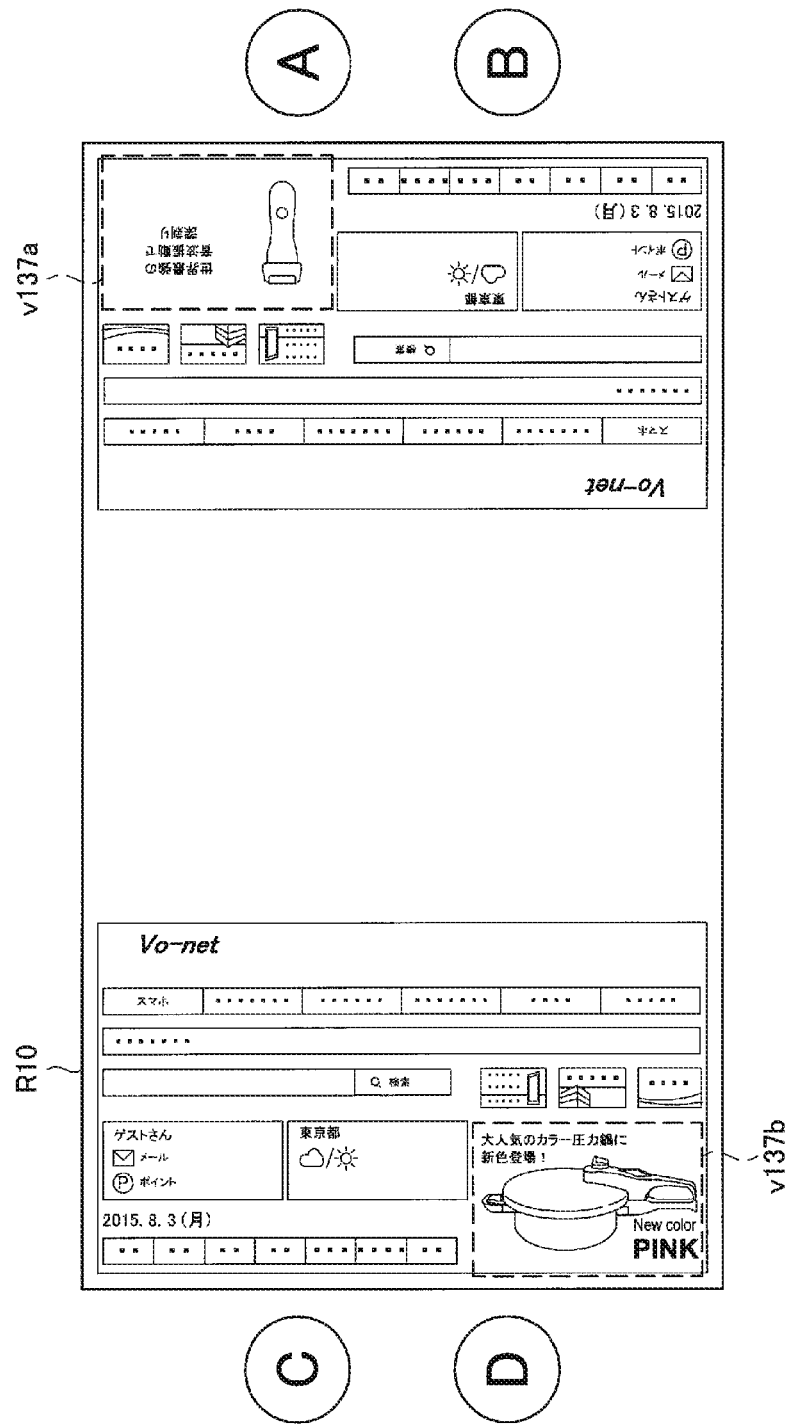
FIG. 31 is an explanatory diagram illustrating an example of operation of an information processing device according to Example 1-5.

First, an example in which the information processing device 100 controls content of information to be presented to the group in accordance with the attribute of the user belonging to each group will be described with reference to FIG. 31. FIG. 31 is an explanatory diagram for describing another example of an operation of the information processing device 100 according to Example 1-5. In the example illustrated in FIG. 31, the information processing device 100X) identifies the users A to D individually. Further, the information processing device 100 classifies the users A and B into the same group and classifies the users C and F into the same group. Further, the group to which the users A and B belong and the group to which the users C and B belong are assumed to be different.

For example, FIG. 31 illustrates a situation in which the users A and B and the users C and F are browsing a website using a browser or the like. In FIG. 31, reference numeral v137*a* indicates display information such as an advertisement or the like presented in a screen of the browser presented near the users A and B. In other words, the display information v137*a* corresponds to an advertisement presented to the group to which the users A and B belong. Further, reference numeral v137*b* indicates display information such as an advertisement presented in the screen of the browser presented near the users C and D. In other words, the display information v137*b* corresponds to the advertisement presented to the group to which the users C and D belong.

In the example illustrated in FIG. 31, the information processing device 100 recognizes the attribute of the user on the basis of the information of each user belonging to each group and controls the advertisement to be presented to each group in accordance with the attribute of the user belonging to the group. Further, the attribute of the user may be, for example, a sex of the user, an occupation of the user, an age group of the user, and the like. As a more specific example, in the example illustrated in FIG. 31, the attribute of the users A and B is assumed to be single, and the attribute of the users C and D is assumed to be a housewife. In this case, the information processing device 100 may present an advertisement (for example, an advertisement such as an electric shaver) targeting single males to the group to which the users A and B which are single belongs as the display information v137a. Further, the information processing device 100 may present an advertisement (for example, an advertisement of a kitchenware) targeting housewives to the group to which the housewives the users C and B who are housewives belong as the display information v137b.

The example in which the information processing device 100 controls content of information to be presented to the group in accordance with the attribute of the user belonging to each group has been described above with reference to FIG. 31.

Figure 32:
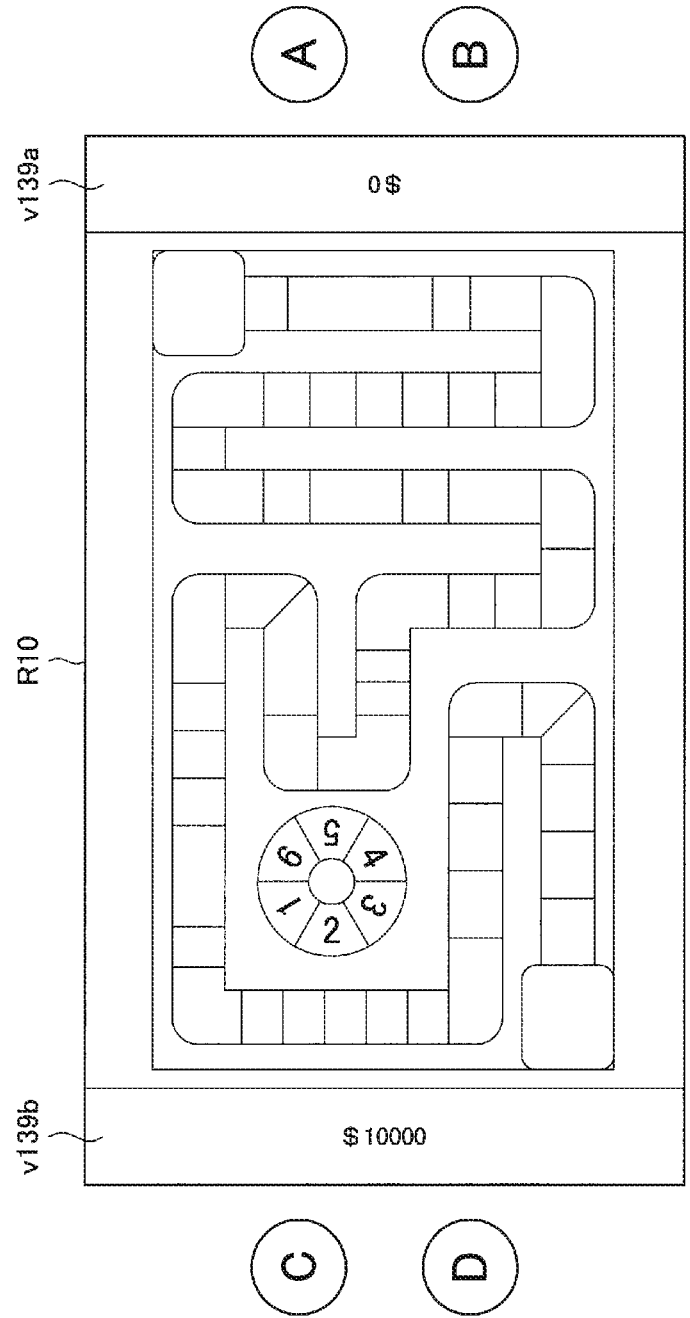
FIG. 32 is an explanatory diagram illustrating an example of operation of an information processing device according to Example 1-5.

Next, an example of control in which the information processing device 100 sets a handicap between the groups in accordance with the attribute of the user belonging to each group will be described with reference to FIG. 32. FIG. 32 is an explanatory diagram for describing another example of an operation of the information processing device 100 according to Example 1-5. In the example illustrated in FIG. 32, the information processing device 100 identifies the users A to D individually. Further, the information processing device 100 classifies the users A and B into the same group and classifies the users C and F into the same group. Further, the group to which the users A and B belong and the group to which the users C and B belong are assumed to be different.

For example, FIG. 32 illustrates a situation in which the users A to D are divided into a group of the users A and B, a group of the users C and D, and a game of competing for a score is performed among the groups. In FIG. 32, reference numeral v139a indicates display information presenting a scores of the group to which the users A and B belong. Further, Reference numeral v139b indicates display information presenting a scores of the group to which the users C and D belong.

In the example illustrated in FIG. 32, the information processing device 100 recognizes the attribute of the user on the basis of the information of each user belonging to each group, and sets a handicap between the groups in accordance with the attribute of the user belonging to each group. Further, as the attribute of the user, information identifying which of a kid and an adult the user is assumed to be set in accordance with the age of each user. As a more specific example, in the example illustrated in FIG. 32, the attribute of the users A and B are assumed to be adults, and the attributes of the users C and D are assumed to be kids. In this case, the information processing device 100 adds a score to the group to which the users C and D belong as a handicap so that the group to which the users C and D which are kids belong has an advantage than the group to which the users A and B who are adults belong.

The example of the control in in which the information processing device 100 sets a handicap between the groups in accordance with the attribute of the user belonging to each group has been described above with reference to FIG. 32.

Further, the above-described example is merely an example, and the present disclosure is not necessarily limited to the example described above. As a specific example, the information processing device 100 may use the identification result of each user to generate the attribute information. As a more specific example, the information processing device 100 may restrict a manipulation of causing the adults to belong into the same group, for example, in a case in which a plurality of users including adults and kids are classified into groups.

1.5.6. Example 1-6: One Example of Control of Ordering Users

As Example 1-6, an example of control in which the information processing device 100 orders a plurality of users (that is, weights a plurality of users) will be described with a specific example.

(Example of Ordering According to Manipulation on Display Information)

First, an example of control in which the information processing device 100 presents predetermined display information and orders a plurality of users in accordance with a manipulation performed on the display information by the hand of each of a plurality of users will be described with reference to FIGS. 33 to 36. FIGS. 33 to 36 are explanatory diagrams for describing an example of an operation of the information processing device 100 according to Example 1-6 and illustrate an example of control in which the information processing device 100 orders a plurality of users in accordance with a manipulation performed on predetermined display information by the hand of each of a plurality of users. Further, the present embodiment will proceed with an example in which the information processing device 100 orders the users (that is, six users) corresponding in number to hands u11 to u16 placed in a predetermined detection range (for example, the region on the display surface R10).

Figure 33:
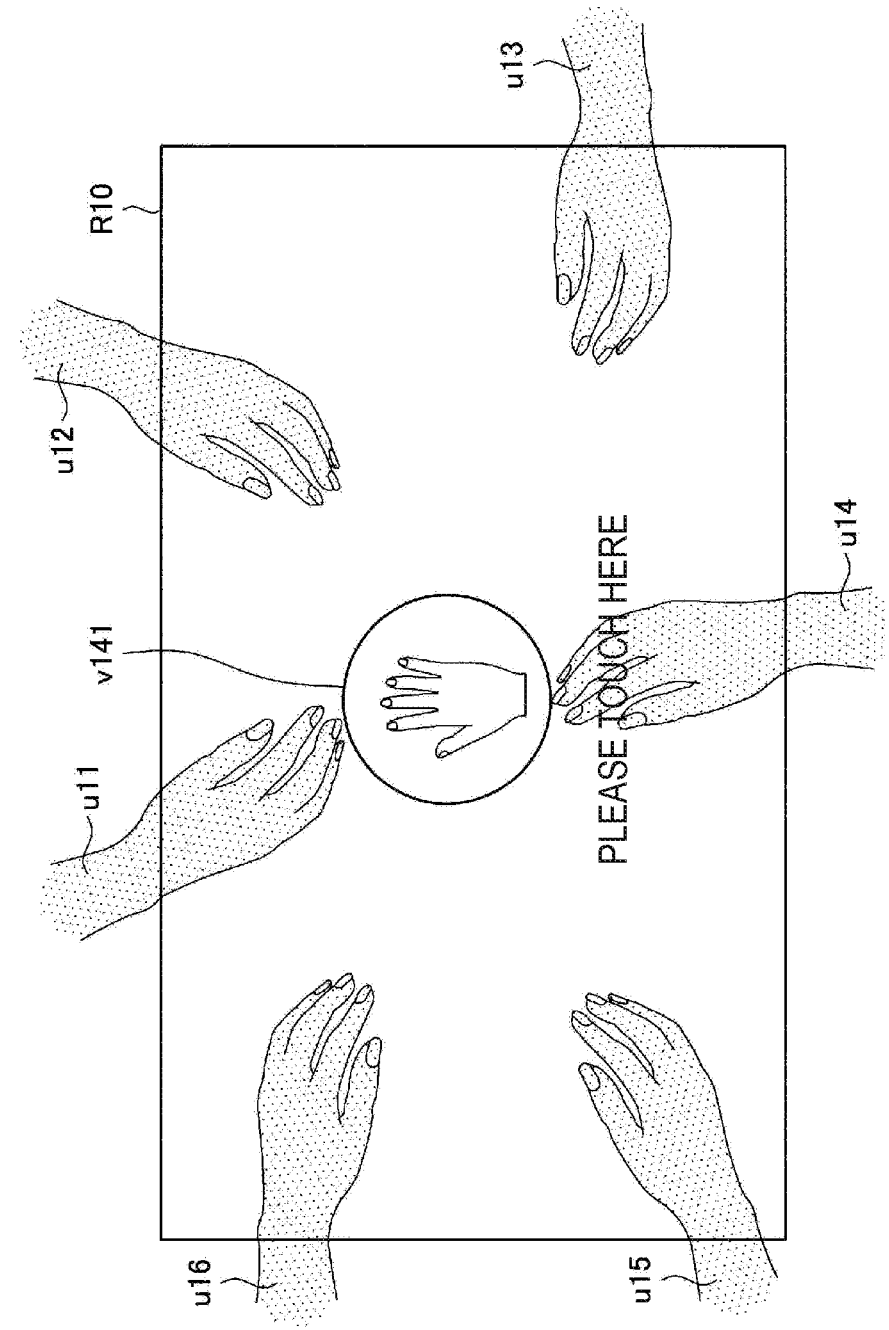
FIG. 33 is an explanatory diagram illustrating an example of operation of an information processing device according to Example 1-6.

Specifically, as illustrated in FIG. 33, the information processing device 100 causes predetermined display information v141 to be displayed and gives an instruction to the user to manipulate the display information v141. Further, the information processing device 100 starts detection of the hand of each user placed in a predetermined detection range (for example, the region on the display surface R10). The information processing device 100 orders a plurality of users on the basis of the order in which the manipulations (for example, the touch manipulations) performed on the display information v141 by the hands of a plurality of users (that is, the hands u11 to u16) are detected.

Figure 34:
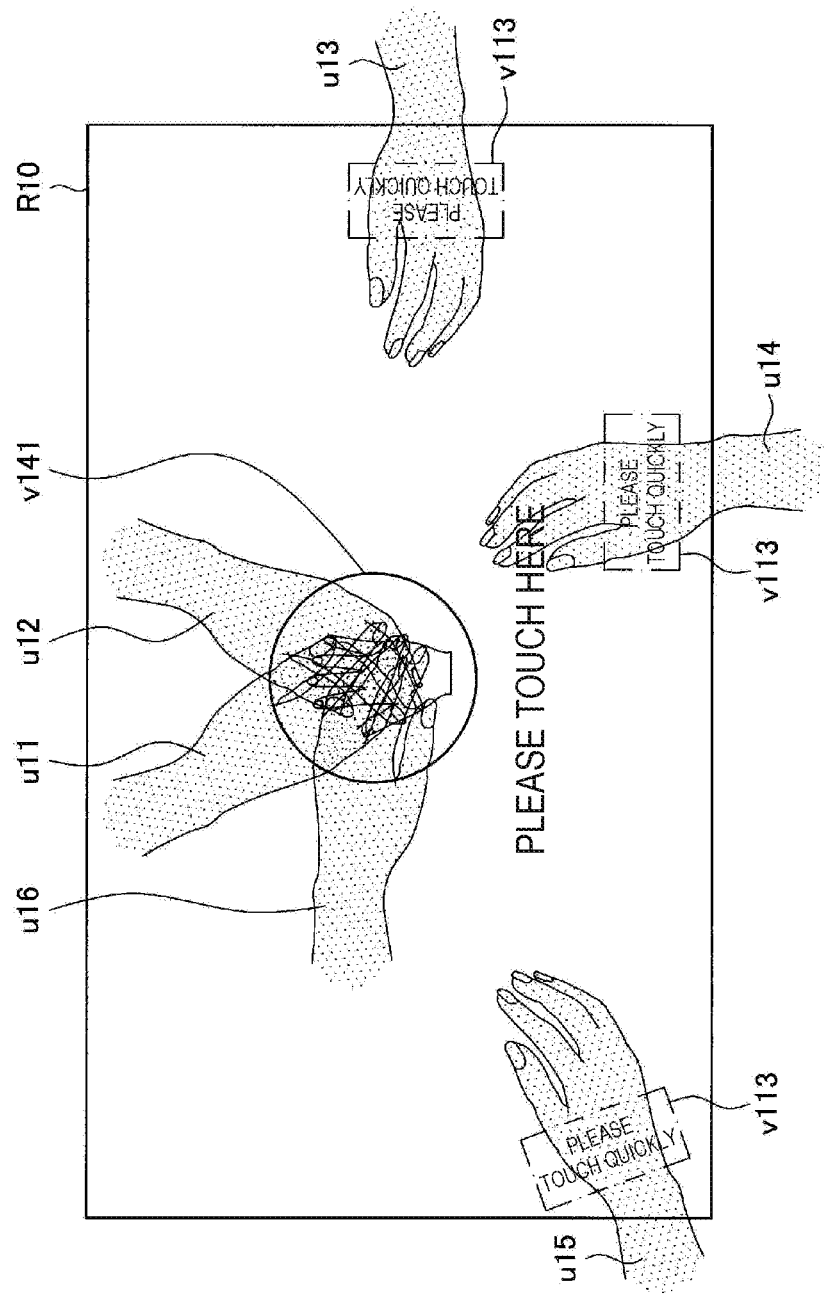
FIG. 34 is an explanatory diagram illustrating an example of operation of an information processing device according to Example 1-6.

For example, FIG. 34 illustrates a state in which the touch manipulation is performed on the display information v141 by the hands u11, u12, and u16 among the hands u11 to u16. In other words, at a time point illustrated in FIG. 34, the touch manipulation is not performed on display information v141 by the hands u13 to u15. In this case, the information processing device 100 may present the display information v113 indicating an instruction for urging the touch manipulation on the display information v141 in association with the hands u13 to u15.

Figure 35:
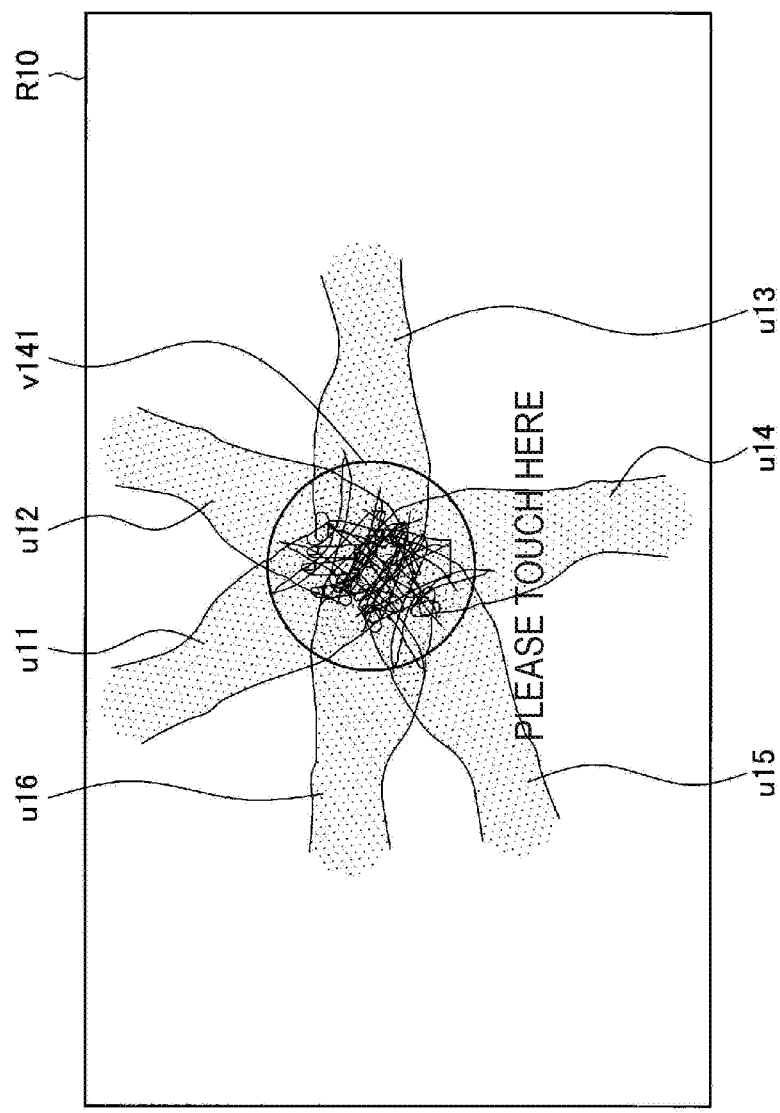
FIG. 35 is an explanatory diagram illustrating an example of operation of an information processing device according to Example 1-6.

Then, in a case in which all the target hands (that is, the hands u11 to u16) satisfy the termination condition (that is, the touch manipulation on the display information v141), the information processing device 100 generates the attribute information for ordering the users corresponding to the hands on the basis of the order in which the touch manipulation is performed on the display information v141 (that is, the order in which the termination condition) is satisfied. For example, FIG. 35 illustrates an example of a state in which all the hands satisfy the termination condition. Further, in the example illustrated in FIG. 35, the touch manipulation is assumed to be performed on the display information v141 in the order of the hand u11, the hand u12, the hand u16, the hand u14, the hand u15, and the hand u13.

Figure 36:
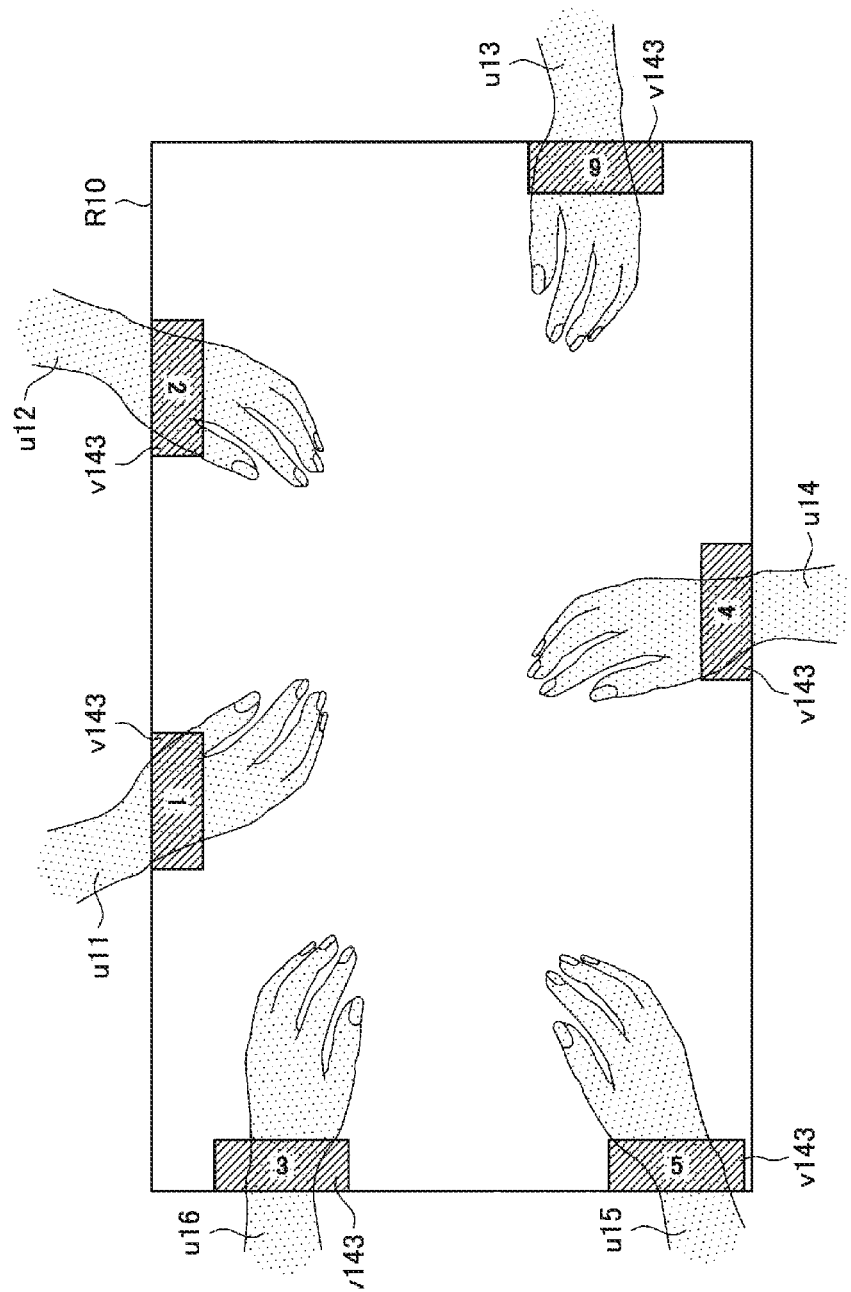
FIG. 36 is an explanatory diagram illustrating an example of operation of an information processing device according to Example 1-6.

Then, the information processing device 100 executes various kinds of controls in accordance with the generated attribute information, that is, the attribute information for ordering a plurality of users. For example, FIG. 36 illustrates an example in which the information processing device 100 presents display information v143 indicating an order set between the users on the basis of the generated attribute information in association with the hands corresponding to the users. Further, in the example illustrated in FIG. 36, as in the example illustrated in FIG. 8, the information processing device 100 specifies an approach position toward the region on the display surface R10 (that is, a position at which the arm of each user is inserted into the region) for the hand of each user and projects the display information v143 indicating the order corresponding to the user onto the position corresponding to the approach position. Further, a method of presenting information based on the attribute information illustrated in FIG. 36 is merely an example and is not necessarily limited to the example illustrated in FIG. 36. Further, other examples will be described later.

The example of the control in which the information processing device 100 presents predetermined display information and orders a plurality of users in accordance with a manipulation performed on the display information by each of a plurality of users has been described with reference to FIGS. 33 to 36.

(Another Example of Ordering According to Manipulation on Display Information)

Next, another example of control in which the information processing device 100 presents predetermined display information and orders a plurality of users in accordance with a manipulation performed on the display information by the hand of each of a plurality of users will be described with reference to FIGS. 37 to 40. FIGS. 37 to 40 are explanatory diagrams for describing another example of an operation of the information processing device 100 according to Example 1-6 and illustrate an example of control in which the information processing device 100 orders a plurality of users in accordance with a manipulation performed on predetermined display information by the hand of each of a plurality of users. Further, the present embodiment will proceed with an example in which the information processing device 100 orders the users (that is, six users) corresponding in number to hands u11 to u16 placed in a predetermined detection range (for example, the region on the display surface R10).

Figure 37:
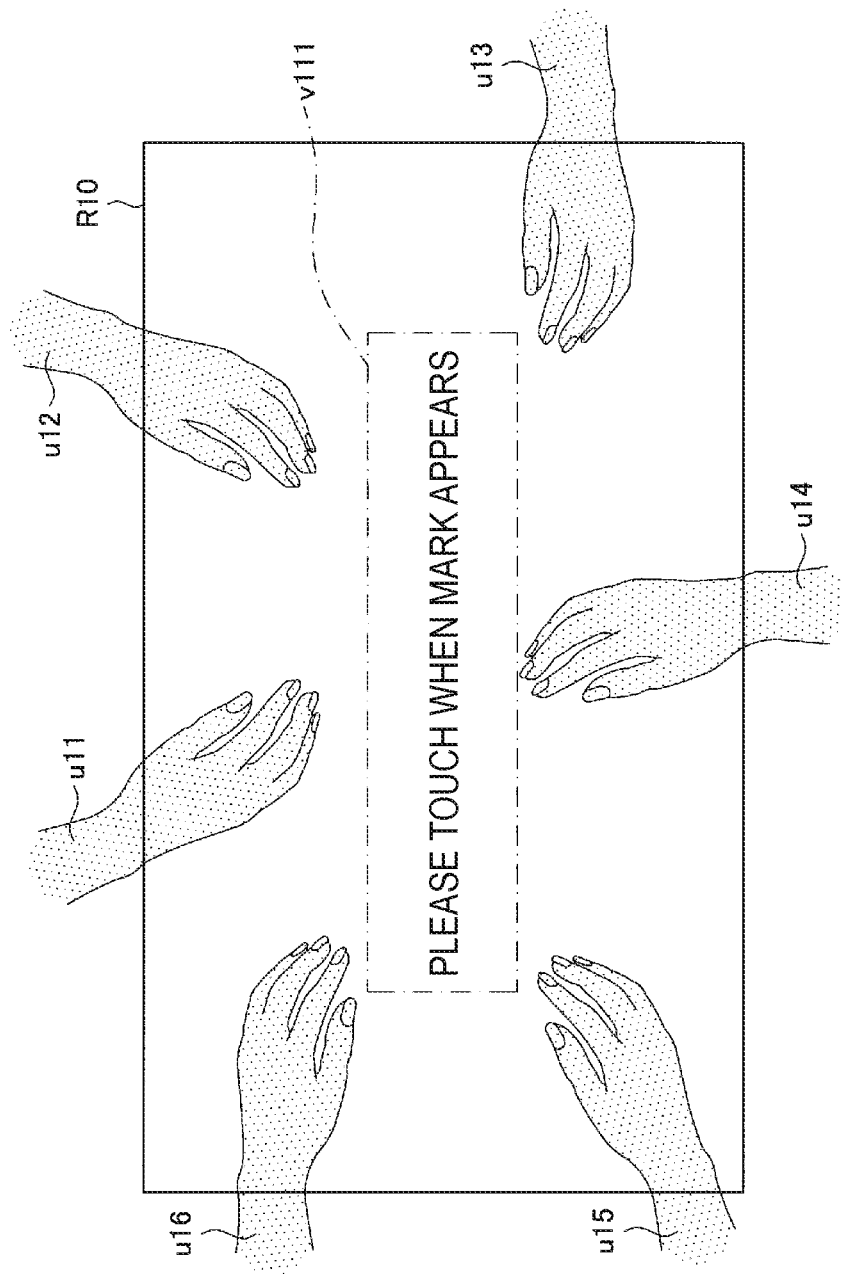
FIG. 37 is an explanatory diagram illustrating an example of operation of an information processing device according to Example 1-6.
Figure 38:
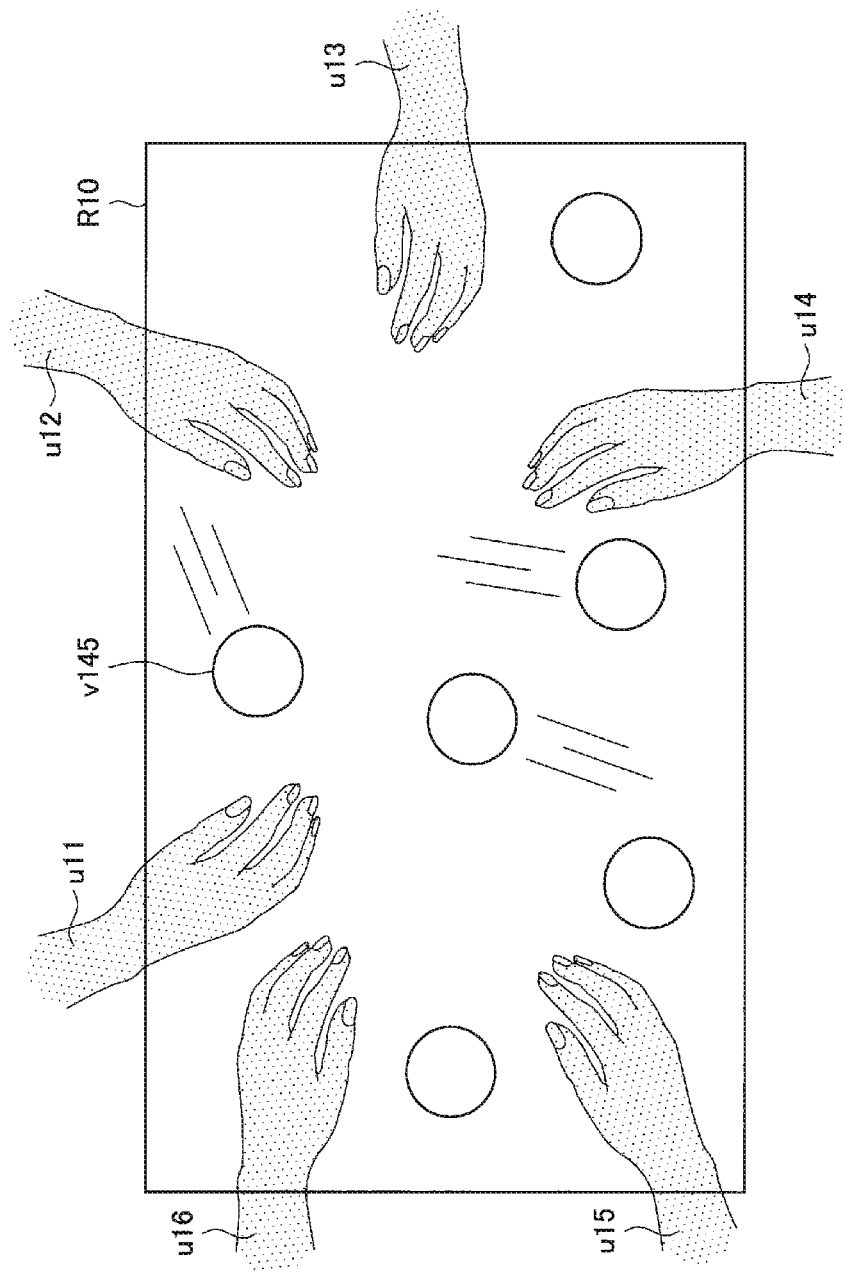
FIG. 38 is an explanatory diagram illustrating an example of operation of an information processing device according to Example 1-6.

First, as illustrated in FIG. 37, the information processing device 100 gives an instruction to the user to manipulate the display information to be displayed thereafter. For example, in the example illustrated in FIG. 37, the information processing device 100 gives a notification indicating content of the instruction to each user by projecting the display information viii indicating the content of the instruction onto the display surface R10. Then, as illustrated in FIG. 38, the information processing device 100 causes a plurality of pieces of display information v145 to be displayed on the display surface R10. At this time, the information processing device 100 may perform control such that each of a plurality of pieces of display information v145 moves around in the display surface R10 individually. Further, the information processing device 100 starts detection of the hand of each user placed in a predetermined detection range (for example, the region on the display surface R10). Then, the information processing device 100 orders a plurality of users on the basis of the order in which the manipulation (for example, the touch manipulation) performed on any one piece of display information v145 by the hand of each of a plurality of users (that is, the hands u11 to u16) is detected.

Figure 39:
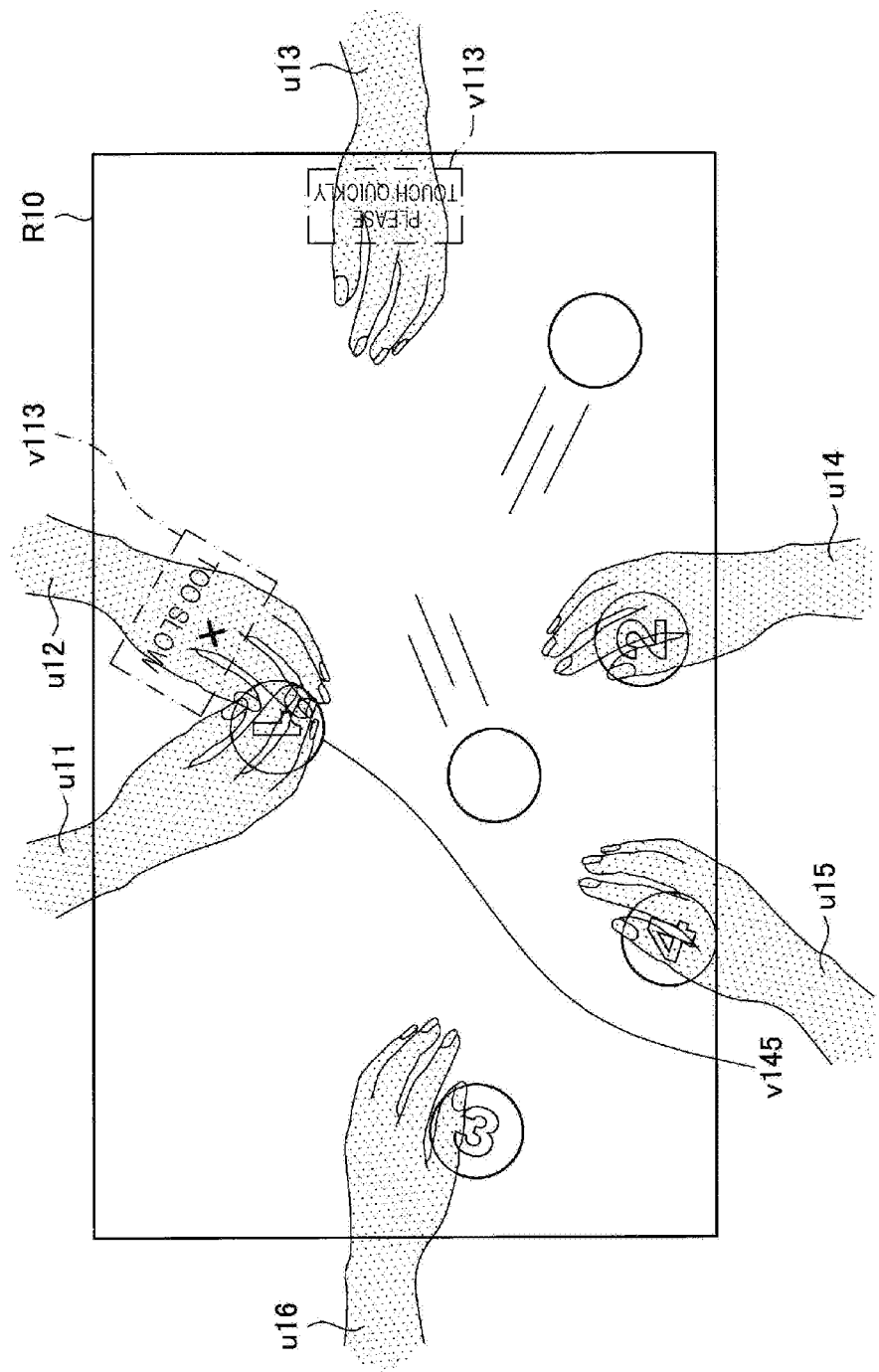
FIG. 39 is an explanatory diagram illustrating an example of operation of an information processing device according to Example 1-6.

For example, FIG. 39 illustrates a state in which the hands u11 and u14 to u16 among the hands u11 to u16 perform the touch manipulation on any one of a plurality of pieces of display information v145. Further, in the example illustrated in FIG. 39, the hand u13 does not perform the touch manipulation on any display information v145. In this case, the information processing device 100 may present the display information v113 indicating an instruction for urging the touch manipulation on the display information v145 in association with the hand u13.

Further, the information processing device 100 may set a predetermined constraint in a case in which a plurality of users are ordered. For example, in the example illustrated in FIG. 39, the information processing device 100 restricts a manipulation performed on each of a plurality of pieces of display information v145 by a plurality of users (that is, a manipulation performed by a plurality of hands). More specifically, in the example illustrated in FIG. 39, the hand u12 performs the touch manipulation on the display information v145 which the hand u11 has completed the touch manipulation. In this case, the information processing device 100 may determine that the hand u12 does not satisfy the termination condition at this time point. Further, at this time, the information processing device 100 may present the display information v113 indicating that the display information v145 which the hand u12 performs the touch manipulation have undergone the touch manipulation already performed by another hand (that is, the hand u11) in association with the hand u12.

Figure 40:
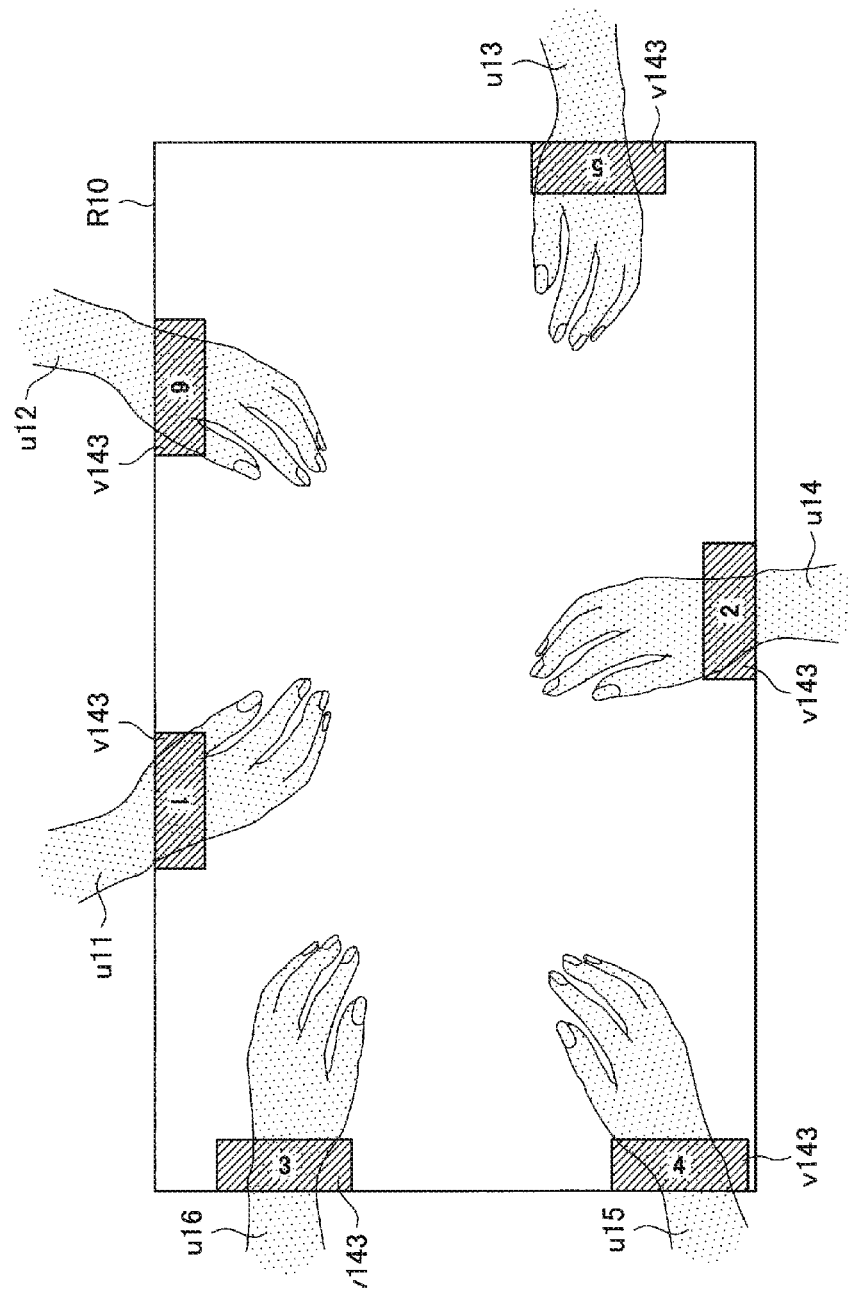
FIG. 40 is an explanatory diagram illustrating an example of operation of an information processing device according to Example 1-6.

Then, in a case in which all the target hands (that is, the hands u11 to u16) satisfy the termination condition, the information processing device 100 generates the attribute information for ordering the users corresponding to the respective hands on the basis of the order in which the touch manipulation is performed on any one of the display information v145 by each target hand (that is, the order in which the termination condition is satisfied). For example, FIG. 40 illustrates an example of a state in which all the hands satisfy the termination condition. In the example illustrated in FIG. 40, the touch manipulation is performed on any one piece of display information v145 in the order of the hand u11, the hand u14, the hand u16, the hand u15, the hand u13, the hand u12. In other words, the information processing device 100 generates the attribute information for ordering the users corresponding to the hands u11 to u16 on the basis of the order. Further, as in the other examples described above, the information processing device 100 may present the display information v143 indicating the order set between the users on the basis of the generated attribute information in association with the hand corresponding to the user.

The another example of the control in which the information processing device 100 presents predetermined display information and orders a plurality of users in accordance with a manipulation performed on the display information by each of a plurality of users has been described with reference to FIGS. 37 to 40.

(Example of Ordering Using Detection Result of Real Object)

Next, an example of control in which the information processing device 100 orders a plurality of users in accordance with detection results of the hand of the user placed in a predetermined detection range (for example, the region on the display surface R10) and a real object other than the hand of the user will be described with reference to FIGS.

41 to 44. FIGS. 41 to 44 are explanatory diagrams for describing an example of an operation of the information processing device 100 according to Example 1-6 and illustrate an example of control in which the information processing device 100 orders a plurality of users using each detection result of the real object. Further, the present description will proceed with an example in which, in a game in which each of a plurality of users competes for a length of a period of making a stick stand on their own palm of the hand and holding it, the information processing device 100 detects a ranking in the game and orders a plurality of users in accordance with the ranking detection result. Further, the present description will proceed with an example in which the information processing device 100 orders the users (that is, the three users) corresponding in number to the hands u11 to u13 placed in a predetermined detection range (for example, on display surface R10).

Figure 41:
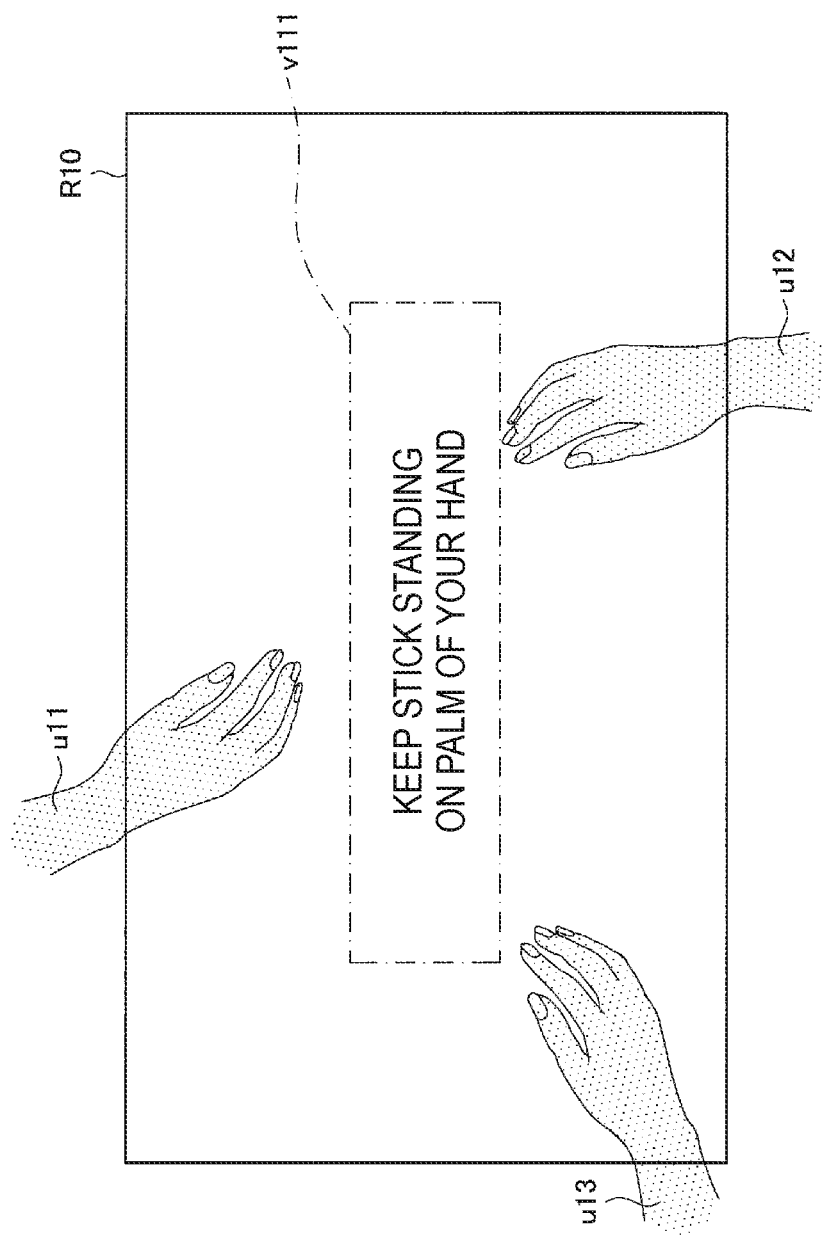
FIG. 41 is an explanatory diagram illustrating an example of operation of an information processing device according to Example 1-6.
Figure 42:
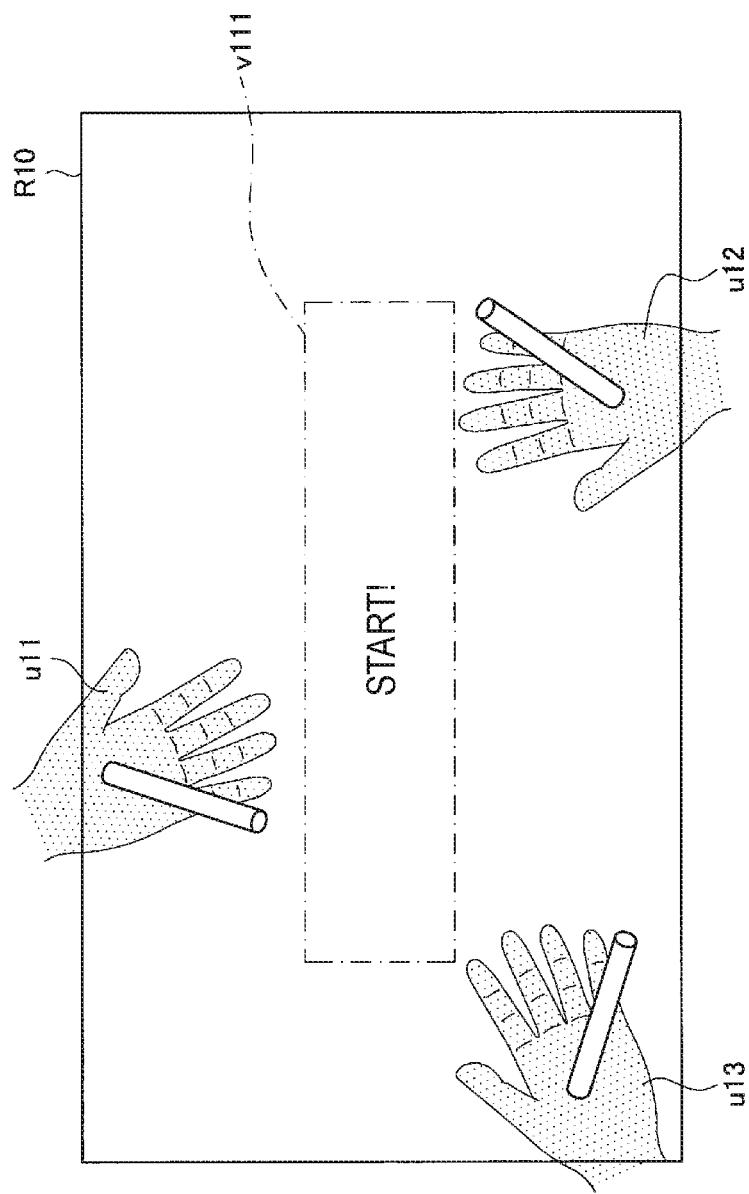
FIG. 42 is an explanatory diagram illustrating an example of operation of an information processing device according to Example 1-6.

First, as illustrated in FIG. 41, the information processing device 100 gives an instruction to the user to place a stick on the palm of the hand and maintain that state. For example, in the example illustrated in FIG. 41, the information processing device 100 gives a notification indicating content of the instruction to each user by projecting the display information v111 indicating the content of the instruction onto the display surface R10. Then, as illustrated in FIG. 42, an instruction to start the game is given to the user, and detection of the hand of each user placed in a predetermined detection range (for example, the region on the display surface R10) and the stick held by the hand is started. Further, since a method similar to the method of detecting a hand can be applied to a method of detecting a real object other than the hand (for example, the stick held on the palm of the hand), detailed description thereof is omitted.

Next, an example of an operation of the information processing device 100 during a game will be described with reference to FIG. 43. The example illustrated in FIG. 43 indicates a state in which the stick held by the hand u12 falls down.

For example, the information processing device 100 recognizes that the stick collapses on the basis of the detection result between the hand u12 and the stick held by the hand u12 (for example, the position relation between the hand u12 and the stick). Further, in this case, the state in which the stick held by the hand of each user collapses corresponds to the state in which the hand satisfies the termination condition. Further, at this time, the information processing device 100 recognizes that the hands u11 and u13 maintain the stick (that is, the hands u11 and u13 do not satisfy the termination condition).

Then, the information processing device 100 determines that the user corresponding to the hand u12 is a third place among the three users on the basis of the recognition result of the states of the hands u11 to u13. Further, at this time, the information processing device 100 may present the display information v143 indicating the ranking of the user corresponding to the hand u12 (that is, information indicating the ranking set to the user) in association with the hand u12.

Figure 43:
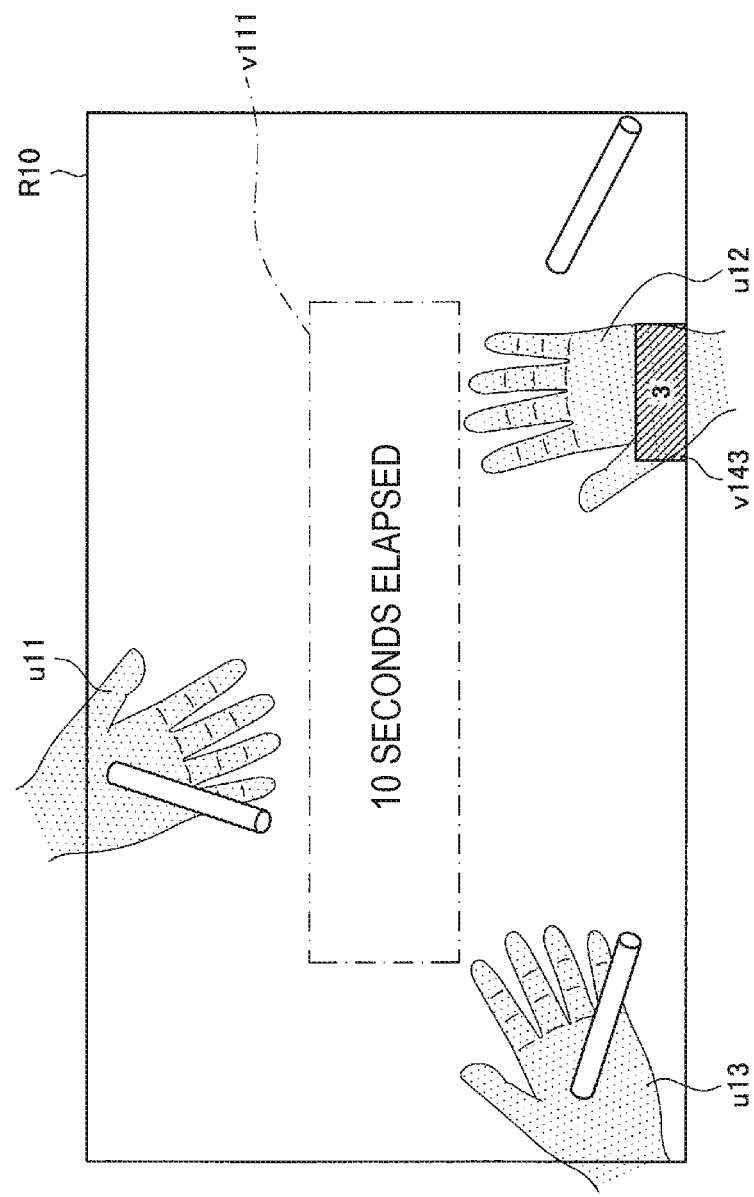
FIG. 43 is an explanatory diagram illustrating an example of operation of an information processing device according to Example 1-6.

Further, as illustrated in FIG. 43, the information processing device 100 may present information indicating a situation of the game to the user. For example, in the example illustrated in FIG. 43, the information processing device 100 gives a notification indicating the situation to the user by projecting the display information v111 indicating an elapsed time from the start of the game as the status of the game onto the display surface R10.

Figure 44:
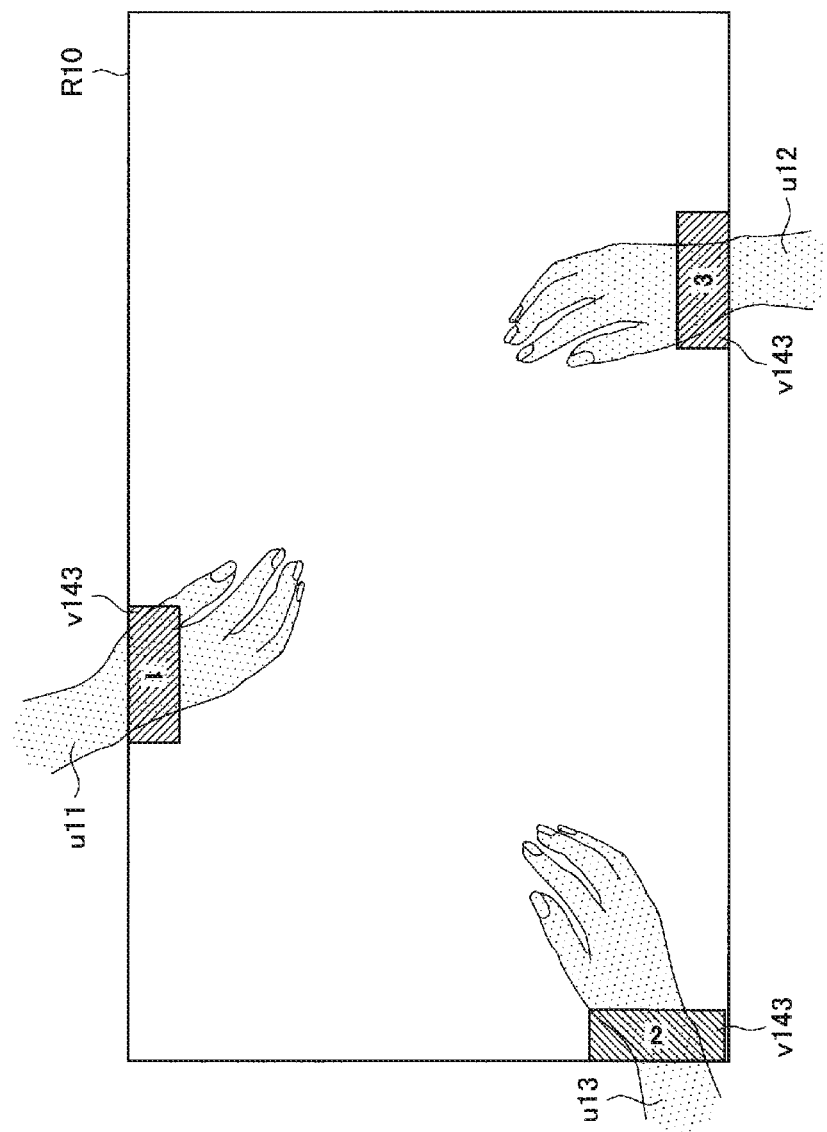
FIG. 44 is an explanatory diagram illustrating an example of operation of an information processing device according to Example 1-6.

Then, in a case in which all the target hands (that is, the hand u11 to u13) satisfy the termination condition, the information processing device 100 generates the attribute information for ordering the users corresponding to the respective hands on the basis of an order in which the stick held by each hand collapse (that is, the order in which the termination condition is satisfied). For example, FIG. 44 illustrates an example of a state in which all the hands satisfy the termination condition. In the example illustrated in FIG. 40, the sticks held by the respective hands collapse in the order of the hand u12, the hand u13, and the hand u11. Therefore, the information processing device 100 generates the attribute information for ordering the users corresponding to the hands u11 to u13 in the order of the hand u11, the hand u13, and the hand u12 (that is, on the basis of the rank in the game). As in the other examples described above, the information processing device 100 may present the display information v143 indicating the order set between the users on the basis of the generated attribute information in association with the hand corresponding to the user.

The example of the control in which the information processing device 100 orders a plurality of users in accordance with detection results of the hand of the user placed in a predetermined detection range and a real object other than the hand of the user has been described with reference to FIGS. 41 to 44.

1.5.7. Example 1-7: One Example of Information Presenting Method According to Ordering Next, an example of a method in which the information processing device 100 presents various kinds of information on the basis of the attribute information for ordering a plurality of users (that is, the attribute information for weighting a plurality of users) will be described as Example 1-7. Further, in the present embodiment, unless otherwise specified, an example in which the information processing device 100 presents information in accordance with an order set between the users (that is, the four users) corresponding in number to the hands u11 to u14 placed in a predetermined detection range (for example, the region on display surface R10).

Figure 45:
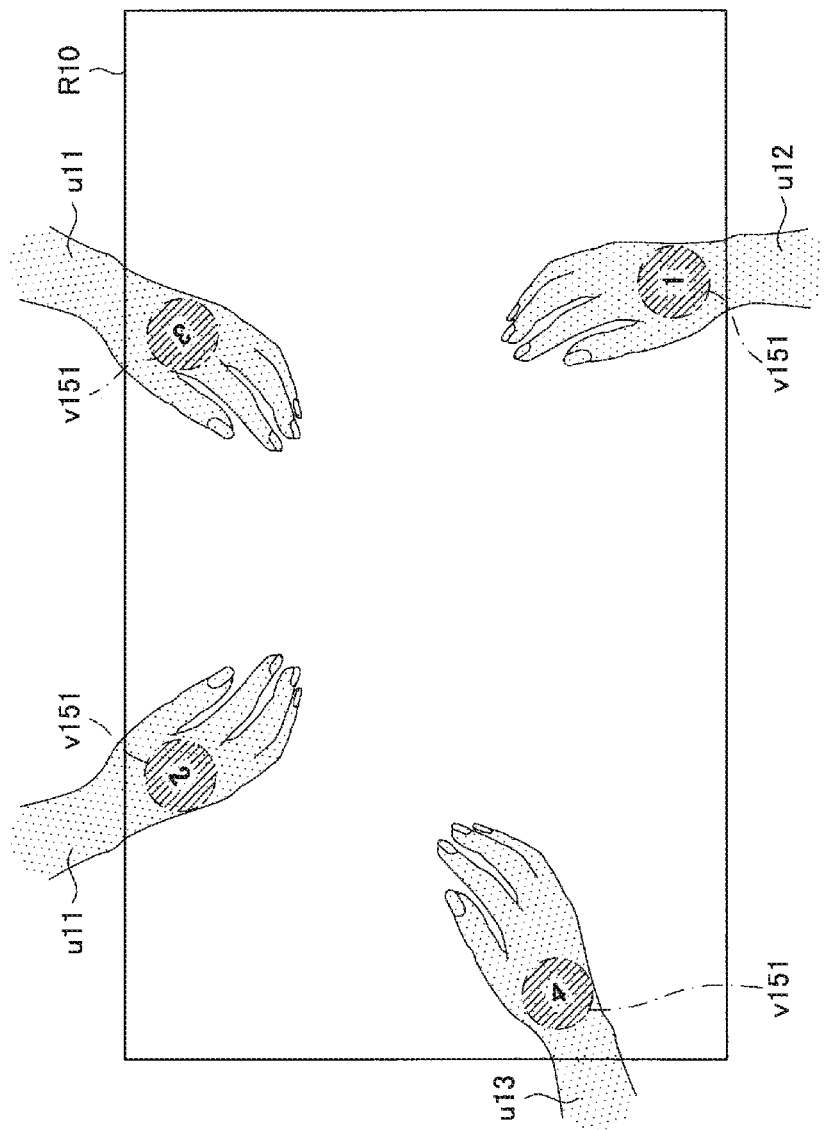
FIG. 45 is an explanatory diagram illustrating an example of operation of an information processing device according to Example 1-7.

For example, FIG. 45 is an explanatory diagram for describing an example of an operation of the information processing device 100 according to Example 1-7 and illustrate an example of a method in which the information processing device 100 presents an order set among a plurality of users. In the example illustrated in FIG. 45, the information processing device 100 presents display information v1151 indicating information indicating the order set to the user to be superimposed on the hand of each user (that is, on the hands u11 to u14) (for example, on the back of the hand) on the basis of the generated attribute information.

Figure 46:
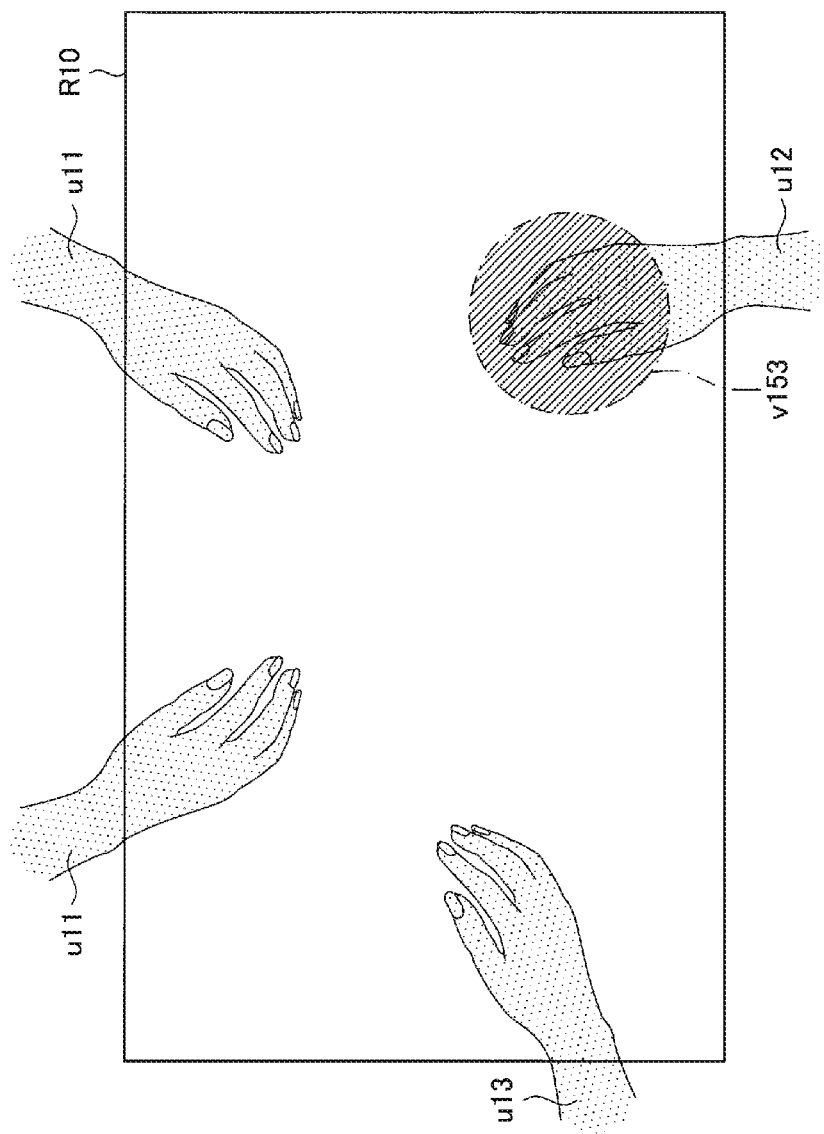
FIG. 46 is an explanatory diagram illustrating an example of operation of an information processing device according to Example 1-7.

FIG. 46 is an explanatory diagram for describing an example of an operation of the information processing device 100 according to Example 1-7 and illustrate an example of a method of presenting information in a case in which the information processing device 100 controls a manipulation on the display surface R10 in accordance with the order set among a plurality of users. In the example illustrated in FIG. 46, the information processing device 100 sequentially receives a manipulation performed by the hands u11 to u14 in accordance with the order set between the users, and when the manipulation is received from a certain hand, the information processing device 100 restrict reception of the manipulation from the other hands. In this case, the information processing device 100 may present information for notifying of the user who manipulation can be currently received. For example, in the example illustrated in FIG. 46, the information processing device 100 specifies the user whose manipulation is received on the basis of the attribute information and presents display information v153 indicating that the manipulation can be received around the hand corresponding to the user (that is, the hand in which the manipulation is received).

Figure 47:
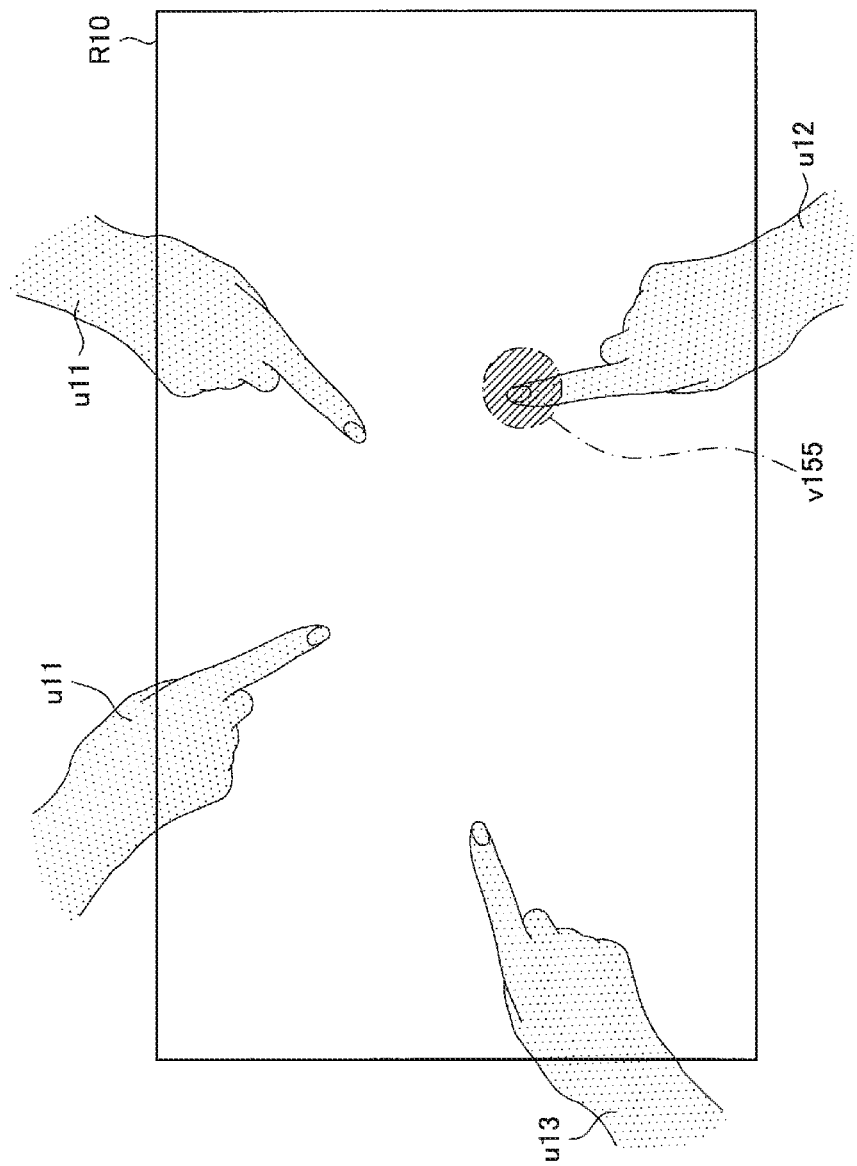
FIG. 47 is an explanatory diagram illustrating an example of operation of an information processing device according to Example 1-7.

Further, FIG. 47 is an explanatory diagram for describing another example of an operation of the information processing device 100 according to Example 1-7 and illustrate an example of a method of presenting information in a case in which the information processing device 100 controls a manipulation on the display surface R10 in accordance with the order set among a plurality of users. In the example illustrated in FIG. 47, the information processing device 100 specifies the user whose manipulation is received on the basis of the attribute information and presents display information v155 indicating that the manipulation can be received around the fingertip of the hand corresponding to the user (that is, the hand in which the manipulation is received).

The example of the method in which the information processing device 100 presents various kinds of information on the basis of the attribute information for ordering a plurality of users (that is, the attribute information for weighting a plurality of users) has been described as Example 1-7.

1.6. Conclusion

As described above, the information processing device 100 according to the first embodiment of the disclosure acquires the manipulation information associated with the manipulator (for example, a position, a direction, a shape, a pattern, an operation, or the like) for each manipulator placed in a predetermined detection range). On the basis of the manipulation information acquired for each manipulator, the information processing device 100 generates the attribute information for controlling an operation based on the manipulation performed by the manipulator. As a specific example, the information processing device 100 may generate the attribute information for associating a plurality of manipulators (that is, classifying a plurality of users into groups). Further, as another example, the information processing device 100 may generate the attribute information for weighting a plurality of users (that is, ordering a plurality of users). Further, the information processing device 100 controls execution of various kinds of functions (for example, various kinds of applications) on the basis of the generated attribute information.

On the basis of the above configuration, even under circumstances in which a plurality of users perform a manipulation at the same time, the information processing device 100 according to the present embodiment can set a condition indicating a relation of a plurality of users and control an operation according to the manipulation performed by each user on the basis of the set condition. Further, the information processing device 100 according to the present embodiment does not require a dedicated device for identifying each user when the condition indicating a relation of a plurality of users is set (that is, the attribute information is generated). Therefore, the information processing device 100 according to the present embodiment can implement the operation related to the setting of the condition indicating the relation of a plurality of users with a simpler configuration and does not require a dedicated device, and thus the convenience can be further improved.

2. Second Embodiment

2.1. Overview

Next, an information processing device 100 according to a second embodiment of the present disclosure will be described. The information processing device 100 according to the first embodiment causes each user to execute an explicit procedure for generating the attribute information when the attribute information is generated. On the other hand, the information processing device 100 according to the second embodiment monitors the manipulation performed by each user on the display surface R10 and dynamically generates the attribute information in accordance with the monitoring result (that is, generates the attribute information in real time). In this regard, hereinafter, the information processing device 100 according to the second embodiment will be described focusing on differences with the information processing device 100 according to the first embodiment. Further, description of substantially the same parts as in the first embodiment is omitted.

2.2. Process

Figure 48:
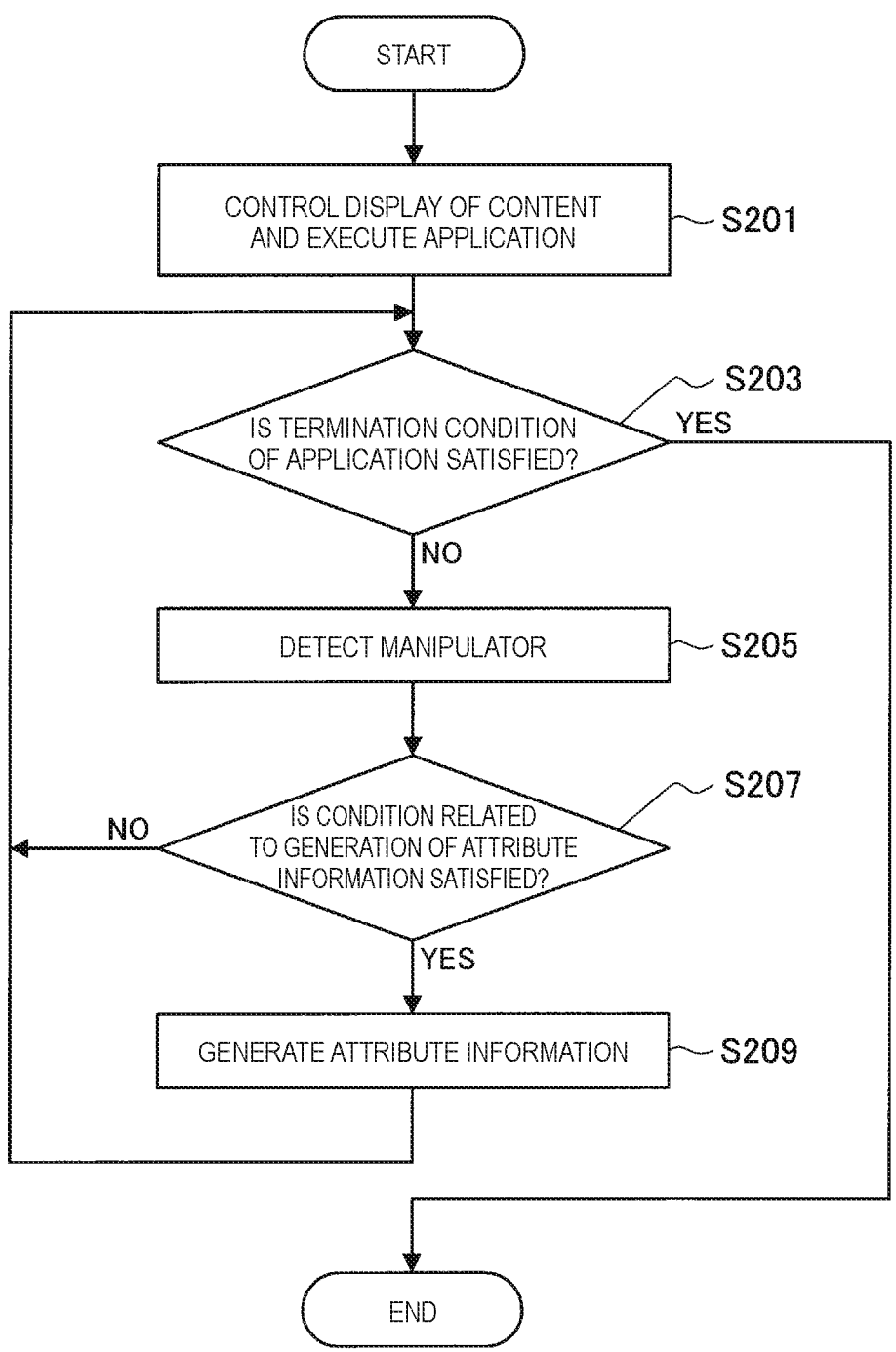
FIG. 48 is a flowchart illustrating an example of a flow of a series of processes of the information processing device according to a second embodiment of the present disclosure.

First, an example of the flow of a series of processes of the information processing device 100 according to the present disclosure will be described with reference to FIG. 48, focusing on, particularly, the process related to the generation of the attribute information by the information processing device 100 and control according to the generated attribute information. FIG. 48 is a flowchart illustrating an example of the flow of a series of processes of the information processing device 100 according to the present embodiment. Further, the present description will proceed with an example in which each user performs various kinds of manipulations or various kinds of operations in a detection range of the manipulator detected by the information processing device 100 (that is, a region on the display surface R10) using the hand of the user as the manipulator.
(Step S201)

First, the information processing device 100 executes control related to display of content, control of operations of various kinds of applications, or the like in accordance with an instruction given from the user.
(Step S205)

Then, the information processing device 100 detects the hand of each user placed in a predetermined detection range (for example, the region on display surface R10) as the manipulator. Then, the information processing device 100 acquires various kinds of information (that is, the manipulation information) according to the attribute information generation condition for each of the hands of the users on the basis of the detection result of the hand of each user.
(Step S207)

Then, the information processing device 100 determines whether or not the manipulation information acquired for the hand of each user satisfies the attribute information generation condition. For example, the information processing device 100 determines whether or not a shape feature, a direction, a pattern, an approach position toward the detection range (that is, the position at which the arm of each user is inserted into the detection range), or the like satisfies the condition for the hand of each user.

(Step S209)

Then, in a case in which there is a hand whose acquired manipulation information satisfies the attribute information generation condition (YES in S207), the information processing device 100 generates the attribute information for the target hand on the basis of the corresponding manipulation information. For example, the information processing device 100 may specify the approach position toward the detection range for at least some hands on the basis of the acquired manipulation information and determine the user corresponding to the hand as the user belonging to the group associated with the specified approach position in advance.

Further, the information processing device 100 may set only the hand which is not an attribute information generation target at that time point as the attribute information generation target (that is, determine that the attribute information generation condition is satisfied). Further, the information processing device 100 may update the already generated attribute information on the basis of newly acquired manipulation information.

Further, in a case in which there is no hand that satisfies the attribute information generation condition (NO in S207), the information processing device 100 need not execute the process related to the generation of the attribute information.

Then, in a case in which the attribute information is generated, the information processing device 100 may execute control related to the display of content and control of operations of various kinds of applications in accordance with the generated attribute information (S201).

(Step S203)

The information processing device 100 continues a series of operations described above (that is, the operation related to steps S201 to S209) until a termination condition of an application is satisfied (NO in S203). Further, in a case in which the termination condition of the application is satisfied (for example, in a case in which the application is terminated on the basis of an instruction given from the user) (YES in S203), the information processing device 100 terminates a series of operations described above.

The example of the flow of a series of processes of the information processing device 100 according to the present disclosure has been described with reference to FIG. 48, focusing on, particularly, the process related to the generation of the attribute information by the information processing device 100 and control according to the generated attribute information. Further, a specific example of the operation related to the generation of the attribute information and the control based on the generated attribute information which are performed by the information processing device 100 according to the present embodiment will be separately described later as another example.

2.3. Examples

Next, more specific application examples of the information processing device 100 will be described as examples of the information processing device 100 according to the second embodiment of the present disclosure. Further, in the following description, an example of the information processing device 100 according to the present embodiment is also referred to as an "example 2" in some cases.

(Determination of Associated Group Based on Angle of Finger)

Figure 49:
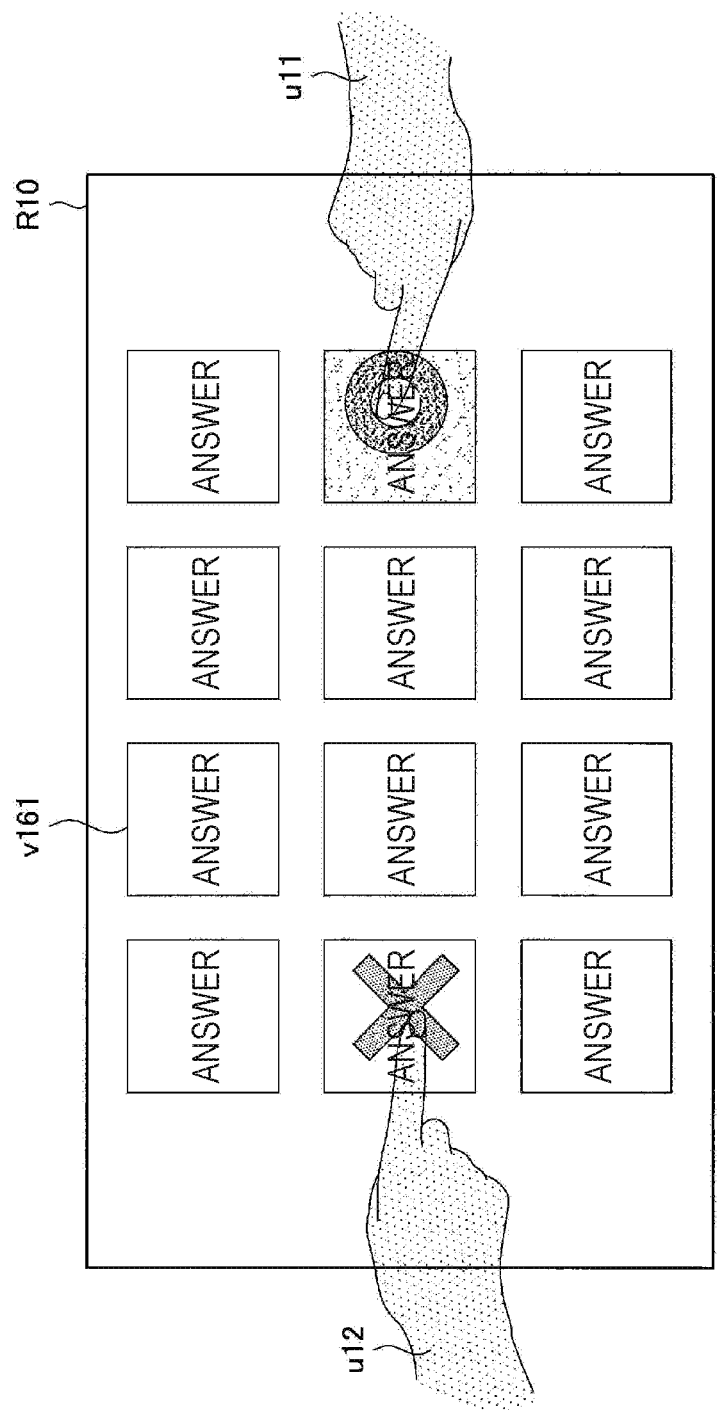
FIG. 49 is an explanatory diagram illustrating an example of operation of an information processing device according to Example 2.
Figure 50:
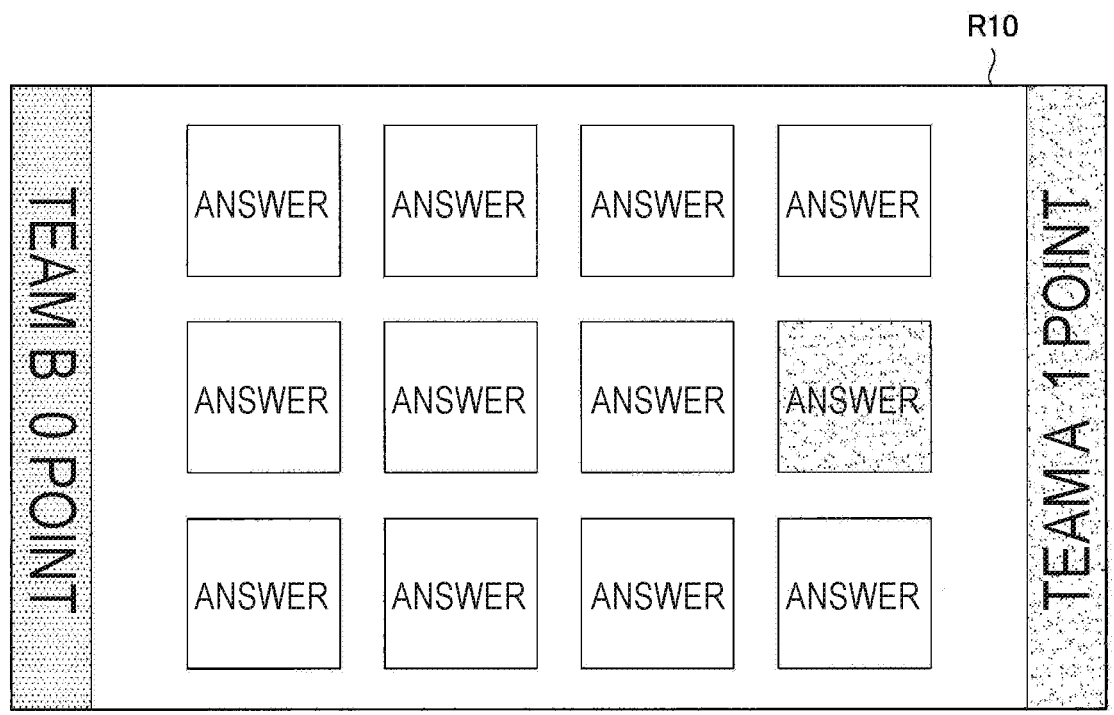
FIG. 50 is an explanatory diagram illustrating an example of operation of an information processing device according to Example 2.

First, an example of control in which the information processing device 100 determines a group to which the user belongs in accordance with a direction in which the finger of the hand of each of a plurality of users is facing (that is, the angle of the finger) (that is, control of generating the attribute information for classifying the users into groups) will be described with reference to FIGS. 49 and 50. FIGS. 49 and 50 are explanatory diagrams for describing an example of an operation of the information processing device 100 according to the second embodiment and illustrate an example of control in which the information processing device 100 determines a group to which the user belongs in accordance with a direction in which the finger of the hand of each of a plurality of users is facing. Further, FIGS. 49 and 50 illustrate an example in in which the information processing device 100 is applied to a so-called quiz game and illustrate an example in which a plurality of users are divided into a plurality of groups and compete for a score according to the number of correct answers.

Specifically, as illustrated in FIG. 49, the information processing device 100 gives a problem to the user and presents display information v161 indicating candidates of an answer of the problem on the display surface R10. Each user selects an answer to a problem from the presented display information v161 by touching the answer with the finger. For example, in the example illustrated in FIG. 49, the finger of the hand u11 touches the display information v161 corresponding to a correct answer, and the finger of the hand u12 touches the display information v161 different from the correct answer.

At this time, the information processing device 100 determines the direction of the finger of the hand u11 touching the display information v161 corresponding to the correct answer and determines the group to which the user corresponding to the hand u11 belongs in accordance with a determination result. For example, the hand u11 touches the display information v161 such that the finger faces the left side of the drawing. On the other hand, the hand u12 touches the display information v161 such that the finger faces the right side of the drawing. Therefore, the information processing device 100 determines that the users corresponding to the hands u11 and u12 belong to different groups on the basis of the detection results of the angles of the fingers of the hands u11 and u12.

For example, FIG. 50 illustrates an example of control in which the information processing device 100 receives the touch manipulation performed on the display information v161 corresponding to the correct answers by the hand u11. More specifically, as a result of recognizing that the finger of the hand u11 faces the left side of the drawing in FIG. 49, the information processing device 100 recognizes that the user corresponding to the hand u11 belongs to a "team A." Similarly, as a result of recognizing that the finger of the hand u12 faces the right side of the drawing in FIG. 49, the information processing device 100 recognizes that the user corresponding to the hand u11 belongs to a "team B." Further, in the example illustrated in FIG. 50, the information processing device 100 adds a score to the "team A" associated with the user corresponding to the hand u11 touching the display information v161 corresponding to the correct answer.

The example of the control in which the information processing device 100 determines a group to which the user belongs in accordance with a direction in which the finger of the hand of each of a plurality of users is facing (that is, the angle of the finger) has been described with reference to FIGS. 49 and 50.

(Determination of Associated Group Based on Approach Position of Hand)

Figure 51:
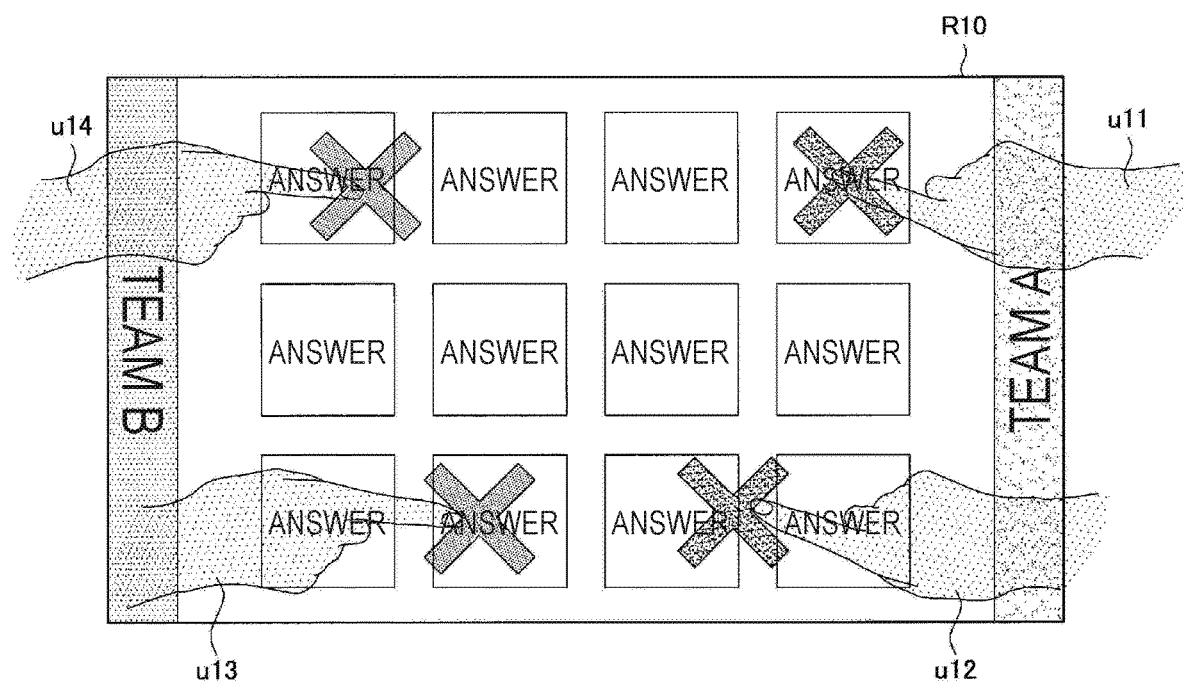
FIG. 51 is an explanatory diagram illustrating an example of operation of an information processing device according to Example 2.

Next, an example of control in which the information processing device 100 determines a group to which the user belongs in accordance with the approach position of the hand of each of a plurality of users toward a predetermined detection range (for example, the region on the display surface R10) (that is, the position to which the arm of the user is inserted into the region) will be described with reference to FIG. 51. FIG. 51 is an explanatory diagram for describing an example of an operation of the information processing device 100 according to Example 2 and illustrate an example of control in which the information processing device 100 determines a group to which the user belongs in accordance with the approach position of the hand of each of a plurality of users toward a predetermined detection range. Further, FIG. 51 illustrates an example in in which the information processing device 100 is applied to a so-called quiz game and illustrate an example in which a plurality of users are divided into a plurality of groups and compete for a score according to the number of correct answers, similarly to the example illustrated in FIGS. 49 and 50.

Specifically, the example illustrated in FIG. 51 differs from the example illustrated in FIGS. 49 and 50 in that the information processing device 100 determines the approach position of the hand of each of a plurality of users toward a predetermined detection range, and determines the group to which the user corresponding to the hand belongs in accordance with a determination result. For example, in the example illustrated in FIG. 51, the hands u11 and u12 enter the region on the display surface R10 from the right side of the drawing. Therefore, the information processing device 100 recognizes that the users corresponding to the hands u11 and u12 belongs to the "team A." Further, the hands u13 and u14 enter the region on the display surface R10 from the left side of the drawing. Therefore, the information processing device 100 recognizes that the users corresponding to the hands u13 and u14 belongs to the "team B."

Further, since a subsequent process is substantially similar to the example described above with reference to FIGS. 49 and 50, detailed description thereof is omitted.

The example of the control in which the information processing device 100 determines a group to which the user belongs in accordance with the approach position of the hand of each of a plurality of users toward a predetermined detection range has been described above with reference to FIG. 51.

(Determination of Associated Group Based on Shape of Hand)

Figure 52:
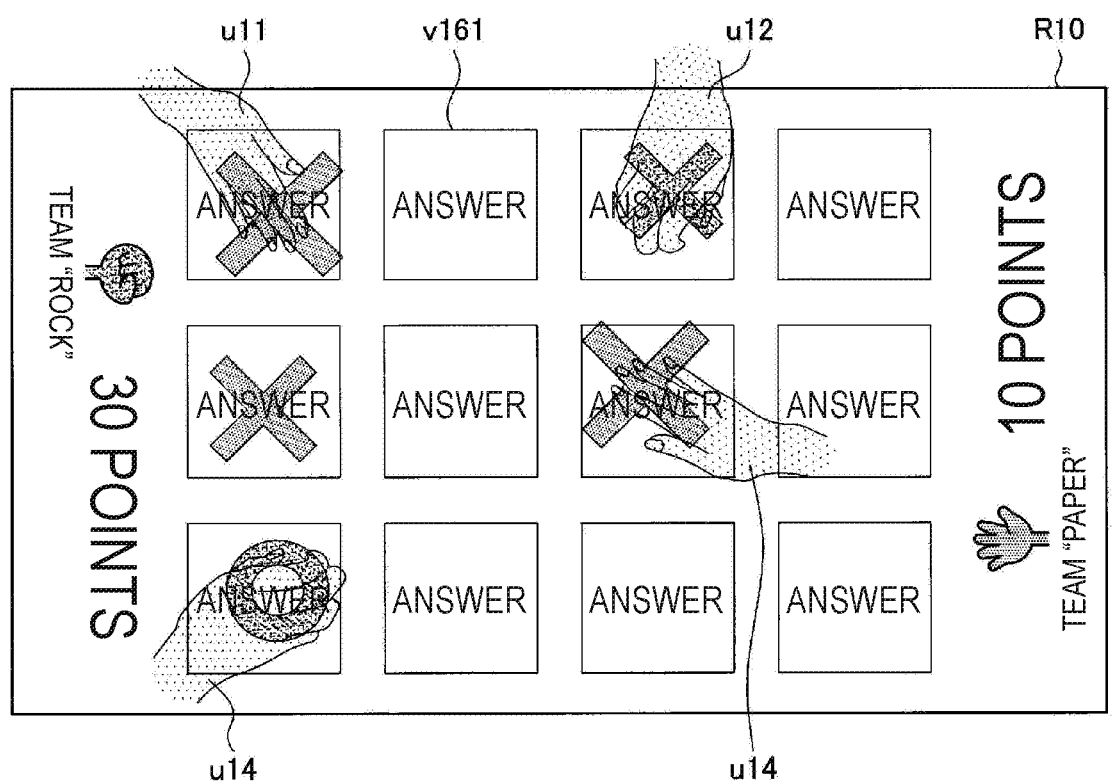
FIG. 52 is an explanatory diagram illustrating an example of operation of an information processing device according to Example 2.

Next, an example of control in which the information processing device 100 determines the group to which the user belongs in accordance with the shape of the hand of each of a plurality of users will be described with reference to FIG. 52. FIG. 52 is an explanatory diagram for describing an example of an operation of the information processing device 100 according to Example 2 and illustrates an example of control in which the information processing device 100 determines the group to which the user belongs in accordance with the shape of the hand of each of a plurality of users. Further, FIG. 52 illustrates an example in which the information processing device 100 is applied to a so-called quiz game and illustrate an example in which a plurality of users are divided into a plurality of groups and compete for a score according to the number of correct answers, similarly to the example illustrated in FIGS. 49 and 51.

Specifically, the example illustrated in FIG. 52 differs from the example illustrated in FIGS. 49 and 51 in that the information processing device 100 determines the shape of the hand of each of a plurality of users and determines the group to which the user corresponding to the hand belongs in accordance with a determination result. More specifically, in the example illustrated in FIG. 52, the group to which the user corresponding to the hand belongs is determined in accordance with whether the shape of the hand touching the display information v161 is "rock" or "paper." For example, in the example illustrated in FIG. 52, the hands u11 and u13 indicate the shape of "paper." Therefore, the information processing device 100 recognizes that the users corresponding to the hands u11 and u13 belong to a "team paper." Further, the hands u12 and u14 indicate the shape of "rock." Therefore, the information processing device 100 recognizes that the users corresponding to the hands u12 and u14 belong to a "team rock."

Further, since a subsequent process is substantially similar to the example described above with reference to FIGS. 49 and 51, detailed description thereof is omitted.

The example of the control in which the information processing device 100 determines the group to which the user belongs in accordance with the shape of the hand of each of a plurality of users has been described with reference to FIG. 52.

(Application Example to Various Kinds of Applications)

Next, an example in which the information processing device 100 according to the present embodiment is applied to various kinds of applications such as a game, a paint, or the like will be described.

(Application Example 1 to Game)

Figure 53:
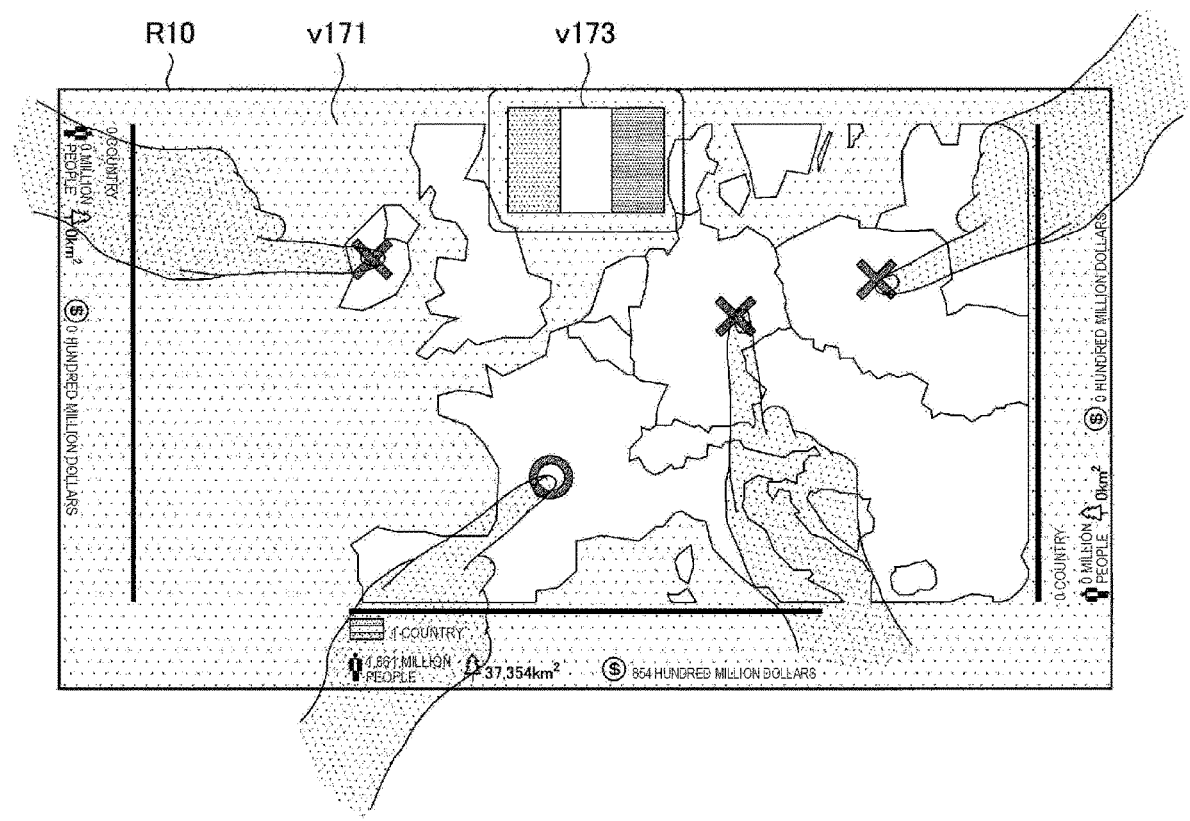
FIG. 53 is an explanatory diagram illustrating an example of operation of an information processing device according to Example 2.

First, an example in which the information processing device 100 according to the present embodiment is applied to a game will be described with reference to FIG. 53. FIG. 53 is an explanatory diagram for describing an example of an operation of the information processing device 100 according to Example 2 and illustrates an example in which the information processing device 100 is applied to a game of finding a position of a country corresponding to a presented national flag. In the example illustrated in FIG. 53, the information processing device 100 presents display information v171 indicating a map of a desired value range and display information v173 indicating a national flag corresponding to any one of countries displayed on the map onto the display surface R10. Each user selects the position of the country corresponding to the national flag presented as the display information v173 by touching it with the finger from the map presented as the display information v171.

The information processing device 100 specifies a country corresponding to a position on the map indicated by the finger on the basis of the position on the display information v171 touched by the finger, and determines whether or not selection performed by the finger is a correct answer in accordance with the specified country coincides with the country indicated by the national flag presented as the display information v173. Further, at this time, the information processing device 100 determines the group to which the user belongs in accordance with the approach position of the hand of each of a plurality of users toward the region on the display surface R10. Then, the information processing device 100 adds a score to the group associated with the user corresponding to the finger designating the correct answer. Further, in a case in which each user touches the position on the map, the information processing device 100 may present the displays display information indicating whether or not it is the correct answer in a display form corresponding to the group to which the user belongs (for example, the color corresponding to the group or the like).

The example in which the information processing device 100 according to the present embodiment is applied to the game of finding a position of a country corresponding to the presented national flag has been described above with reference to FIG. 53.

(Application Example to Paint Software)

Figure 54:
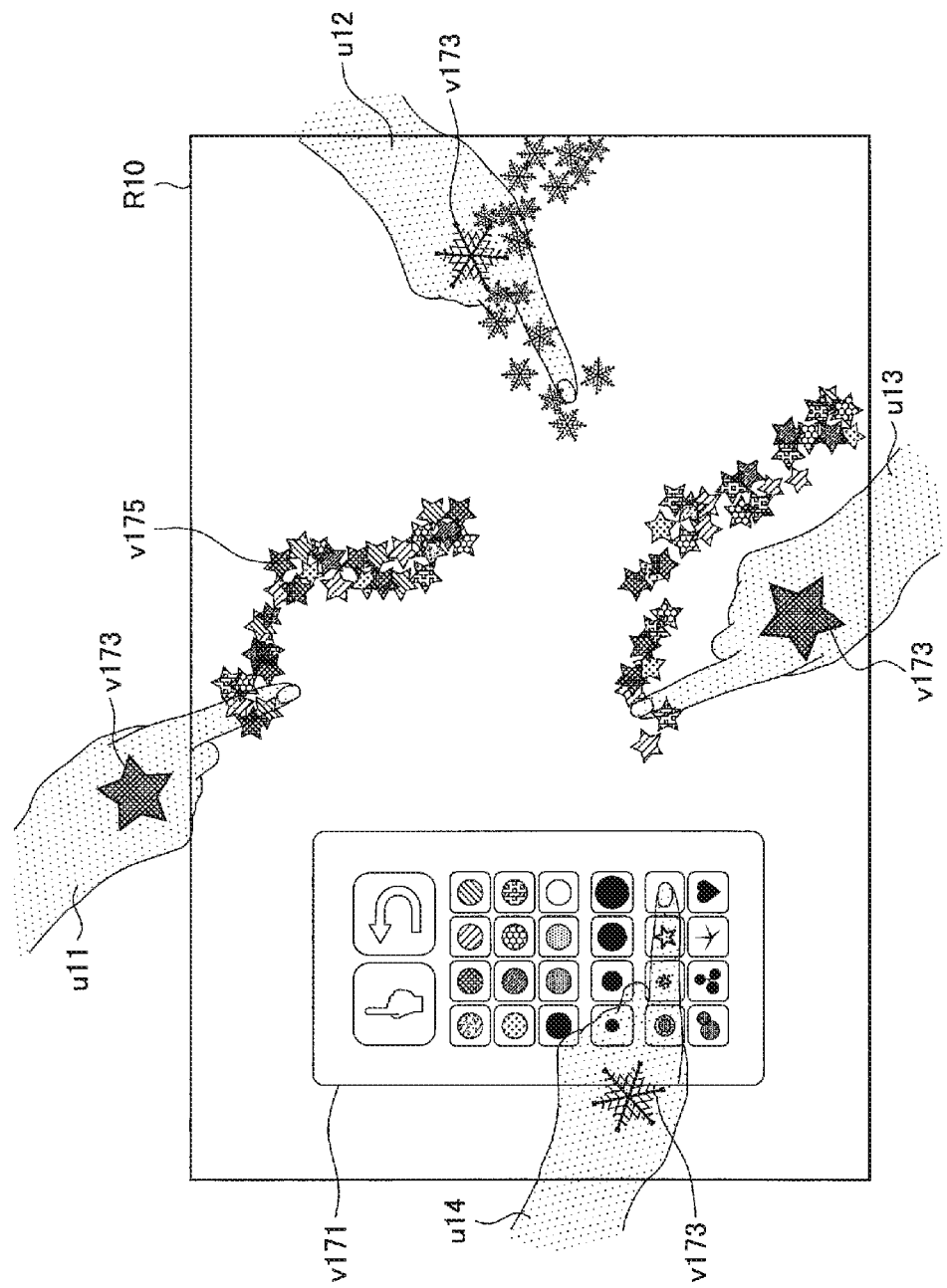
FIG. 54 is an explanatory diagram illustrating an example of operation of an information processing device according to Example 2.

Next, an example in which the information processing device 100 according to the present embodiment is applied to so-called paint software for drawing a picture or the like will be described with reference to FIG. 54. FIG. 54 is an explanatory diagram for describing an example of an operation of the information processing device 100 according to Example 2 and illustrate an example in which the information processing device 100 is applied to so-called paint software.

For example, the information processing device 100 presents a manipulation screen v171 for selecting a color and a brush onto the display surface R10. The user can touch the icon corresponding to a desired color or brush from the manipulation screen v171 with the finger and perform switching to the color or the brush corresponding to the icon. Further, in a case in which the information processing device 100 recognizes the touch manipulation performed on a region other than the manipulation screen v171 in the display surface R10 by the finger of each user, the information processing device 100 presents display information corresponding to a combination of the selected color and brush in accordance with a trajectory of the finger. Further, the information processing device 100 may present the display information v173 indicating the color and the brush selected at that time in association with the hand of each user.

Further, in the example illustrated in FIG. 54, the information processing device 100 classifies a plurality of users into a plurality of groups and controls various kinds of operations in accordance with a classification result into the groups. As a more specific example, in a case in which a certain user manipulates the manipulation screen v171 and switches a setting of the color or the brush, the information processing device 100 may similarly switch a setting of the color or the brush of other users belonging to the same group as the user.

As a more specific example, in the example illustrated in FIG. 54, the users corresponding to the hands u11 and u13 belong to the same group. Therefore, the same color and brush setting is applied as a setting corresponding to the users of the hands u11 and u13. Similarly, the users corresponding to the hands u12 and u14 belong to the same group. Therefore, the same color and brush setting is applied as a setting corresponding to the users of the hands u12 and u14. Further, in the example illustrated in FIG. 54, the hand u14 manipulates the manipulation screen v171 and switches the brush setting. In this case, the information processing device 100 similarly switches the brush setting corresponding to the user corresponding to the hand u12 belonging to the same group as the user corresponding to the hand u14.

The example in which the information processing device 100 according to the present embodiment is applied to so-called paint software for drawing a picture or the like has been described with reference to FIG. 54.

(Application Example 2 to Game)

Next, another example in which the information processing device 100 according to the present embodiment is applied to a game will be described.

Figure 55:
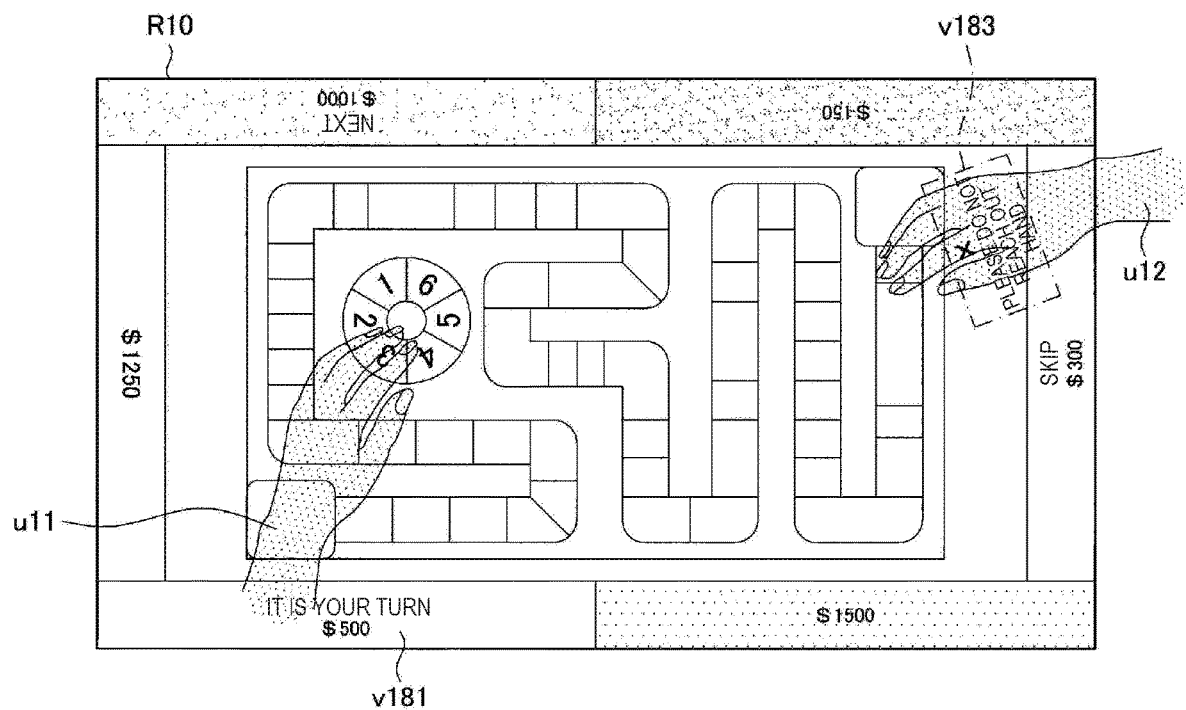
FIG. 55 is an explanatory diagram illustrating an example of operation of an information processing device according to Example 2.

For example, FIG. 55 is an explanatory diagram for describing an example of an operation of the information processing device 100 according to Example 2 and illustrates an example in which the information processing device 100 is applied to a board game played by a plurality of persons.

In the example illustrated in FIG. 55, the information processing device 100 determines the user corresponding to the hand in accordance with the approach position of the hand placed in the region on the display surface R10 toward the region (that is, the position at which the arm is inserted into the region). Further, at this time, the information processing device 100 may present information related to the user (for example, a game result or information indicating a state in the game) onto the region corresponding to the approach position for determining the hand of each user as display information v181.

Further, in the example illustrated in FIG. 55, the information processing device 100 orders the users and controls the order in which a game manipulation is performed in accordance with an ordering result. For example, the example illustrated in FIG. 55 illustrates a state in which a manipulation turn of the user corresponding to the hand u11 comes. In this case, the information processing device 100 receives only the manipulation performed by the hand u11 and restricts the reception of the manipulation performed by the hand of another user. For example, in the example illustrated in FIG. 55, the hand u12 of another user whose manipulation turn does not come performs a manipulation on the display surface R10. In this case, the information processing device 100 may present notification information v183 indicating that the reception of the manipulation is restricted in association with the hand u12.

Further, the information processing device 100 may present information indicating the manipulation turn for the display information v181 corresponding to each user in accordance with the ordering set among a plurality of users.

Further, 56 is an explanatory diagram for describing an example of an operation of the information processing device 100 according to Example 2 and illustrates an example in which the information processing device 100 is applied to a game in which two users perform a manipulation in turn.

Figure 56:
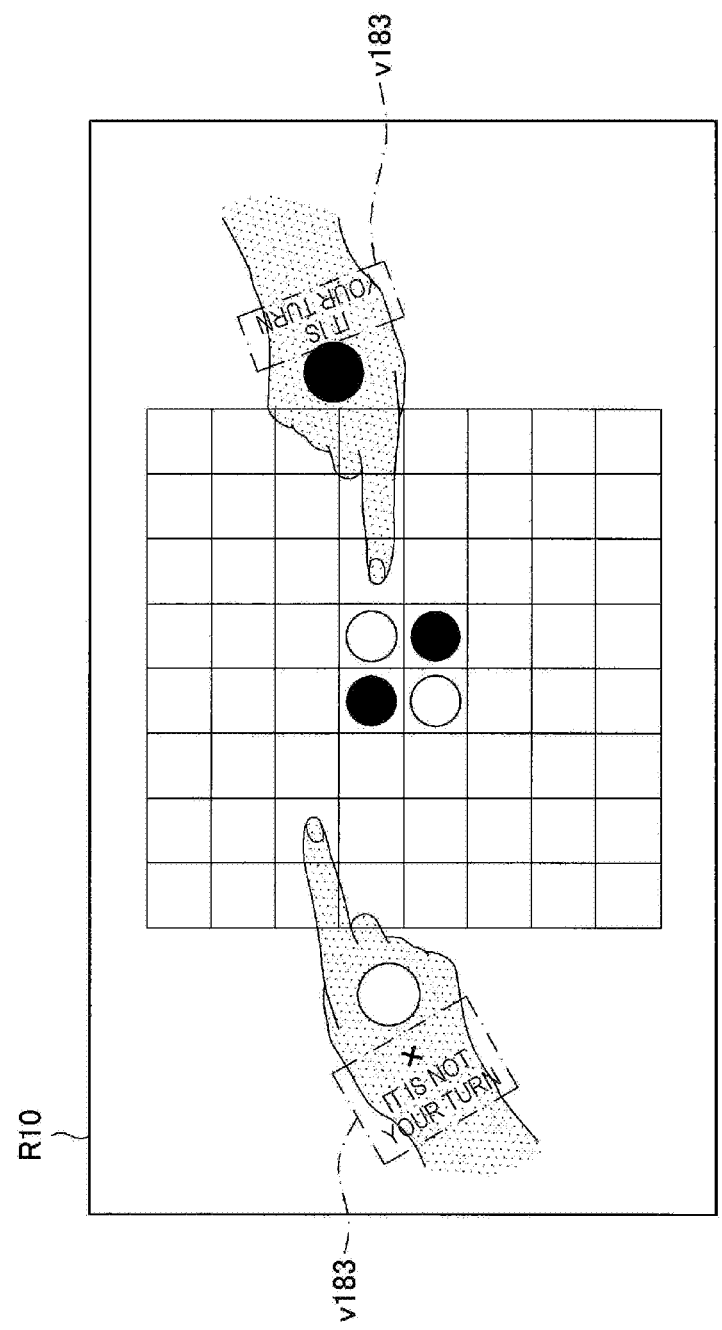
FIG. 56 is an explanatory diagram illustrating an example of operation of an information processing device according to Example 2.

In the example illustrated in FIG. 56, for example, the information processing device 100 may determine the user corresponding to the hand in accordance with the approach position of the hand placed in the region on the display surface R10 toward the region. Further, as another example, the information processing device 100 may determine the user corresponding to the hand in accordance with the angle of the finger of the hand placed in the region on the display surface R10.

Further, in the example illustrated in FIG. 56, similar to the example illustrated in FIG. 55, the information processing device 100 orders between the users and controls the order of manipulating the game in accordance with an ordering result. In other words, in the example illustrated in FIG. 56, the information processing device 100 may receive only the manipulation performed by the hand corresponding to the user whose manipulation turn comes and restrict the reception of manipulation by the hand of another user. Further, the information processing device 100 may present notification information v183 indicating whether or not the manipulation turn of the user comes for each hand of each user in association with the hand.

Figure 57:
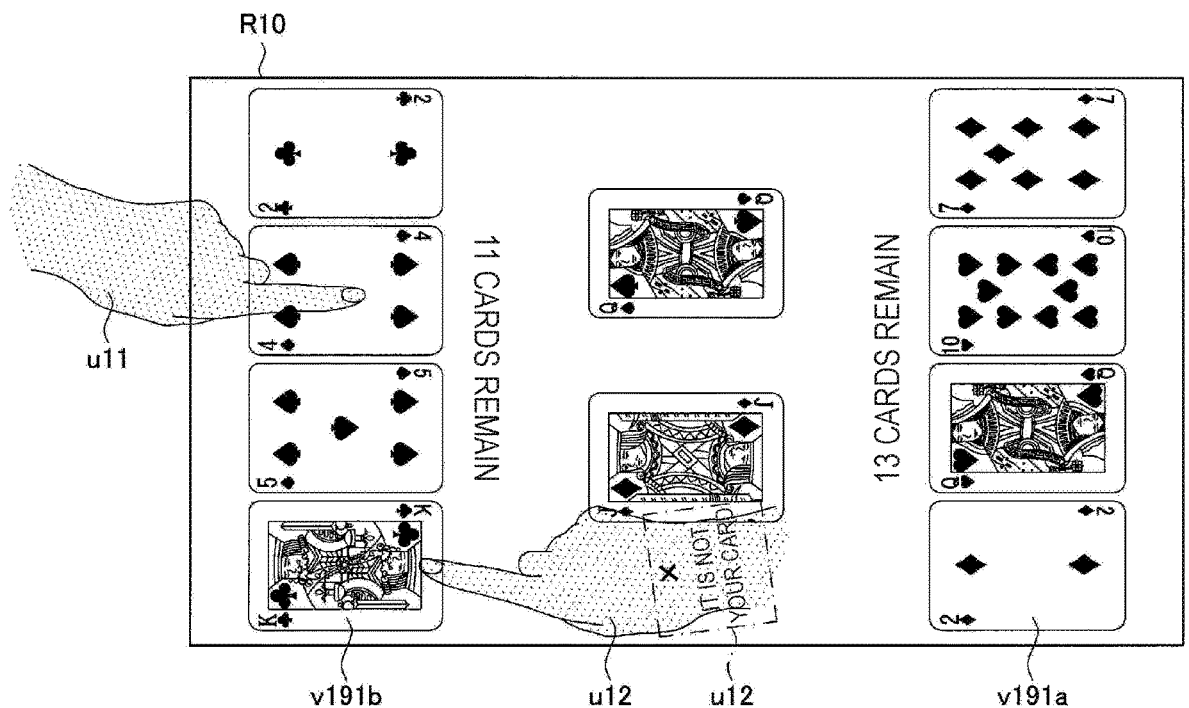
FIG. 57 is an explanatory diagram illustrating an example of operation of an information processing device according to Example 2.

Further, FIG. 57 is an explanatory diagram for describing an example of an operation of the information processing device 100 according to Example 2 and illustrates an example in which the information processing device 100 is applied to a game in which a plurality of users selects display information corresponding to his/himself.

In the example illustrated in FIG. 57, for example, the information processing device 100 may determine the user corresponding to the hand in accordance with the approach position of the hand placed in the region on the display surface R10 toward the region. Further, as another example, the information processing device 100 may determine the user corresponding to the hand in accordance with the angle of the finger of the hand placed in the region on the display surface R10.

Further, in the example illustrated in FIG. 57, the information processing device 100 presents display information v191a and v191b corresponding to the respective users. Further, the display information v191a is associated with the user corresponding to the hand u12 in advance. In other words, the information processing device 100 receives only the manipulation performed by the hand u12 as the manipulation on the display information v191a. Similarly, the display information v191b is associated with the user corresponding to the hand u11 in advance. In other words, the information processing device 100 receives only the manipulation performed by the hand u11 as the manipulation on the display information v191b.

For example, in the example illustrated in FIG. 57, the hand u12 performs the manipulation on the display information v191b corresponding to the user different from the user corresponding to the hand u12. In this case, the information processing device 100 may present the notification information v183 indicating that the reception of the manipulation is restricted in association with the hand u12.

2.4. Conclusion

As described above, the information processing device 100 according to the second embodiment of the present disclosure acquires the manipulation information for each manipulator placed in a predetermined detection range and dynamically generates the attribute information on the basis of the acquired manipulation information. Further, the information processing device 100 dynamically executes control related to display of content and control of operations of various kinds of applications in accordance with the dynamically generated attribute information. With this configuration, for example, the information processing device 100 according to the present embodiment can set the condition indicating a relation of a plurality of users in real time and reflect the setting of the condition in the process being performed (for example, display of content or an operation of an application).

3. Hardware Configuration Example

Figure 58:
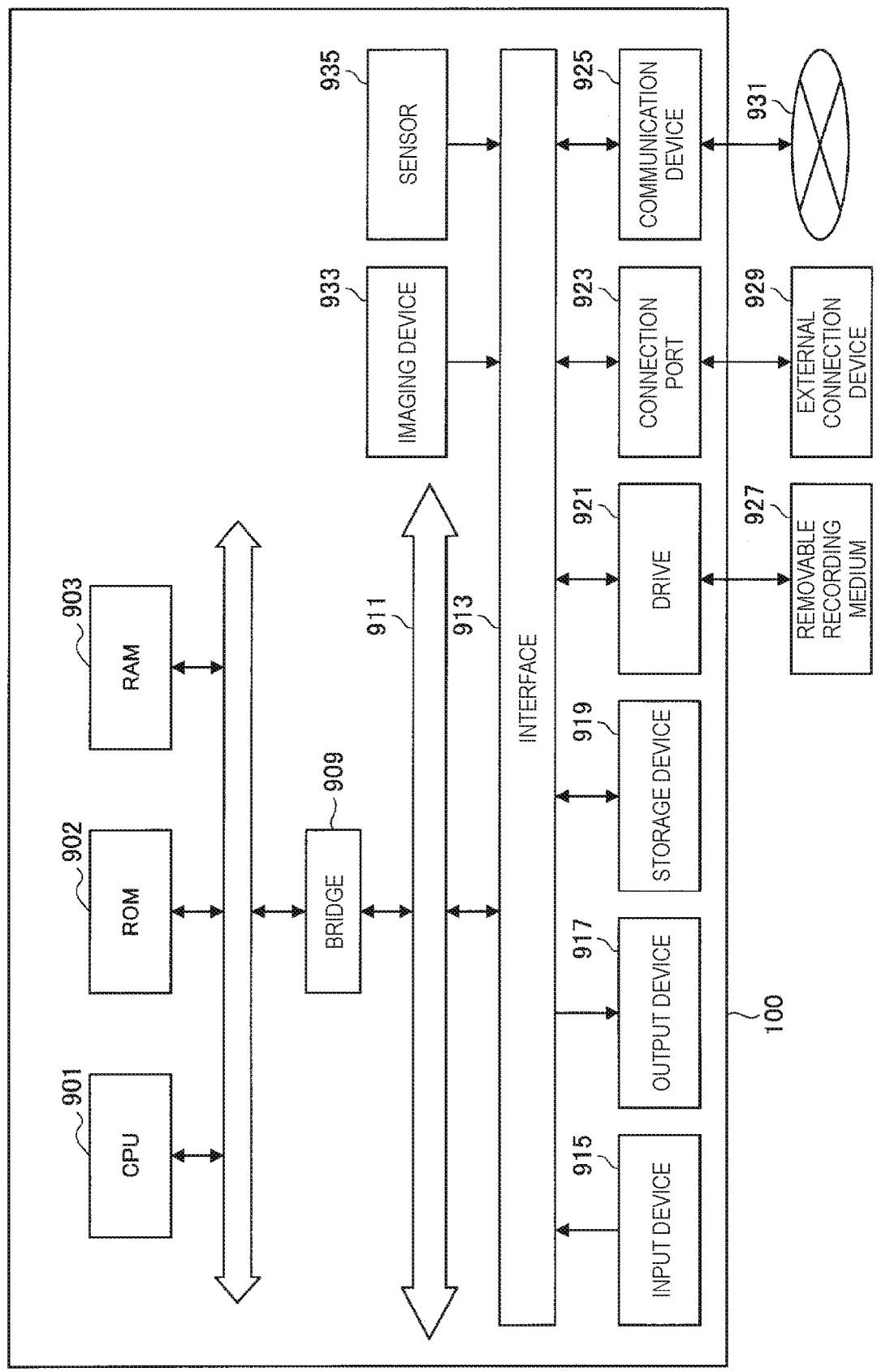
FIG. 58 is a block diagram illustrating a hardware configuration example of an information processing device according to one embodiment of the present disclosure.

Next, a hardware configuration of the information processing device 100 according to an embodiment of the present disclosure will be described with reference to FIG. 58. FIG. 58 is a block diagram illustrating a hardware configuration example of the information processing device 100 according to an embodiment of the present disclosure.

As illustrated in FIG. 58, the information processing device 100 includes a central processing unit (CPU) 901, a read only memory (ROM) 903, and a random access memory (RAM) 905. In addition, the information processing device 100 may include a host bus 907, a bridge 909, an external bus 911, an interface 913, an input device 915, an output device 917, a storage device 919, a drive 921, a connection port 923, and a communication device 925.

Further, the information processing device 100 may include an imaging device 933 and a sensor 935 as necessary. The information processing device 100 may include a processing circuit such as a digital signal processor (DSP) or an application specific integrated circuit (ASIC) instead of or in addition to the CPU 901.

The CPU 901 serves as an operation processing device and a control device, and controls all of or a part of the operations in the information processing device 100 in accordance with various programs recorded in the ROM 903, the RAM 905, the storage device 919 or a removable recording medium 927. The ROM 903 stores programs and operation parameters used by the CPU 901. The RAM 905 temporarily stores program used in the execution of the CPU 901 and parameters that changes as appropriate in the execution. The CPU 901, ROM 903, and RAM 905 are connected to each other by the host bus 907 including an internal bus such as a CPU bus. In addition, the host bus 907 is connected to the external bus 911 such as a peripheral component interconnect/interface (PCI) bus via the bridge 909. Note that, the above-described control unit 120 may be implemented by the CPU 904, for example.

The input device 915 is, for example, a device operated by a user with a mouse, a keyboard, a touch panel, buttons, switches, a lever, and the like. The input device 915 may include a mic that detects a sound of a user. The input device 915 may be, for example, a remote control unit using infrared light or other radio waves, or may be an external connection device 929 such as a portable phone operable in response to the operation of the information processing device 100. The input device 915 includes an input control circuit that generates an input signal on the basis of the information input by a user and outputs the input signal to the CPU 901. By operating the input device 915, a user can input various types of data to the information processing device 100 or issue instructions for causing the information processing device 100 to perform a processing operation. In addition, the imaging device 933 to be described below can function as an input device by imaging a motion or the like of a hand of the user. Note that, the above-described input unit 110 may be implemented by the input device 915, for example.

The output device 917 includes a device capable of visually or audibly notifying a user of the acquired information. The output device 917 may be, for example, a display device such as a liquid crystal display (LCD), a plasma display panel (PDP), an organic electro-luminescence (EL) display, and a projector, a hologram display device, an audio output device, such as a speaker or a headphone, and a printer. The output device 917 outputs the results obtained from the process of the information processing device 100 in a form of video such as text or an image and audio such as voice or sound. In addition, the output device 917 may include a light or the like to brighten the surroundings. Note that, the above-described output unit 130 may be implemented by the output device 917, for example.

The storage device 919 is a device for data storage configured as an example of a storage unit of the information processing device 100. The storage device 919 includes, for example, a magnetic storage device such as a hard disk drive (HDD), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing device 100 or externally attached thereto. The drive 921 reads information recorded in the attached removable recording medium 927 and outputs the information to the RAM 905. Further, the drive 921 writes record in the attached removable recording medium 927.

The connection port 923 is a port used to directly connect devices to the information processing device 100. The connection port 923 may be, for example, a universal serial bus (USB) port, an IEEE1394 port, a small computer system interface (SCSI) port, or the like. In addition, the connection port 923 may be an RS-232C port, an optical audio terminal, High-Definition Multimedia Interface (HDMI) (registered trademark) port, or the like. By connecting the external connection device 929 to the connection port 923, various data may be exchanged between the information processing device 100 and the external connection device 929.

The communication device 925 is, for example, a communication interface including a communication device or the like for connection to a communication network 931. The communication device 925 may be, for example, a communication card for a wired or wireless local area network (LAN), Bluetooth (registered trademark), wireless USB (WUSB), or the like. In addition, the communication device 925 may be a router for optical communication, a router for asymmetric digital subscriber line (ADSL), a modem for various kinds of communications, or the like. The communication device 925 transmits and receives signals to and from, for example, the Internet or other communication devices using a predetermined protocol such as TCP/IP. In addition, the communication network 931 to be connected to the communication device 925 is a network connected in a wired or wireless manner, and is, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal oxide semiconductor (CMOS), as well as various members such as one or more lenses for controlling the formation of a subject image on the image sensor, for example. The imaging device 933 may be a device that captures still images and may also be a device that captures moving images.

The sensor 935 is any of various sensors such as an acceleration sensor, a gyro sensor, a geomagnetic sensor, an optical sensor, or a sound sensor, for example. The sensor 935 acquires information regarding the state of the information processing device 100, such as the attitude of the case of the information processing device 100, as well as information regarding the environment surrounding the information processing device 100, such as brightness or noise surrounding the information processing device 100, for example. The sensor 935 may also include a global positioning system (GPS) sensor that receives GPS signals and measures the latitude, longitude, and altitude of the device.

The foregoing thus illustrates an exemplary hardware configuration of the information processing device 100. Each of the above components may be realized with general-purpose members or hardware specialized in the function of each component. Such a configuration may also be modified as appropriate in accordance with the technological level at the time of the implementation.

4. Conclusion

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device, including:

an acquiring unit configured to acquire a detection result of information related to a manipulator for each of a plurality of manipulators placed in a predetermined region; and a generating unit configured to generate attribute information for controlling an operation based on a manipulation performed by each of the plurality of manipulators on a basis of the detection result.

(2)

The information processing device according to (1), in which the generating unit generates the attribute information for associating two or more manipulators among the plurality of manipulators.

(3)

The information processing device according to (2), in which the acquiring unit acquires a detection result of a shape feature of the manipulator as information related to the manipulator, and the generating unit associates two or more manipulators among the plurality of manipulators on a basis of the shape feature of each of the plurality of manipulators according to the detection result.

(4)

The information processing device according to (2), in which the acquiring unit acquires a detection result of a position or a direction of the manipulator as information related to the manipulator, and the generating unit associates two or more manipulators among the plurality of manipulators on a basis of the position or the direction of each of the plurality of manipulators according to the detection result.

(5)

The information processing device according to (4), in which the generating unit associates two or more manipulators adjacent to each other among the plurality of manipulators on a basis of the detection result.

(6)

The information processing device according to (2), in which the acquiring unit acquires a detection result of an operation of the manipulator as information related to the manipulator, and the generating unit associates two or more manipulators among the plurality of manipulators on a basis of the operation of each of the plurality of manipulators according to the detection result.

(7)

The information processing device according to (2), in which the acquiring unit acquires a manipulation result performed on a predetermined manipulation target by the manipulator as information related to the manipulator, and the generating unit associates two or more manipulators among the plurality of manipulators on the basis of the manipulation result performed by each of the plurality of manipulators.

(8)

The information processing device according to any one of (2) to (7), in which the acquiring unit acquires identification information for identifying respective users corresponding to the plurality of manipulators, and the generating unit controls an operation related to an association between at least some manipulators among the plurality of manipulators on a basis of the identification information.

(9)

The information processing device according to any one of (2) to (8), in which the generating unit generates new attribute information on a basis of the detection result and the attribute information generated in past.

(10)

The information processing device according to (9), in which the generating unit controls an operation related to an association between at least some manipulators among the plurality of manipulators on a basis of the detection result and the attribute information generated in past.

(11)

The information processing device according to any one of (2) to (10), further including a display control unit configured to present display information corresponding to an association between two or more manipulators on a basis of the attribute information.

(12)

The information processing device according to (11), in which the display control unit presents the display information indicating the association between the two or more manipulators in association with the manipulators on a basis of the attribute information.

(13)

The information processing device according to (11), in which the display control unit presents the display information on a basis of the detection result and the acquired identification information for identifying users corresponding to the plurality of manipulators.

(14)

The information processing device according to (11), in which the display control unit presents the display information on a basis of the detection result and the attribute information generated in the past.

(15)

The information processing device according to any one of (2) to (14), further including a control unit configured to control reception of a manipulation performed by at least some manipulators among the plurality of manipulators in accordance with an association between the two or more manipulators based on the attribute information.

(16)

The information processing device according to (1), in which the generating unit generates the attribute information for weighting the plurality of manipulators.

(17)

The information processing device according to (16), further including a display control unit configured to present display information according to weight of the manipulator in association with the manipulator on a basis of the attribute information.

(18)

The information processing device according to (16) or (17), further including a control unit configured to restrict reception of a manipulation performed by at least some manipulators among the plurality of manipulators in accordance with weighting of the plurality of manipulators based on the attribute information.

(19)

An information processing method, including:

acquiring a detection result of information related to each of a plurality of manipulators placed in a predetermined region: and generating, by a processor, attribute information for controlling an operation based on a manipulation performed by each of the plurality of manipulators on a basis of the detection result.

(20)

A program causing a computer to execute:

acquiring a detection result of information associated with each of a plurality of manipulators placed in a predetermined region; and generating attribute information for controlling an operation based on a manipulation performed by each of the plurality of manipulators on a basis of the detection result.

REFERENCE SIGNS LIST

100, 100a to 100c information processing device
110, 110a to 110c input unit
120 control unit
121 input analyzing unit
123 attribute information generating unit
125 process executing unit
127 output control unit
130, 130a to 130c output unit

The invention claimed is:

1. An information processing device, comprising:
   an acquiring unit configured to acquire a detection result of information related to a manipulator for each manipulator of a plurality of manipulators placed in a predetermined region; and
   a generating unit configured to generate attribute information for controlling an operation based on a manipulation performed by each manipulator of the plurality of manipulators on a basis of the detection result,
   wherein the generating unit generates the attribute information for associating two or more manipulators, among the plurality of manipulators, with each other based on the detection result, and
   wherein the acquiring unit and the generating unit are each implemented via at least one processor.

2. The information processing device according to claim 1,
   wherein the acquiring unit acquires a detection result of a shape feature of the manipulator as information related to the manipulator, and
   the generating unit associates two or more manipulators, among the plurality of manipulators, with each other on a basis of the shape feature of each manipulator of the plurality of manipulators according to the detection result.

3. The information processing device according to claim 1,
wherein the acquiring unit acquires a detection result of a position or a direction of the manipulator as information related to the manipulator, and
the generating unit associates two or more manipulators, among the plurality of manipulators, with each other on a basis of the position or the direction of each manipulator of the plurality of manipulators according to the detection result.

4. The information processing device according to claim 3,
wherein the generating unit associates two or more manipulators adjacent to each other, among the plurality of manipulators, with each other on a basis of the detection result.

5. The information processing device according to claim 1,
wherein the acquiring unit acquires a detection result of an operation of the manipulator as information related to the manipulator, and
the generating unit associates two or more manipulators, among the plurality of manipulators, with each other on a basis of the operation of each manipulator of the plurality of manipulators according to the detection result.

6. The information processing device according to claim 1,
wherein the acquiring unit acquires a manipulation result performed on a predetermined manipulation target by the manipulator as information related to the manipulator, and
the generating unit associates two or more manipulators, among the plurality of manipulators, with each other on the basis of the manipulation result performed by each manipulator of the plurality of manipulators.

7. The information processing device according to claim 1,
wherein the acquiring unit acquires identification information for identifying respective users corresponding to the plurality of manipulators, and
the generating unit controls an operation related to an association between at least some manipulators among the plurality of manipulators on a basis of the identification information.

8. The information processing device according to claim 1,
wherein the generating unit generates new attribute information on a basis of the detection result and the attribute information generated in past.

9. The information processing device according to claim 8,
wherein the generating unit controls an operation related to an association between at least some manipulators among the plurality of manipulators on a basis of the detection result and the attribute information generated in past.

10. The information processing device according to claim 7, further comprising:
a display control unit configured to present display information corresponding to an association between two or more manipulators on a basis of the attribute information,
wherein the display control unit is implemented via at least one processor.

11. The information processing device according to claim 10,
wherein the display control unit presents the display information indicating the association between the two or more manipulators in association with the manipulators on a basis of the attribute information.

12. The information processing device according to claim 10,
wherein the display control unit presents the display information on a basis of the detection result and the acquired identification information for identifying users corresponding to the plurality of manipulators.

13. The information processing device according to claim 10,
wherein the display control unit presents the display information on a basis of the detection result and the attribute information generated in the past.

14. The information processing device according to claim 1, further comprising:
a control unit configured to control reception of a manipulation performed by at least some manipulators among the plurality of manipulators in accordance with an association between the two or more manipulators based on the attribute information,
wherein the control unit is implemented via at least one processor.

15. The information processing device according to claim 1,
wherein the generating unit generates the attribute information for weighting the plurality of manipulators.

16. The information processing device according to claim 15, further comprising:
a display control unit configured to present display information according to a weight set between the plurality of manipulators on a basis of the attribute information,
wherein the display control unit is implemented via at least one processor.

17. The information processing device according to claim 15, further comprising:
a control unit configured to restrict reception of a manipulation performed by at least some manipulators among the plurality of manipulators in accordance with weighting of the plurality of manipulators based on the attribute information,
wherein the control unit is implemented via at least one processor.

18. The information processing device according to claim 1,
wherein the generating of the attribute information is for classifying users corresponding to the two or more manipulators into groups.

19. The information processing device according to claim 1,
wherein the generating unit controls the operation according to one of the two or more manipulators, and controls the operation according to another of the two or more manipulators, and
wherein a result of the operation according to the one of the two or more manipulators and a result of the operation according to the another of the two or more manipulators is the same for the one manipulator and the another manipulator.

20. An information processing method, comprising:
acquiring a detection result of information related to each manipulator of a plurality of manipulators placed in a predetermined region; and
generating, by a processor, attribute information for controlling an operation based on a manipulation performed by each manipulator of the plurality of manipulators on a basis of the detection result,
wherein the generation of the attribute information is for associating two or more manipulators, among the plurality of manipulators, with each other based on the detection result.

21. A non-transitory computer-readable medium having embodied thereon a program, which when executed by a computer causes the computer to execute a method, the method comprising:
acquiring a detection result of information associated with each manipulator of a plurality of manipulators placed in a predetermined region; and
generating attribute information for controlling an operation based on a manipulation performed by each manipulator of the plurality of manipulators on a basis of the detection result,
wherein the generation of the attribute information is for associating two or more manipulators, among the plurality of manipulators, with each other based on the detection result.

* * * * *